(12) United States Patent
Rome et al.

(10) Patent No.: US 12,518,216 B2
(45) Date of Patent: Jan. 6, 2026

(54) USER EFFORT DETECTION

(71) Applicant: Intensity Analytics Corporation, Warrenton, VA (US)

(72) Inventors: John D. Rome, Warrenton, VA (US); Bethann G. Rome, Warrenton, VA (US); Thomas E. Ketcham, II, Warrenton, VA (US)

(73) Assignee: Intensity Analytics Corporation, Warrenton, VA (US)

( * ) Notice: Subject to any disclaimer, the term of this patent is extended or adjusted under 35 U.S.C. 154(b) by 0 days.

(21) Appl. No.: 18/739,489

(22) Filed: Jun. 11, 2024

(65) Prior Publication Data

US 2024/0403721 A1  Dec. 5, 2024

Related U.S. Application Data

(60) Division of application No. 18/094,753, filed on Jan. 9, 2023, now Pat. No. 12,061,959, which is a
(Continued)

(51) Int. Cl.
*G06F 18/23* (2023.01)
*G06F 11/34* (2006.01)
(Continued)

(52) U.S. Cl.
CPC ......... *G06N 20/00* (2019.01); *G06F 11/3438* (2013.01); *G06V 10/762* (2022.01); *G06V 40/10* (2022.01); *G06V 40/28* (2022.01)

(58) Field of Classification Search
CPC ................................................ G06F 3/04883
See application file for complete search history.

(56) References Cited

U.S. PATENT DOCUMENTS 4,621,334 A  11/1986 Garcia
4,805,222 A   2/1989 Young et al.
(Continued)

FOREIGN PATENT DOCUMENTS

CN   108600504 A  *  9/2018  ........... A61B 5/0077
GB        2514780       12/2014
(Continued)

OTHER PUBLICATIONS

U.S. Appl. No. 14/052,562 U.S. Pat. No. 9,430,626, filed Oct. 11, 2013, User Authentication via Known Text Input Cadence.
(Continued)

*Primary Examiner* — Di Xiao
(74) *Attorney, Agent, or Firm* — Schwegman Lundberg & Woessner, P.A.

(57) ABSTRACT

A variety of systems and methods can include evaluation of human user effort data. Various embodiments apply techniques to identify anomalous effort data for the purpose of detecting the efforts of a single person, as well as to segment and isolate multiple persons from a single collection of data. Additional embodiments describe the methods for using real-time anomaly detection systems that provide indicators for scoring effort data in synthesized risk analysis. Other embodiments include approaches to distinguish anomalous effort data when the abnormalities are known to be produced by a single entity, as might be applied to medical research and enhance sentiment analysis, as well as detecting the presence of a single person's effort data among multiple collections, as might be applied to fraud analysis and insider threat investigations. Embodiments include techniques for analyzing the effects of adding and removing detected anomalies from a given collection on subsequent analysis.

17 Claims, 37 Drawing Sheets

Related U.S. Application Data continuation of application No. 16/544,397, filed on Aug. 19, 2019, now Pat. No. 11,580,002.

(60) Provisional application No. 62/719,383, filed on Aug. 17, 2018.

(51) Int. Cl.
*G06N 20/00* (2019.01)
*G06V 10/762* (2022.01)
*G06V 40/10* (2022.01)
*G06V 40/20* (2022.01)

(56) References Cited

U.S. PATENT DOCUMENTS

| | | | |
|---|---|---|---|
| 5,557,686 | A | 9/1996 | Brown et al. |
| 6,151,593 | A | 11/2000 | Cho et al. |
| 6,161,185 | A | 12/2000 | Guthrie et al. |
| 6,212,672 | B1 | 4/2001 | Keller et al. |
| 6,442,692 | B1 | 8/2002 | Zilberman et al. |
| 8,141,775 | B1 | 3/2012 | Aidasani et al. |
| 8,732,158 | B1 | 5/2014 | Hundt |
| 9,078,128 | B2 | 7/2015 | Medina et al. |
| 9,258,117 | B1 | 2/2016 | Roth et al. |
| 9,305,155 | B1 | 4/2016 | Vo et al. |
| 9,355,236 | B1 | 5/2016 | Kratz et al. |
| 9,430,626 | B1* | 8/2016 | Rome ............ G06F 21/32 |
| 9,576,285 | B2 | 2/2017 | Zhou |
| 9,704,361 | B1 | 7/2017 | Hazlewood et al. |
| 9,882,918 | B1 | 1/2018 | Ford et al. |
| 10,229,255 | B2 | 3/2019 | Rome et al. |
| 10,235,507 | B1 | 3/2019 | Rome et al. |
| 10,303,323 | B2 | 5/2019 | Gribetz |
| 10,396,985 | B1 | 8/2019 | Nagelberg et al. |
| 10,540,095 | B1* | 1/2020 | Cheng ............ G06F 16/125 |
| 10,872,336 | B2 | 12/2020 | Rome et al. |
| 10,891,616 | B2 | 1/2021 | Rome et al. |
| 10,963,545 | B2 | 3/2021 | Rome et al. |
| 11,176,553 | B2 | 11/2021 | Rome et al. |
| 11,580,002 | B2 | 2/2023 | Rome et al. |
| 12,061,959 | B2 | 8/2024 | Rome et al. |
| 2003/0228048 | A1 | 12/2003 | Okada et al. |
| 2004/0034788 | A1 | 2/2004 | Ross |
| 2004/0059950 | A1 | 3/2004 | Bender et al. |
| 2004/0187037 | A1 | 9/2004 | Checco |
| 2006/0153364 | A1 | 7/2006 | Beeson |
| 2006/0274032 | A1 | 12/2006 | Mao et al. |
| 2006/0280339 | A1 | 12/2006 | Cho |
| 2007/0045403 | A1 | 3/2007 | Slonecker, Jr. |
| 2007/0245151 | A1* | 10/2007 | Phoha ............ G06N 3/049 |
| | | | 713/186 |
| 2008/0028231 | A1 | 1/2008 | Bender |
| 2008/0209229 | A1 | 8/2008 | Ramakrishnan et al. |
| 2008/0216172 | A1 | 9/2008 | Forman et al. |
| 2009/0085864 | A1* | 4/2009 | Kutliroff ............ A63F 13/10 |
| | | | 463/40 |
| 2009/0134972 | A1 | 5/2009 | Wu, Jr. et al. |
| 2009/0262074 | A1 | 10/2009 | Nasiri et al. |
| 2010/0117978 | A1 | 5/2010 | Shirado |
| 2010/0274815 | A1 | 10/2010 | Vanasco |
| 2011/0047078 | A1 | 2/2011 | Ginter et al. |
| 2011/0282785 | A1 | 11/2011 | Chin |
| 2012/0051605 | A1 | 3/2012 | Nagar et al. |
| 2012/0098750 | A1 | 4/2012 | Allen et al. |
| 2012/0268375 | A1 | 10/2012 | Lu et al. |
| 2012/0268376 | A1 | 10/2012 | Bi |
| 2012/0291111 | A1* | 11/2012 | Kamakura ............ G06V 10/95 |
| | | | 726/7 |
| 2013/0067547 | A1 | 3/2013 | Thavasi et al. |
| 2013/0111580 | A1 | 5/2013 | Checco |
| 2013/0265218 | A1 | 10/2013 | Moscarillo |
| 2013/0332723 | A1 | 12/2013 | Tan et al. |
| 2013/0347099 | A1 | 12/2013 | Smith |
| 2014/0089171 | A1 | 3/2014 | Gandhi |
| 2014/0096215 | A1 | 4/2014 | Hessler |
| 2014/0165170 | A1 | 6/2014 | Dmitriev et al. |
| 2014/0215550 | A1 | 7/2014 | Adams et al. |
| 2014/0244456 | A1 | 8/2014 | Huang et al. |
| 2014/0267009 | A1* | 9/2014 | DeLean ............ G06V 40/28 |
| | | | 345/156 |
| 2014/0282993 | A1 | 9/2014 | Van Till |
| 2014/0310764 | A1 | 10/2014 | Tippett et al. |
| 2014/0310804 | A1 | 10/2014 | Apostolos et al. |
| 2015/0019424 | A1 | 1/2015 | Pourfallah et al. |
| 2015/0081295 | A1 | 3/2015 | Yun et al. |
| 2015/0348024 | A1 | 12/2015 | Asokan et al. |
| 2015/0370333 | A1 | 12/2015 | Ataee et al. |
| 2016/0246396 | A1 | 8/2016 | Dickinson et al. |
| 2016/0253486 | A1 | 9/2016 | Sarkar et al. |
| 2016/0292410 | A1 | 10/2016 | Lu et al. |
| 2016/0320889 | A1 | 11/2016 | Jenkinson |
| 2016/0359837 | A1 | 12/2016 | Krstic et al. |
| 2016/0364558 | A1 | 12/2016 | Rome et al. |
| 2017/0004506 | A1 | 1/2017 | Steinman et al. |
| 2017/0006028 | A1 | 1/2017 | Tunnell et al. |
| 2017/0124562 | A1 | 5/2017 | Hessler |
| 2017/0177855 | A1 | 6/2017 | Costa et al. |
| 2017/0193468 | A1 | 7/2017 | Chougule et al. |
| 2017/0236372 | A1 | 8/2017 | Bulzacki et al. |
| 2017/0257358 | A1 | 9/2017 | Ebrahimi et al. |
| 2017/0323302 | A1 | 11/2017 | Le Vallee |
| 2017/0329515 | A1 | 11/2017 | Clement et al. |
| 2017/0329955 | A1 | 11/2017 | Hessler |
| 2017/0339151 | A1 | 11/2017 | Van Os et al. |
| 2017/0353309 | A1 | 12/2017 | Gray |
| 2017/0361460 | A1 | 12/2017 | Boss et al. |
| 2018/0012227 | A1 | 1/2018 | Tunnell et al. |
| 2018/0032203 | A1 | 2/2018 | Sepulveda et al. |
| 2018/0033002 | A1 | 2/2018 | Weiss et al. |
| 2018/0232739 | A1 | 8/2018 | Battle |
| 2019/0020480 | A1 | 1/2019 | Camenisch et al. |
| 2019/0108504 | A1 | 4/2019 | Blinov et al. |
| 2019/0114632 | A1 | 4/2019 | Rome et al. |
| 2019/0114636 | A1 | 4/2019 | Rome et al. |
| 2019/0114637 | A1 | 4/2019 | Rome et al. |
| 2019/0116050 | A1 | 4/2019 | Rome et al. |
| 2019/0116051 | A1 | 4/2019 | Rome et al. |
| 2019/0123907 | A1 | 4/2019 | Kim et al. |
| 2019/0243955 | A1 | 8/2019 | Rome et al. |
| 2019/0311105 | A1 | 10/2019 | Beiter et al. |
| 2020/0050744 | A1 | 2/2020 | Hazan |
| 2020/0057706 | A1 | 2/2020 | Rome et al. |
| 2021/0014060 | A1 | 1/2021 | Georgiadis et al. |
| 2023/0162092 | A1 | 5/2023 | Rome et al. |

FOREIGN PATENT DOCUMENTS

| | | |
|---|---|---|
| WO | 2014092534 | 6/2014 |
| WO | 2019074686 | 4/2019 |

OTHER PUBLICATIONS

U.S. Appl. No. 15/248,174 U.S. Pat. No. 10,229,255, filed Aug. 26, 2016, User Authentication.
U.S. Appl. No. 16/267,723, filed Feb. 5, 2019, User Authentication.
U.S. Appl. No. 15/134,348 U.S. Pat. No. 10,235,507, filed Apr. 20, 2016, Authentication via Typing Cadence, Gestures, & QR Codes.
U.S. Appl. No. 16/267,835 U.S. Pat. No. 10,963,545, filed Feb. 5, 2019, Authentication via Typing Cadence, Gestures, & QR Codes.
U.S. Appl. No. 16/159,560 U.S. Pat. No. 10,891,616, filed Oct. 12, 2018, System and Method for Effort-Based User Authentication.
U.S. Appl. No. 16/159,555 U.S. Pat. No. 10,872,336, filed Oct. 12, 2018, System and Method for Independent User Effort-Based Validation.
U.S. Appl. No. 16/159,547, filed Oct. 12, 2018, Method and System to Unlock Account Access via Effort Metrics.
U.S. Appl. No. 16/159,533 U.S. Pat. No. 11,176,553, filed Oct. 12, 2018, Method and System Providing Peer Effort-Based Validaiton.
U.S. Appl. No. 16/159,543, filed Oct. 12, 2018, Method and System to Provide Attribution to Blockchain Transactions.

(56) References Cited

OTHER PUBLICATIONS

U.S. Appl. No. 16/544,397 U.S. Pat. No. 11,580,002, filed Aug. 19, 2019, User Effort Detection.
U.S. Appl. No. 18/094,753 U.S. Pat. No. 12,061,959, filed Jan. 9, 2023, User Effort Detection.
"U.S. Appl. No. 14/052,562, Non Final Office Action mailed Dec. 31, 2014", 22 pgs.
"U.S. Appl. No. 14/052,562, Response filed Jan. 13, 2015 to Non-Final Office Action mailed Dec. 31, 2014", 11 pgs.
"U.S. Appl. No. 14/052,562, Non Final Office Action mailed Apr. 6, 2015", 6 pgs.
"U.S. Appl. No. 14/052,562, Amendment and Response filed Aug. 6, 2015 to Non-Final Office Action mailed Apr. 6, 2015", 22 pgs.
"U.S. Appl. No. 14/052,562, Final Office Action mailed Oct. 15, 2015", 23 pgs.
"U.S. Appl. No. 14/052,562, Response filed Mar. 15, 2016 to Final Office Action mailed Oct. 15, 2015", 13 pgs.
"U.S. Appl. No. 14/052,562, Notice of Allowance mailed May 24, 2016", 10 pgs.
"U.S. Appl. No. 15/248,174, Non Final Office Action mailed Apr. 6, 2017", 13 pgs.
"U.S. Appl. No. 15/248,174, Response filed Oct. 5, 2017 to Non Final Office Action mailed Apr. 6, 2017", 13 pgs.
"U.S. Appl. No. 15/248,174, Final Office Action mailed Nov. 21, 2017", 19 pgs.
"U.S. Appl. No. 15/134,348, Non Final Office Action mailed Dec. 4, 2017".
"U.S. Appl. No. 15/248,174, Response filed Jan. 26, 2018 to Final Office Action mailed Nov. 21, 2017", 17 pgs.
"U.S. Appl. No. 15/134,348, Response filed Apr. 4, 2018 to Non Final Office Action mailed Dec. 4, 2017", 13 pgs.
"U.S. Appl. No. 15/248,174, Non Final Office Action mailed May 14, 2018", 16 pgs.
"U.S. Appl. No. 15/134,348, Final Office Action mailed Jul. 16, 2018", 19 pgs.
"U.S. Appl. No. 15/248,174, Response filed Aug. 14, 2018 to Non Final Office Action mailed May 14, 2018", 16 pgs.
"U.S. Appl. No. 15/134,348, Response filed Sep. 17, 2018 to Final Office Action mailed Jul. 16, 2018", 14 pgs.
"U.S. Appl. No. 15/134,348, Advisory Action mailed Sep. 28, 2018", 3 pgs.
"U.S. Appl. No. 15/248,174, Notice of Allowance mailed Oct. 17, 2018", 9 pgs.
"U.S. Appl. No. 15/134,348, Notice of Allowance mailed Oct. 30, 2018", 5 pages.
"U.S. Appl. No. 16/159,543, Preliminary Amendment filed Nov. 27, 2018", 7 pgs.
"U.S. Appl. No. 16/267,835, Non Final Office Action mailed Dec. 5, 2019", 9 pgs.
"U.S. Appl. No. 16/159,560, Non Final Office Action mailed May 13, 2020", 21 pgs.
"U.S. Appl. No. 16/159,533, Ex Parte Quayle Action mailed Jun. 5, 2020", 9 pgs.
"U.S. Appl. No. 16/267,835, Response filed Jun. 5, 2020 to Non Final Office Action mailed Dec. 5, 2019", 9 pgs.
"U.S. Appl. No. 16/267,835, Final Office Action mailed Jul. 22, 2020", 13 pgs.
"U.S. Appl. No. 16/159,533, Response filed Aug. 4, 2020 to Ex Parte Quayle Action mailed Jun. 5, 2020", 7 pgs.
"U.S. Appl. No. 16/159,560, Response filed Aug. 12, 2020 to Non Final Office Action mailed May 13, 2020", 21 pgs.
"U.S. Appl. No. 16/159,555, Notice of Allowance mailed Sep. 4, 2020", 15 pgs.
"U.S. Appl. No. 16/159,560, Notice of Allowance mailed Sep. 15, 2020", 16 pgs.
"U.S. Appl. No. 16/159,560, Notice of Allowance mailed Sep. 23, 2020", 5 pgs.
"U.S. Appl. No. 16/159,533, Notice of Allowance mailed Nov. 5, 2020", 5 pgs.
"U.S. Appl. No. 16/267,835, Notice of Allowance mailed Dec. 23, 2020", 8 pgs.
"U.S. Appl. No. 16/159,533, Notice of Allowance mailed Jan. 22, 2021", 5 pgs.
"U.S. Appl. No. 16/159,543, Non Final Office Action mailed Mar. 19, 2021", 18 pgs.
"U.S. Appl. No. 16/159,543, Response filed Jul. 19, 2021 to Non Final Office Action mailed Mar. 19, 2021", 14 pgs.
"U.S. Appl. No. 16/159,547, Non Final Office Action mailed Aug. 17, 2021", 14 pgs.
"U.S. Appl. No. 16/159,543, Notice of Non-Compliant Amendment mailed Sep. 13, 2021", 3 pgs.
"U.S. Appl. No. 16/159,533, Notice of Allowance mailed Sep. 17, 2021", 5 pgs.
"U.S. Appl. No. 16/159,543, Response filed Oct. 25, 2021 to Notice of Non-Compliant Amendment mailed Sep. 13, 2021", 15 pgs.
"U.S. Appl. No. 16/159,547, Response filed Nov. 17, 2021 to Non Final Office Action mailed Aug. 17, 2021", 12 pgs.
"U.S. Appl. No. 16/159,543, Final Office Action mailed Feb. 15, 2022", 20 pgs.
"U.S. Appl. No. 16/159,547, Final Office Action mailed Feb. 24, 2022", 20 pgs.
"U.S. Appl. No. 16/159,547, Non Final Office Action mailed Dec. 14, 2022", 19 pgs.
"U.S. Appl. No. 16/159,547, Response filed Jun. 14, 2023 to Non Final Office Action mailed Dec. 14, 2022", 14 pgs.
"U.S. Appl. No. 16/159,547, Final Office Action mailed Sep. 8, 2023", 17 pgs.
"U.S. Appl. No. 16/159,547, Response filed Feb. 8, 2024 to Final Office Action mailed Sep. 8, 2023", 12 pgs.
"U.S. Appl. No. 16/159,547, Non Final Office Action mailed Mar. 1, 2024", 18 pgs.
"U.S. Appl. No. 16/159,547, Response filed Sep. 3, 2024 to Non Final Office Action mailed Mar. 1, 2204", 11 pgs.
"U.S. Appl. No. 16/159,547, Final Office Action mailed Sep. 18, 2024", 18 pgs.
"U.S. Appl. No. 16/267,835, Response filed Nov. 23, 2020 to Final Office Action mailed Jul. 22, 2020", 12 pgs.
"U.S. Appl. No. 16/544,397, Restriction Requirement mailed Nov. 19, 2021", 6 pgs.
"U.S. Appl. No. 16/544,397, Response filed Jan. 19, 2022 to Restriction Requirement mailed Nov. 19, 2021", 8 pgs.
"U.S. Appl. No. 16/544,397, Non Final Office Action mailed Mar. 2, 2022", 41 pgs.
"U.S. Appl. No. 16/544,397, Response filed Aug. 29, 2022 to Non Final Office Action mailed Mar. 2, 2022", 5 pgs.
"U.S. Appl. No. 16/544,397, Notice of Allowance mailed Oct. 13, 2022", 9 pgs.
"U.S. Appl. No. 18/094,753, Non Final Office Action mailed Jun. 7, 2023", 51 pgs.
"U.S. Appl. No. 18/094,753, Response filed Dec. 7, 2023 to Non Final Office Action mailed Jun. 7, 2023", 12 pgs.
"U.S. Appl. No. 18/094,753, Notice of Allowance mailed Feb. 28, 2024", 10 pgs.
"U.S. Appl. No. 18/094,753, Corrected Notice of Allowability mailed Jul. 11, 2024", 2 pgs.
Chok, Nian Shong, "Pearson's Versus Spearman's and Kendall's Correlation Coefficients for Continuous Data", Master's Thesis, University of Pittsburgh, (2010), 53 pgs.
Ghali, S, "Introduction to Geometric Computing", Chapter 13, (2008), 143-147.
Joyce, R., "Identity Authentication Based on Keystroke Latencies", Communications of the ACME, vol. 33, No. 2, (Feb. 1990), 168-176.
Kang, P, "Continual Retraining of Keystroke Dynamics Based Authenticator", In: Lee SW., Li S.Z. (eds) Advances in Biometrics. ICB 2007. Lecture Notes in Computer Science, vol. 4642. Springer, Berlin, Heidelberg., (2007), 9 pgs.
Kravitz,, D. W., "Transaction Immutability and Reputation Traceability: Blockchain as a Platform for Access Controlled IoT and Human Interactivity", 15th Annual Conference on Privacy, Security and Trust (PST), Calgary, AB, (2017), 3-12.

(56) References Cited

OTHER PUBLICATIONS

Mandujano, S, "Deterring Password Sharing: User Authentication via Fuzzy c-Means Clustering Applied to Keystroke Biometric Data.", Proceedings of the Fifth Mexican International Conference in Computer Science (ENC'04)., (2004), 7 pgs.

Monrose, F., "Keystroke dynamics as a biometric for authentication", Future Generation Computer Systems, 16, (2000), 351-359.

Weisstein, Eric W, "Barycentric Coordinates", From MathWorld—A Wolfram Web Resource, Online] Retrieved from the internet:http: mathworld.wolfram.com BarycentricCoordinates.html, (Oct. 9, 2018).

WikiDiff, "Centroid vs Barycenter—What's the difference", [Online] Retrieved from the internet:https: wikidiff.com barycenter centroid, (Oct. 9, 2018).

Wikipedia, "Centroid", Wikipedia contributors, the Free Encyclopedia, [Online] Retrieved from the internet:https: en.wikipedia.org w index.php?title=Centroidandoldid=862297606, (Oct. 9, 2018).

Wikipedia, "Barycenter", Wikipedia contributors, the Free Encyclopedia, [Online] Retrieved from the internet:https:en.wikipedia.org w index.php?title=Barycenterandoldid=860897006, (Oct. 9, 2018).

"U.S. Appl. No. 16/159,547, Non Final Office Action mailed Apr. 8, 2025", 28 pgs.

"U.S. Appl. No. 16/159,547, Response filed Mar. 18, 2025 to Final Office Action mailed Sep. 18, 2024", 15 pgs.

\* cited by examiner

FIG. 9

USER EFFORT DETECTION

CLAIM OF PRIORITY

This patent application is a divisional application of U.S. patent application Ser. No. 18/094,753, filed 9 Jan. 2023, now issued as U.S. Pat. No. 12,061,959, which is a continuation application of U.S. patent application Ser. No. 16/544,397, filed on 19 Aug. 2019 and entitled, "USER EFFORT DETECTION, now issued as U.S. Pat. No. 11,580,002, which patent application claims the benefit of priority under 35 U.S.C. § 119(e) to U.S. Provisional Patent Application Ser. No. 62/719,383, filed on 17 Aug. 2018 and entitled, "USER EFFORT ANOMALY DETECTION," which applications are hereby incorporated by reference herein in their entirety.

CROSS-REFERENCE TO RELATED PATENT DOCUMENTS

This patent application is also related to U.S. Pat. No. 9,430,626, titled, "USER AUTHENTICATION VIA INPUT OF KNOWN TEXT," awarded on 30 Aug. 2016; U.S. Provisional Patent Application Ser. No. 61/712,718, titled, "System and Method to Differentiate Input Device Users," filed on Oct. 11, 2012; and to U.S. Provisional Patent Application Ser. No. 62/572,366, titled, "Authentication Via User Effort," filed on Oct. 13, 2017, each of which is incorporated by reference herein in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2018, Intensity Analytics, Inc. All Rights Reserved.

BACKGROUND

As people's work and personal lives become increasingly dependent upon computing devices and information networks, authenticating users who seek to access computing devices, computer networks, and computer services becomes increasingly important. In various techniques to authenticate users, the use of statistical analysis can be involved.

One of the primary challenges to any statistical analysis is to ensure the quality of the source data and the process used to capture that data. Any contamination of the source data will have an unpredictable effect on the accuracy and precision of the result. When the source data is derived from human effort and movement metrics, where unknown variability is an expected condition, the problem of identifying and removing anomalous information is exceptionally difficult, requiring machine learning and artificial intelligence technologies to resolve. Traditional techniques for noise removal and outlier detection do not work well, as they rely too much on normal distribution models and known reference standards that represent truth against which data can be evaluated. Neither of these conditions exist in human effort and movement metrics.

BRIEF DESCRIPTION OF THE DRAWINGS

Some embodiments are illustrated by way of example, and not limitation, in the figures of the accompanying drawings.

FIG. 9 illustrates a visual output including an example table that displays data of performance metrics created during the process of evaluating the challenge phrase against the user's PCCHL, in accordance with various embodiments.

DETAILED DESCRIPTION

Figure 1:
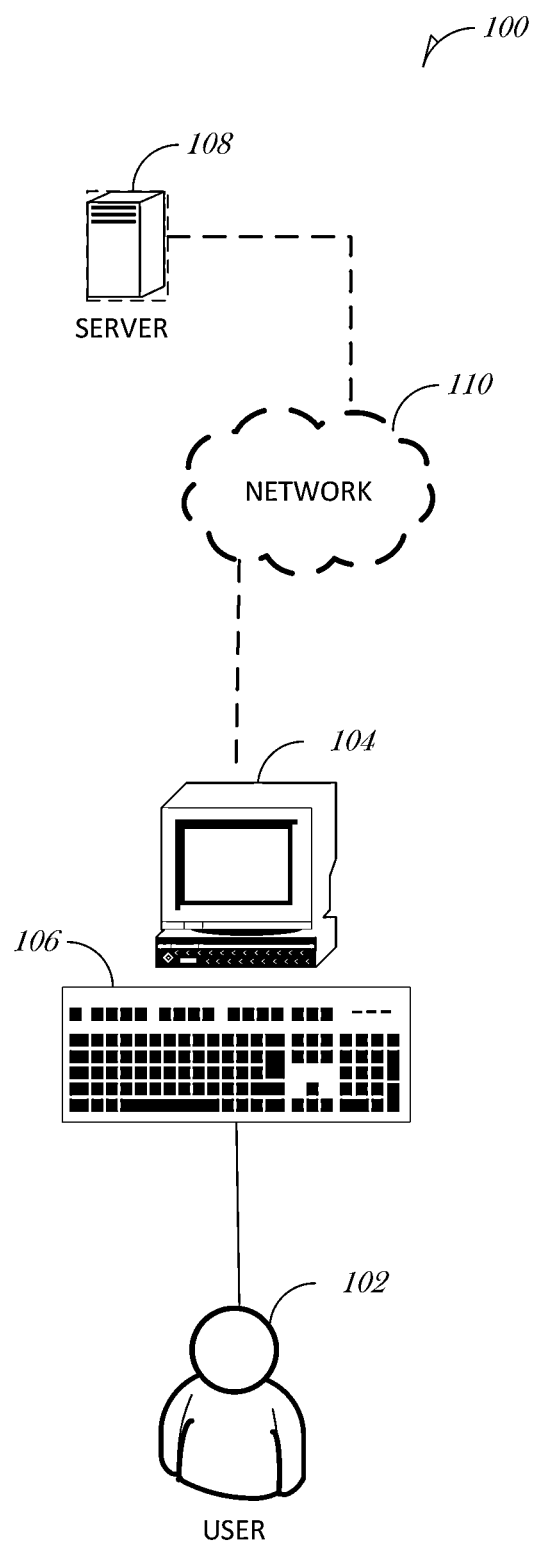
FIG. 1 is a system diagram illustrating a system for user authentication via input of known text, in accordance with various embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. In the following detailed description, for purposes of explanation, numerous specific details are set forth in order to provide a thorough understanding of the various aspects of the presently disclosed subject matter. However, it will be evident to those skilled in the art that the presently disclosed subject matter may be practiced without these specific details. In other instances, well-known methods, procedures, and components have not been described in detail so as not to obscure the presently disclosed subject matter.

For the purposes of this document, an "effort" is a single human movement. The movement can include, but is not limited to, movement to press one key on a keyboard, to move a mouse or finger/hand (in one unbroken and continuous movement) across a screen, track pad, or tablet PC, or a gesture that can be measured by a sensing device. The term "efforts" represents a temporally-associated effort collection, which is created as a part of one logically-connected undertaking, however long or short in duration (e.g., typing a password, typing a paragraph, or even typing a whole treatise, or when moving the mouse from one location to another, or during a set of finger/hand movements that results in a "drawing," however simple or complex, or during making of a gesture).

Various embodiments authenticate users using the cadence and habit of users' motions during input of data into an input device. In various embodiments, the input device may be a computer keyboard, a computer mouse, a trackball, a touchpad, a pointing stick, a digital pen, a touchscreen, a capacitive sensing device, an optical device to record a movement, a motion detector to record a movement, or various combinations thereof. Whenever a user enters information into one of these input devices, the user makes a series of small muscle movements; the metrics surrounding these small muscle movements comprise unique, individual, and highly distinctive patterns. These patterns can be captured during the normal course of the user's input into the input device, statistics of these patterns can be calculated, those statistics can be compared to statistics of previous inputs by the user, and parameterized analysis of the statistical comparisons can be used to authenticate the user. Various embodiments disclosed herein involve determining whether a single sample test string statistically matches a cluster of previously accumulated strings stored in a previously collected cadence and habit library (a.k.a., "PCCHL") associated the user.

When a user types a key on a keyboard, three different events may be generated in sequence: a KeyDown event, which occurs when the user depresses the key, a KeyPress event, which occurs when the depressed key is a character key, and a KeyUp event, which occurs when the user releases the key. Each of these events may also have a corresponding time, measured in "ticks." Each "tick" may equate to roughly 100 nanosecond intervals. Other efforts associated with movements can also correlated to time or time intervals.

Previous methods of authenticating users through keyboarding habits have focused primarily on the basic keyboard measurements of dwell time and flight time. "Dwell time" is the simple calculation of KeyUp minus KeyDown times for each character. "Flight time" is the calculation of time from the previous KeyUp to the next KeyDown event. These basic calculations are often referred to as "hallmark data".

When a user types a typing sample on a keyboard, a large amount of data may be collected. The amount of data, along with selected combinations of hallmark data, and the disparate sizes of even apparently similar keyboard activities can make traditional numerical comparisons between two typing samples difficult, and conclusions about the identity of their respective users statistically unreliable.

Due to the vagaries of humans' small-muscle movements, no single user ever types the same string in exactly the same manner. As a result, a major difficulty in comparing two typing samples is that their component descriptive numerics might not mathematically be the same—but they may be relatively close. Thus, when statistical summaries of this data are abstracted into points in a three-dimensional Euclidean space, a given user, when repeatedly typing an identical and familiar text string, will create points that form relatively well-defined clusters. The more highly grouped the points in a cluster (i.e., the more cohesive the typing efforts which created all of the points in the cluster), the denser the "ball". As with physical mass, the more tightly packed its elements are, and the more of those elements there are in the ball, and the closer a rogue "asteroid" (the typing effort in a single sample) is to that ball, the greater the attraction. The attraction is directly proportional to the likelihood that the sample's typist, and the typist of the PCCHL, is the same user. Similar analysis can be made with respect to measured gestures.

A goal is to authenticate a given user by comparing the current typing of a string of characters with a set of matching entries of the same strings contained in the user's profile within the PCCHL. The entries in the user's profile can either be created all at once in an initial enrollment effort, or can be accumulated over time in a heuristic operation. In either case, after a sufficient number of entries have been typed, the user's profile within the PCCHL is deemed ready for use in comparisons. Statistical sufficiency (i.e., enough to declare a match) is defined in a tuning process. Metaphorically, during the tuning phase the user throws "darts" of identically-typed text strings at an imaginary "dartboard" that, optionally, can either be shown to the user, or can be assembled inconspicuously. When enough of the strings have clustered about the center of the dartboard, the PCCHL becomes useful.

As a user types a typing sample, various aspects of the cycling of each qualifying key typed by the user can be captured and stored. The aspects can be expressed as a combination of labels accompanied by timestamps. In various embodiments, the labels can be encrypted. In various embodiments, the timestamps can be 100-nanosecond timestamps.

To account for differences between platforms and clock times, each typing sample can be examined as if it begins from a time zero origin corresponding to the first KeyDown event of the sample, with each successive event measured as an offset from that origin. For example, the actual events might happen at times 1000, 1293, and 1462, but these times may be evaluated as times 0, 293, and 462. This time offset is referred to as "time-zero elapsed time."

"Inter-letter time" is the defined as the overlap between the interval between the KeyPress and KeyUp events of a character in a sample and the interval between the KeyPress and KeyUp events of the next character in the sample. For example, a typing sample may contain the substring "dog". The user's typing of the substring may be such that the KeyPress event of the letter 'o' occurs during the interval between the KeyPress event and the KeyUp event of the letter 'd', e.g., KeyPress-'d': 0, KeyPress-'o': 216, KeyUp-'d': 248, KeyUp-'o': 497. The inter-letter time between the character pair 'd' and 'o' in this sample substring would be 248−216=32 ns.

The timing data accumulated in a current typing effort can be compared with the timing data stored in the user's profile within the PCCHL. In various embodiments, a match can only occur if the text strings are identical. If the text is identical, the timing data can be examined to generate a variety of measurement results, including average hang time, average space between last KeyUp and next KeyDown across characters, average space between last KeyUp and next KeyUp across characters, event overlaps between characters, control character positions (e.g., CTRL, Shift, ALT, Num Lock, Backspace, etc.). Each of these can be measured by total count, average, coefficient of variance, average deviation, and standard deviation. Furthermore, additional statistics can be provided for graphing, including the number of previous samples collected that compose the profile, the inclusion circle for diagramming a two-dimensional vector chart, and scale information for showing a relationship between the profile information (presented as a cluster of dots) and the currently evaluated sample.

In various embodiments, the timing data can be examined to generate an indication of a match between the typist and the selected user. The indication may comprise a statistical opinion about the overall quality of the identity of efforts, as well as a variety of other measurement results. In various embodiments, the statistical opinion may be a simple "yes" or "no". In various embodiments, the statistical opinion may be a confidence value, a confidence percentage, etc.

In various embodiments, the statistical opinion can have three components: a Boolean yes/no conclusion, a set of rollup statistics composed of certainty and a confidence value measuring the certainty, and a set of detailed statistics.

In various embodiments, a third-party service can be responsible for comparing the current text with the PCCHL text. In various embodiments, the responsibility to compare the current text with the PCCHL text can be left to the calling host. In such embodiments, the confidentiality of the current text and PCCHL text can be under the control of the calling host at all times. In such embodiments, the "calling host" refers to an application or process that employs a cadence authentication process in this disclosure. Such "calling hosts" can authenticate a set of credentials using conventional authentication techniques. For example, an application might first use a database of stored usernames and passwords to validate that the user entered the correct username and password combination, and then use a cadence authentication process as a second authentication factor.

In various embodiments, the calling host is responsible for determining what action to take, if any, based on the outcome of a comparison of the current typing sample to the user's PCCHL.

These techniques are used when comparing the identity of a user making Efforts to: (1) type known text (requiring an exact character match) which can be compared against that user's PCCHL of that same text; or (2) move a mouse, or make finger/hand gestures, resulting in combinations of time durations, start-stop locations, and changes in direction during recorded movements composing one "drawing," which can be compared against that user's PCCHL.

"Known text" is any predetermined, n-length invariant string of computer key codes that are created using a standard English keyboard in one continuous, non-stop burst of typing, however fast.

A combination of selected time-zero elapsed times, key release times, and inter-letter times are assembled and then metamorphosed into a single point in a three-dimensional Euclidean space, which bounds all known efforts of a selected user typing a given string. A collection of all of the points in the selected user's PCCHL form a planet-like cluster, which is then deemed to have "astronomy-esque" gravitational properties. Subsequent single test strings are then caused to "fly by" that cluster. Various statistics representing the force of "gravity" between the sample's point and the barycenter of the cluster of the points in the PCCHL can be computed. These statistics can be used to produce an indicator of similarity between the sample and the user's PCCHL. These statistics can also be used to produce other supporting statistical information, which can represent the reliability of the similarity indicator. The reliability may be in the form of a confidence interval.

In various embodiments, each sample can have a set of "component dots". Each "component dot" can represent a position for a key event for a character in the sample. Joining these dots together for the current typing sample and each typing sample in the selected user's stored PCCHL can facilitate displaying a visual representation of how "close" the current typing sample is to the typing samples in the selected user's stored PCCHL.

In various embodiments, a graphical line connecting the current typing sample's component dots relative to the clusters for each typing sample in the selected user's PCCHL can visually illustrate the user's typing consistency. In various embodiments, the visual illustration may be at least one of a three-dimensional graphic, a Euclidean graphic, a vector graphic, a line graphic, an intersection graphic, and a mashup graphic. See FIG. 8 for an example. In various embodiments, the visual illustration can display a relationship between the provided typing sample and the typing samples in the selected user's PCCHL; i.e., the visual illustration can quickly display an authentication attempt that is statistically "close enough" versus an authentication attempt that represents an imposter. Such illustrations can help non-mathematically-trained investigators with an ability to understand at a glance the complex results of the cadence authentication process.

In various embodiments, a secondary measure of fit can also be produced. In various embodiments, the secondary measure of fit may be produced using two-dimensional vector geometry. In such embodiments, measurements taken from previously recorded typing samples can be rolled up into points on a Cartesian plane. One or more concentric rings, each representing a coefficient of variance, can be computed and centered on the midpoint of all of the calculated points, which can be derived from the entries in the PCCHL. A unique calculated point, or dot, can be produced from the user's current typing sample. In other embodiments, a unique calculated point, or dot, can be produced from the user's current sensed movement such as from a gesture. The radius of that dot from the midpoint of the PCCHL points establishes the confidence interval of the current typing sample. The position of the PCCHL points relative to the rings can display a picture of the user's typing consistency; this picture can be useful for tuning the comparison process.

Hallmarks: Various embodiments successfully addresses the Curse of Dimensionality in mathematics (i.e., evaluating and reliably comparing very large quantities of substantially similar, but numerically different, 'clouds' of numbers, each of different sizes, and then 'seeing' similarities, indeed much as an observer can successfully separate and group atmospheric cloud formations into, say, cumulonimbus and altostratus, even though no two clouds have ever been identical. A developed similarity determination is sufficiently accurate to reliably validate efforts that were created by the same user, while allowing for the vagaries of normal human variance without an unacceptable number of false negatives, yet not so permissive as to allow false positives.

Privacy and Usage: Immediately after performing the needed calculations, all original user content can be flushed. In various embodiments, the PCCHL libraries only contain matrices of numbers, which cannot be reverse-engineered to reveal source content. The application of this technology would normally be in the role of a preferred second-factor authentication tool for five reasons: (1) it cannot be spoofed in real-world environments; (2) it statistically outperforms other PC-based authentication approaches; (3) it is biometric; (4) it does not utilize Personally-Identifiable Information; and (5) it requires no special or non-standard hardware.

In various embodiments, a cadence capture component captures keystroke-timing data. In other embodiments, a cadence capture component can capture movement-timing data such as gesture-timing data. In various embodiments, the cadence capture component can be a computer application, a computer service, or by a web application. The metrics can be distilled and separated from the content, to prevent the escape of any PII ("Personally Identifiable Information"). Those metrics can be shipped via web services to a cloud-based repository in an encrypted format. Given their dissociation from the source text, and the fact that only the typing effort statistics are retained, reverse-engineering the original text is extremely improbable.

For human analysis of the above intermediate observations and final conclusion, appropriate commentary can automatically be generated to aid the observer in understanding the results.

Throughout the entire cadence authentication process, the algorithms make use of geometric and geospatial constructs to solve the mathematical conundrum known as the Curse of Dimensionality (i.e., how can reliable comparisons be made from two separate 'clouds' of data, whose size and structure cannot be known in advance).

Coefficient of Variance can be calculated using the formula $$\frac{\sqrt{\frac{1}{N}\sum_{i=1}^{N}(x_i - \bar{x})^2}}{\frac{1}{n}\sum_{i=1}^{n}a_i}$$

Thus, as used in this document, coefficient of variance is essentially the standard deviation divided by the arithmetic mean.

Turning to the figures, FIG. 1 is a system diagram illustrating a system 100 for user authentication via input of known text, in accordance with some embodiments. The system 100 includes a user 102 and a computing device 104 with a keyboard 106, and may optionally include a server 108 interconnected via at least one network 110.

The computing device 104 can include, but is not limited to, devices such as a smartphone, cellular telephone, mobile phone, laptop computer, tablet computer, desktop computer, server, computer station, or computer kiosk. Although the keyboard 106 is illustrated in FIG. 1 as a physical keyboard, in some embodiments, the keyboard 106 may be a virtual keyboard, such as on a touchscreen or a capacitive-sensing device.

Although the server 108 is illustrated in FIG. 1 as a single machine, in some embodiments that include a server 108 interconnected via a network 110, the server 108 may comprise multiple servers working together as a colocated, distributed, or cloud-based system.

In various embodiments, the user 102 attempts to authenticate using keyboard 106. In various embodiments, data representing the typing of the user 102 using keyboard 106 is collected by computing device 104. In various embodiments, the cadence capture component and the cadence authentication algorithms execute entirely on computing device 104. In such embodiments, the computing device 104 may not need to communicate using network 110 to authenticate user 102 using cadence authentication algorithms. In various embodiments, computing device 104 executes the cadence capture component, but not the cadence authentication algorithms. In such embodiments, the computing device 104 sends the cadence information acquired from user 102 via keyboard 106, sends the cadence information to server 108 via network 110, and then receives an indication of a match via network 110.

Figure 2:
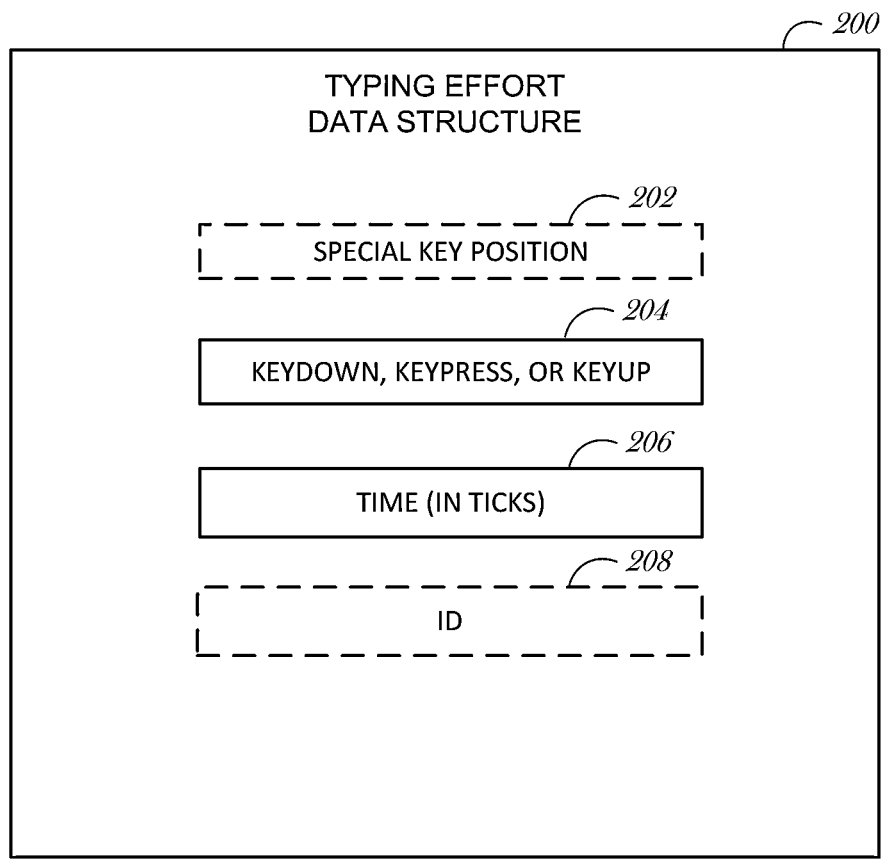
FIG. 2 is a data structure diagram illustrating a typing effort data structure creating during user authentication via input of known text, in accordance with various embodiments.

FIG. 2 is a data structure diagram illustrating a typing effort data structure 200 creating during user authentication via input of known text, in accordance with some embodiments. In various embodiments, a typing effort data structure 200 is created for each key event in the current typing sample.

In various embodiments, the typing effort data structure 200 includes a data structure 204, which represents one of the following events: KeyDown, KeyPress, or KeyUp. In various embodiments, data structure 206 represents the time in ticks of the event represented in 204.

In various embodiments, the typing effort data structure 200 may optionally include a special key position data structure 202. In various embodiments, the special key position data structure 202 represents a key stroke of a special key, such as a non-printable key (e.g., Shift, Alt, Ctrl, etc.).

In various embodiments, the typing effort data structure 200 may optionally include an ID data structure 208, which can contain a value representing the unique identity of the selected user in the PCCHL database. In various embodiments, the value of the ID data structure 208 can be a string, a number, a pointer or reference, or an abstract data structure such as an object. In various embodiments, the value of the ID data structure 208 unambiguously identifies the selected user, as whom the typist is attempting to authenticate. In various embodiments, the value of the ID data structure 208 is determined by the host application.

Figure 3:
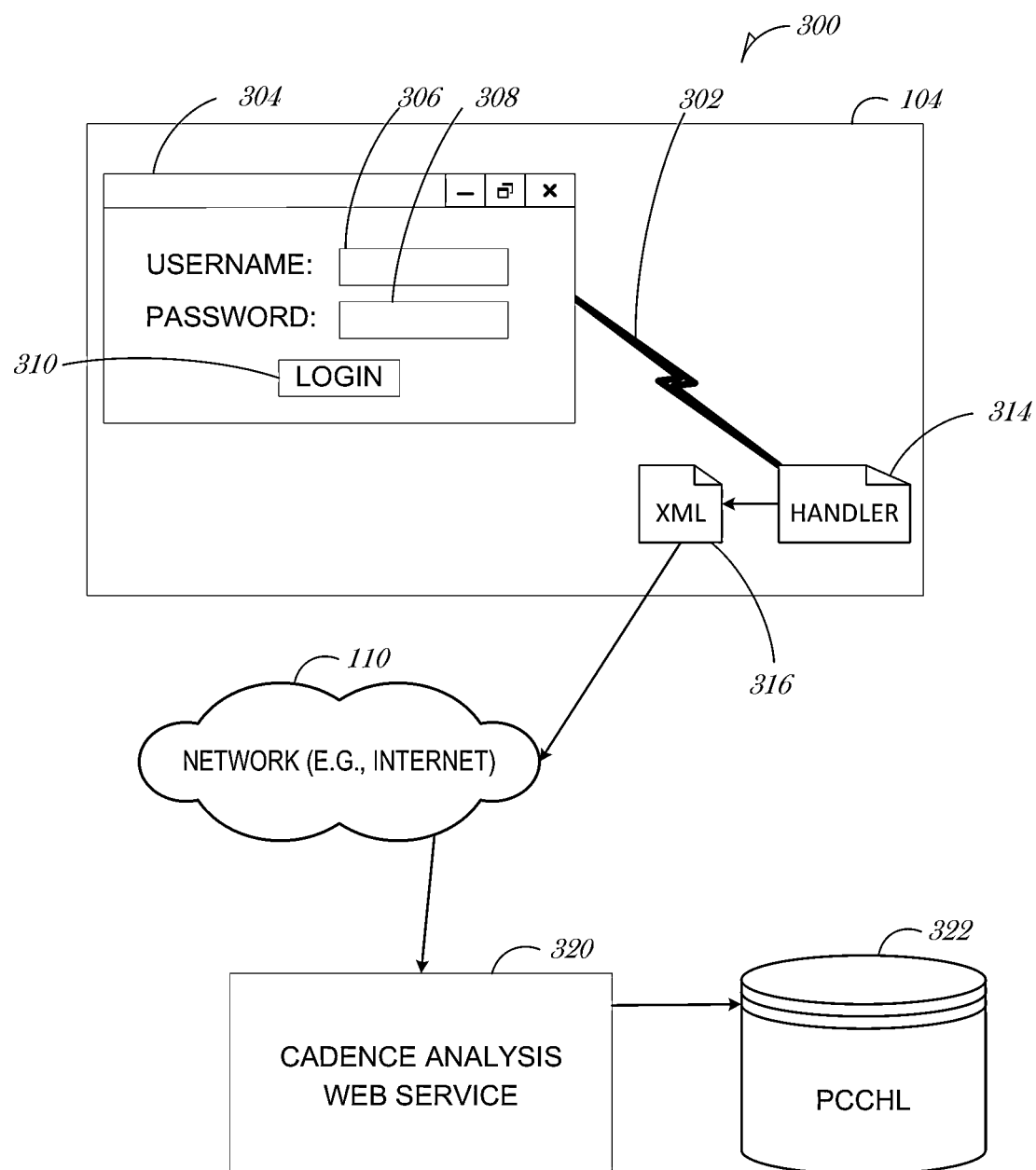
FIG. 3 is a system diagram illustrating an implementation of a system for user authentication via input of known text, in accordance with various embodiments.

FIG. 3 is a system diagram illustrating an implementation of a system 300 for user authentication via input of known text, in accordance with some embodiments. In various embodiments, the system 300 comprises a computing device 104, a network 110, cadence analysis web service 320, and a PCCHL 322. In various embodiments, the computing device 104 can present an application 304 containing text input controls. In various embodiments, the application 304 is an application executing locally on computing device 104. For example, application 304 can be a native application compiled for the computer architecture of computing device 104 (e.g., a compiled C++ application), as well as an interpreted application compiled for a virtual architecture provided by a natively executing interpreter (e.g., a Java or Microsoft .NET application). In various embodiments, the application 304 is a web page.

In various embodiments, application 304 can display one or more text input controls. Users can engage the cadence authentication process by typing text into the text input controls. In various embodiments, the text input controls may be a username input control 306, a password input control 308, or both. In various embodiments, by preventing text from being pasted into the control, the text input controls may force users to enter text using an input device capable of capturing cadence information, (e.g., a computer keyboard).

In various embodiments, typing metrics can be collected while the user is typing text into the text input controls. In various embodiments, each key event 302 in the text input controls causes a handler 314 to receive or collect a typing effort data structure 200, as described in the description of FIG. 2. In various embodiments, the handler 314 can be a dynamically-linked library (i.e., DLL) or a form handler for a web page.

In various embodiments, when the user has finished typing text into one or more text input controls, the computing device 104 can send the collected typing metrics to the cadence analysis web service 320 via network 110 upon the user clicking, pushing, or otherwise selecting a button, such as a login button 310. In various embodiments, when the user has finished typing text into one or more text input controls, the computing device 104 can automatically send the collected typing metrics to the cadence analysis web service 320 via network 110 after a certain amount of time elapses. In various embodiments, the computing device 104 can automatically stream the typing metrics to the cadence analysis web service 320 via network 110 as the user is typing text into the input controls.

In various embodiments, when the handler 314 is ready to send collected typing metrics, the handler 314 creates an XML file 316 containing the collected typing metrics to be transmitted. In various embodiments, the handler 314 transmits the XML file 316 to the cadence analysis web service 320 via network 110. In various embodiments, the transmission can be done using web services.

In various embodiments, when the cadence analysis web service 320 receives the XML file 316 containing the collected typing metrics for the user's typing sample, the cadence analysis web service 320 can evaluate the typing metrics data in the XML file 316 against the selected user's profile stored in the PCCHL.

Two implementation approaches may be common: one for web applications and one for local applications. Many organizations, especially those that require extremely high levels of security (e.g., financial services, government, etc.) may choose an implementation in which all components of the cadence authentication system are under the control of the organization.

Local Implementation

Local applications use a wide variety of different authentication schemes, or do not use authentication at all. For applications that currently require a username and password, a small cadence authentication component (e.g., a Microsoft .NET DLL on Microsoft Windows) can be added to the local application. The small component will verify the typing metrics when the user enters their username and password. In cases where there is no security or the source code for the local application is not available, a cadence authentication service can operate as a background process, requiring the user to enter credentials or perform a gesture to access the application.

In various embodiments, where the cadence authentication component is added to the local application, the cadence authentication component provides event listeners that are bound to given data entry controls, and the cadence authentication component can provide web service access for the essential profile creation and evaluation functions.

After the cadence authentication component has been added to a desktop application for authentication, two operations are available: the process to test a current typing sample against a stored profile (a.k.a., "login"), and a different process to create a specific profile (a.k.a., "enrollment"). How these different operations are presented to the user can vary a great deal based on the host application. In some cases, the user can be required to create a profile using an enrollment module or even as part of a separate application, which can then be used with the login function. There are many different options for how the enrollment process can be implemented. For instance, a more complex option is to employ a passive enrollment operation, which builds a profile over time as the user accesses the system. In this case, both operations may be handled by the same process in the host application.

An example code handler using Microsoft VB.NET is listed below:
Example Code Handler (can be any modern language, programming references will vary by programming language and by computing platform):

```
Private CVMetrics As New CVMetricsDLL.Operations(MyUserNameTextbox,
MyPasswordTextbox)
  Private Sub Login_Click(By Val sender As System.Object, By Val e As
System.EventArgs) Handles Login.Click
     Try
        If IsValidUser(MyUserNameTextbox.Text, MyPasswordTextbox.Text) =
True Then
           If CVMetrics.CompareSample(MyUserNameTextbox.Text,
CVMetrics.CurrentData) = True Then UserIsAuthenticated = True
        End If
        CVMetrics.ClearData
     Catch ex As Exception
        ErrHandler(ex)
     End Try
  End Sub
```

Web Implementation

Today, most secure websites require a username and password for access. When a user submits these credentials, the website verifies the credentials against a database to verify they match a record in the database. In various embodiments, adding cadence authentication can be as simple as including a small script payload with the login web page, and referencing a web service on the server side. In such embodiments, when the user navigates to that same login page, everything will appear the same as before, except when the user types a username and password, the user's typing metrics will be verified as well.

In various embodiments, there can be two components to add cadence authentication to a web application. In various embodiments, a jQuery-based component must be included in the page using a standard <script> tag in the header section along with a hidden field for storing temporary data. This component will pass a string containing compressed metadata about the input process as part of the form submission. The form handler routine for the page will pass this metadata to a web service, which will return information about the result.

Once cadence authentication has been added to a web application, there are two operations involved: the process to test a given input against a stored profile (login), and a different process to create a specific profile (enrollment). In the example code below, the two operations are handled on different web pages. In embodiments corresponding to the example code below, the user would be required to create a profile using the enrollment page, which can then be used with the login page. There are many different options for how the enrollment process can be implemented. For example, a more complex option is to employ a passive enrollment operation, which builds a profile over time as the user accesses the system. In this case, both enrollment and login would be handled by the same web page.

Example Web Page (Login):

```
<html>
<head runat="server">
 <script src="jquery-1.7.2.min.js"
   type="text/javascript"> </script>
     <script src="cvmetrics.js" type="text/javascript" />
</head>
  <body>
    <form id="frmLogin" runat="server">
     Username: <asp:TextBox ID="txtLogin" runat="server" />
     Password: <asp:TextBox ID="txtPwd" runat="server" />
     <asp:Button ID="btnLogin" runat="server" Text="Login"
  OnClientClick="return populateControlWithKeyData(
       'txtPwd','CVMetricsData');" />
```

-continued

```
     <input type="hidden" id="CVMetricsData" />
    </form>
    <script type="text/javascript">
       cvmBindControl('txtPwd', bandType.Narrowband);
    </script>
  </body>
</html>
```

Example Code Handler (Login):

```
     private void btnLogin_Click(object sender, EventArgs e)
{
   try {
     //-- Usually, CVMetrics is called after the user --
     //-- credentials have been verified as normal. --
     //-- Get the CVMetrics data from the hidden --
     //-- field value(s). --
     string RawCVMData = hfPassword.Value.ToString;
        //-- Call to the CVMetrics web service --
     using (nbServices.narrowband nb = new
       nbServices.narrowband( )) {
        //-- Create the variables to hold the results --
        //-- from the evaluation. --
```

```
        bool Match = false;
        double Fidelity = 0;
        double Confidence = 0;
        DataTable dtStatistics = new DataTable( );
        dtStatistics.TableName = Guid.NewGuid( ).ToString( );
            string Result = nb.EvaluateSampleWithGraphs(
                CVMLicenseKey,
                txtLogin.Text.Trim,
                RawCVMData,
                Match,
                Fidelity,
                Confidence,
                dtStatistics);
            if (Result == string.Empty) {
    //-- The Match value returns a Boolean result --
    //-- Other values contain statistical detail. --    } else {
    //-- Any error message is in the Result value --
            }
        }
        } catch (Exception ex) {
    //-- Error handling --
        }
    }
```

Example Web Page (Enrollment):

```
<html>
<head runat="server">
<script src="jquery-1.7.2.min.js"
     type="text/javascript"></script>
     <script src="cvmetrics.js" type="text/javascript" />
     </head>
     <body>
        <form id="frmEnrollment" runat="server">
        Username: <asp:TextBox ID="txtLogin" runat="server" />
        Password: <asp:TextBox ID="txtPwd" runat="server" />
        <asp:Button ID="btnSubmit" runat="server" Text="Login"
     OnClientClick="return populateControlWithKeyData(
            'txtPwd','CVMetricsData');" />
        <br />
        <asp:Image ID="imgInclusion" runat="server"
        Visible="false"></asp:Image>
        <input type="hidden" id="CVMetricsData" />
        </form>
        <script type="text/javascript">
            cvmBindControl('txtPwd', bandType.Narrowband);
     </script>
     </body>
</html>
```

Example Code Handler (Enrollment):

```
        private void btnSubmit_Click(object sender, EventArgs e)
        {
        try {
    //-- Get the CVMetrics data from the hidden --
    //-- field value(s). --
        string RawCVMData = hfPassword.Value.ToString;
            //-- Call to the CVMetrics web service --
        using (nbServices.narrowband nb = new
            nbServices.narrowband( )) {
                //-- Create the variables to hold the results --
    //-- from the evaluation. --
        string InclusionImageData = string.Empty;
        DataTable dtStatistics = new DataTable( );
        dtStatistics.TableName = Guid.NewGuid( ).ToString( );
            string Result = nb.SaveProfileWithGraphs(
                CVMLicenseKey,
                txtLogin.Text.Trim,
                RawCVMData,
                200,
                200,
                InclusionImageData,
                dtStatistics);
            if (Result == string.Empty) {
```

```
    //-- The datatable contains statistical detail. --
    //-- This example displays a graph result. --
        string InclusionImage =
            string.Format("/charts/{0}.png",
            Guid.NewGuid( ).ToString( ));
        Base64ToImage(InclusionImageData).Save(
            Server.MapPath(InclusionImage),
            ImageFormat.Png);
        imgInclusion.ImageUrl = InclusionImage;
        imgInclusion.Visible = true;
            } else {
    //-- Any error message is in the Result value --
            }
        }
        } catch (Exception ex) {
    //-- Error handling --
        }
    }
```

Figure 4:
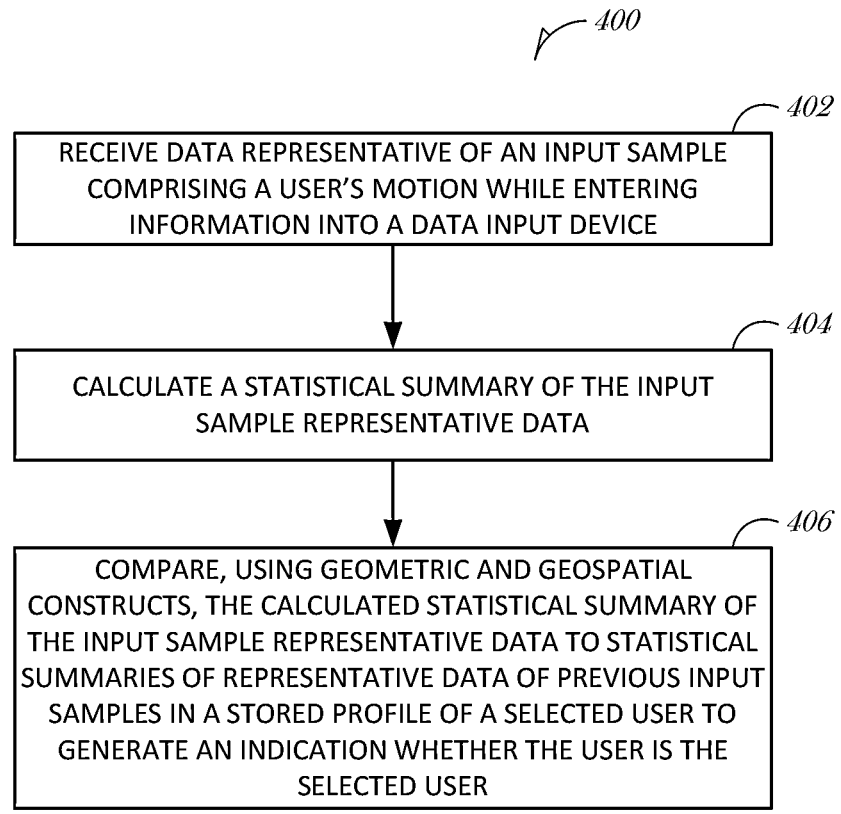
FIG. 4 is a flowchart illustrating a method for user authentication via input of known text, in accordance with various embodiments.

FIG. 4 is a flowchart illustrating a method 400 for user authentication via input of known text, in accordance with some embodiments. At 402, data representative of an input sample is received, the input sample comprising a user's motion while entering information into a data input device. In various embodiments, the input device may be a computer keyboard, a computer mouse, a trackball, a touchpad, a pointing stick, a digital pen, a touchscreen, a capacitive sensing device, or some combination thereof.

At 404, a statistical summary of the input sample representative data is calculated. At 406, the calculated statistical summary of the input sample representative data is compared to statistical summaries of representative data of previous input samples in a stored profile of a selected user to generate an indication whether the user is the selected user.

Figure 5:
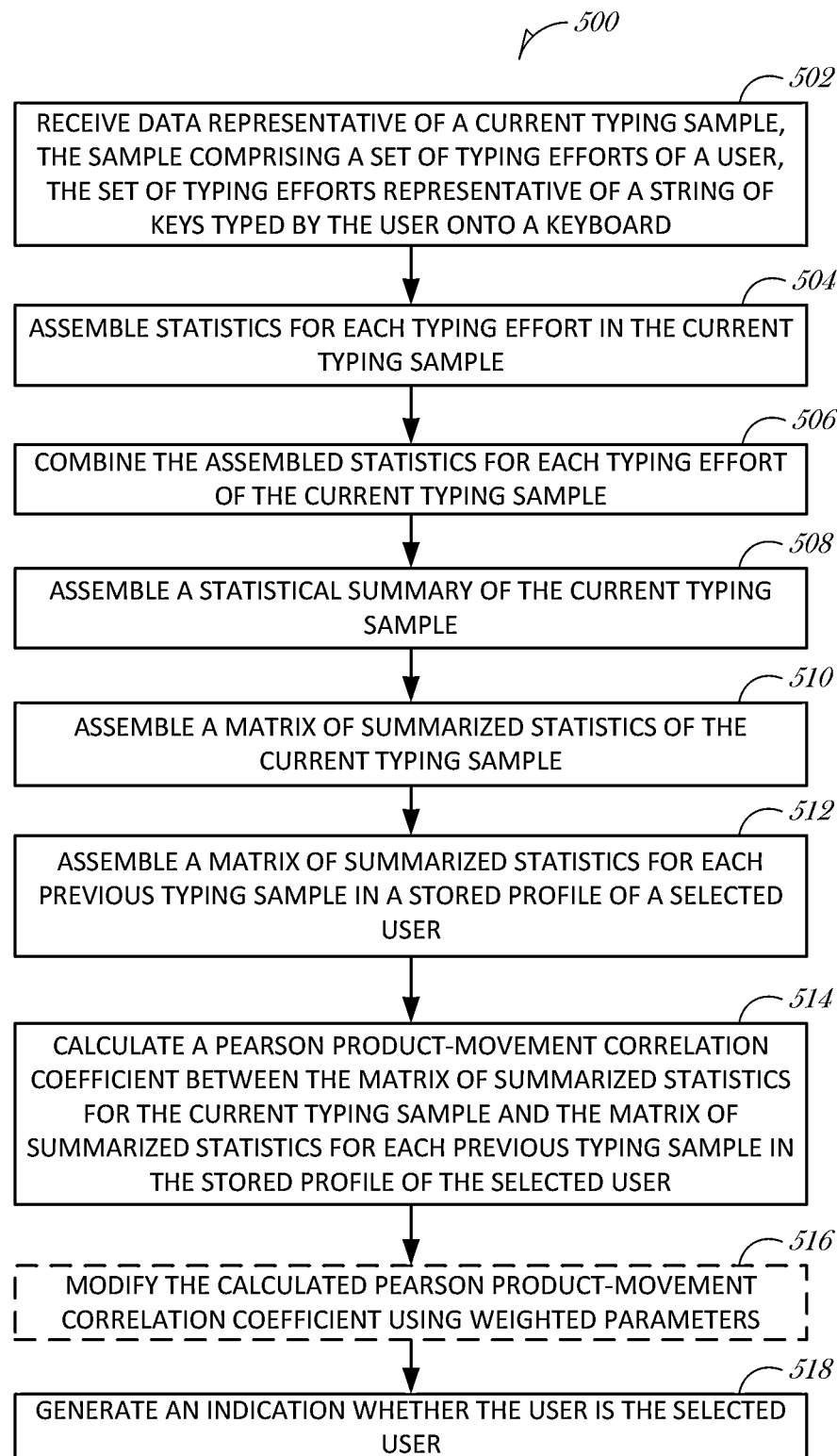
FIG. 5 is a flowchart illustrating a method for user authentication via input of known text, in accordance with various embodiments.

FIG. 5 is a flowchart illustrating a method 500 for user authentication via input of known text, in accordance with some embodiments. At 502, data representative of a current typing sample is received, the sample comprising a set of typing efforts of a user, the set of typing efforts representative of a string of keys typed by the user onto a keyboard.

At 504, statistics are assembled for each typing effort in the current typing sample. At 506, the assembled statistics for each typing effort of the current typing sample are combined. At 508, a statistical summary of the current typing sample is assembled. At 510, a matrix of summarized statistics of the current typing sample is assembled.

At 512, a matrix of summarized statistics for each previous typing sample in a stored profile of a selected user is assembled. At 514, a Pearson product-moment correlation coefficient is calculated between the matrix of summarized statistics for the current typing sample and the matrix of summarized statistics for each previous typing sample in the stored profile of the selected user. A Pearson product-moment correlation coefficient can be calculated using the formula:

$$r = \frac{\sum XY - \frac{\sum X \sum Y}{N}}{\sqrt{\left(\sum X^2 - \frac{(\sum X)^2}{N}\right)\left(\sum Y^2 - \frac{(\sum Y)^2}{N}\right)}}$$

In an example of calculating a Pearson product-moment correlation coefficient, X is an array of average times between KeyUp and KeyDown events by character for the current typing sample, Y is an array of average times between KeyUp and KeyDown events by character for the typing samples in the selected user's stored profile, and N is the length of the arrays.

At 516, optionally, the calculated Pearson product-moment correlation coefficient is modified using weighted parameters. In various embodiments, the parameters are configured externally. At 518, an indication whether the user is the selected user is generated.

Figure 6:
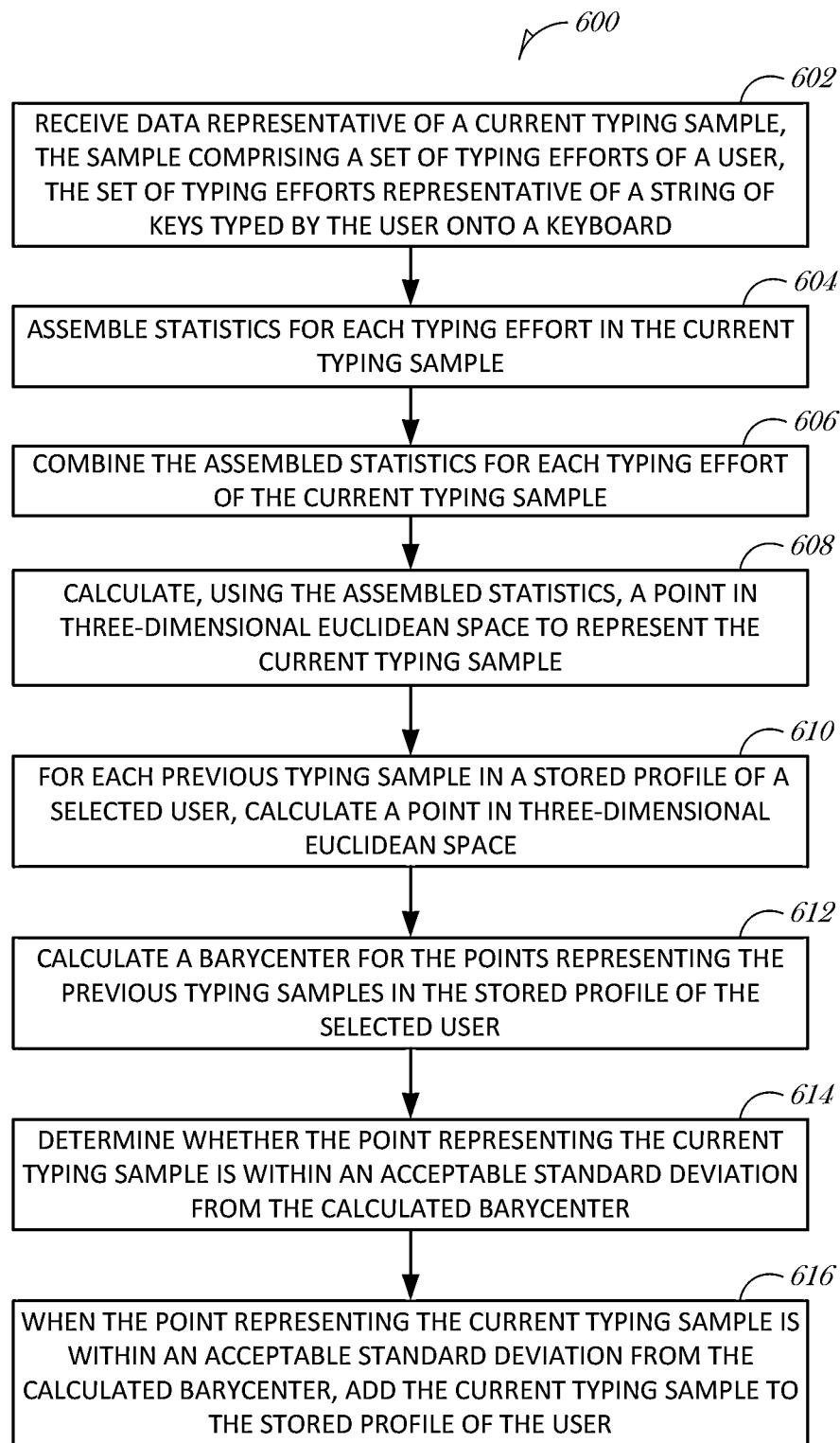
FIG. 6 is a flowchart illustrating a method for adding a typing sample to a user's stored profile, for use in user authentication via input of known text, in accordance with various embodiments.
Figure 7:
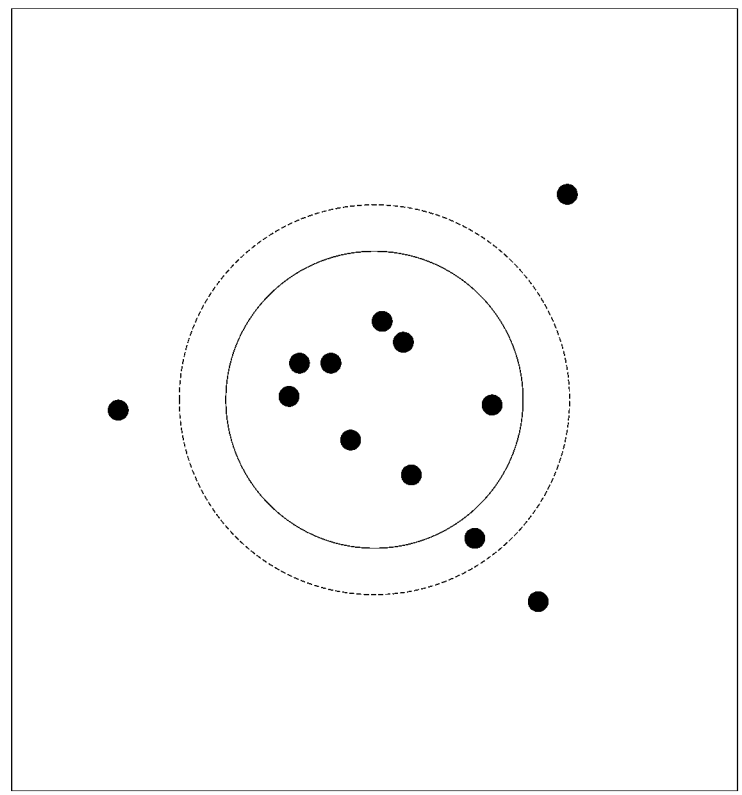
FIG. 7 is a diagram illustrating a visual representation of a tuning process for user authentication via input of known text, in accordance with various embodiments.

FIG. 6 is a flowchart illustrating a method 600 for adding a typing sample to a user's stored profile, for use in user authentication via input of known text, in accordance with some embodiments. At 602, data representative of a typing sample is received, the sample comprising a set of typing efforts of a user, the set of typing efforts representative of a string of keys typed by the user onto a keyboard.

At 604, statistics are assembled for each typing effort in the typing sample. At 606, the assembled statistics for each typing effort of the typing sample are combined. At 608, a point in three-dimensional Euclidean space is calculated using the assembled statistics, the point to represent the current typing sample.

At 610, a point in three-dimensional Euclidean space is calculated for each previous typing sample in a stored profile of a selected user. At 612, a barycenter is calculated for the points representing the previous typing samples in the stored profile of the selected user. A barycenter can be calculated using the formula:

$$R = \frac{1}{M}\sum_{i=1}^{n} m_i r_i$$

The barycenter can be considered a conceptual center of mass represented by the collection of data points relating to a given character within the samples that compose a selected user's profile. In an example, the individual points are represented by the coordinates of $r_i$, thus, the mass (m) is a fixed value, so the sum (M) of the mass is equivalent to the number of points relating to the given character in the selected user's stored profile. Once the barycenter has been calculated, the barycenter can be used as a reference to calculate force (F) and torque (T), using the formulas:

$$F = \int_V f(r) = \int_V \rho(r) dV \left(-g\vec{k}\right) = -Mg\vec{k} \text{ and } T =$$

$$\int_V (r-R) \times f(r) = \int_V (r-R) \times \left(-g\rho(r)dV\vec{k}\right) = \left(\int_V \rho(r)(r-R)dV\right) \times \left(-g\vec{k}\right)$$

respectively, where:
V is volume of the body (profile values),
$\rho(r)$ is the computed density at each point r in the volume,
g is the acceleration of gravity,
k is a unit vector defining a vertical direction,
d is the mass at the point r,
f is the force at each point r,
R is the reference point for the Torque calculation,
F is the computed Force, and
T is the computed Torque (0 at the center of mass).

The conceptual force of "gravity" between the point representing the current typing sample and the barycenter of the cluster of points from previous typing samples can be calculated using the formula:

$$F = G\frac{m_1 m_2}{r^2}$$

At 614, whether the point representing the current typing sample is within an acceptable standard deviation from the calculated barycenter is determined. At 616, the current typing sample is added to the stored profile of the user when the point representing the current typing sample is within an acceptable standard deviation from the calculated barycenter.

Additional Embodiments

1. Using "Pause Islands" and Letter-Grouping Consistency Extremes in Evaluating Keyboard Biometric Authentication Performance When users type more than one word, even when continuously typing without unnatural pauses for thought or because of some external interruption, they inherently pause "over" spaces and punctuation—the keyboarding equivalent of taking a breath. A difficulty for many cadence-evaluating algorithms is that the duration and other descriptive statistics of these pauses are frequently quite dissimilar, and thus can have the effect of altering the overall conclusion about the fidelity of the current typing sample to the selected user's PCCHL.

For instance, in a password that contains a group of numeric characters, there may typically be a so-called "pause island" introduced as the user switches from using the alphanumeric portion of the keyboard to the numeric keypad for data entry.

Various embodiments enable the designation of selected pause characters (particularly spaces) as "timeouts," such that their presence in the current typing sample is required, but the associated typing numerics are ignored. The same tuning process also works at the other end of the consistency spectrum: in cases where individual letters (or pairs) are observed as always typed inconsistently (i.e., outside an expected coefficient of variance), the inconsistency can be designated as a requirement. In certain cases, paradoxically, any consistent typing behavior encountered in situations categorized as "typically inconsistent" would lower the comparison score.

Such embodiments can be particularly applicable to accommodating complex password requirements, which contain both reflexively typed text as well as characters that are produced through intentional keyboard use.

2. Combining Different Scoring Methods into a Single Process of Authenticating a Given User'S Typing to Accomplish "Accident Forgiveness"

Various embodiments can be adjusted to tolerate variable degrees of non-conformity to the cadence authentication specifications. Such adjustments can be particularly useful in cases when users are required to employ passwords which are sufficiently complex that they do not readily lend themselves to typing using involuntary muscle movements, or if various physical human conditions make routinized typing difficult or impossible. This includes difficulty with a single character or a pair/group of characters, or any other problems with consistent typing behavior. These individual techniques address recurring islands of inconsistency in an otherwise highly consistent typed string.

Various embodiments of the disclosed cadence authentication processes are tunable. When a user enrolls into the cadence authentication system by entering typing samples into the PCCHL, the user can be presented with visual cues that can guide them to continue providing typing samples until determined thresholds of performance are met. The thresholds, (e.g., coefficient of variance, standard deviation, etc.), can vary by the application in which the cadence authentication process will be used. Thus, different standards of "tightness" are possible, based on the criticality of the application to the organization. In various embodiments, the cadence authentication processes use default settings, so that inexperienced users do not have to take the time to understand or alter the tuning parameters unless they so desire.

In various embodiments, the visual cues can take the form of a two-dimensional graphic comprising at least one circle, similar to a dartboard. See FIG. 8 for an example. Each typing sample can be displayed as a small dot in the graphic. The dots appearing inside the circle meet the requirements, while the dots appearing outside the circle do not.

During long periods of typing, users' patterns slow down or progressively change slightly, due to fatigue, experience, as well as other human and muscle-training factors. Various embodiments factor this pattern degradation automatically by accounting for predictably changing behavior. In various embodiments, the cadence authentication process can account for consistent progressive change in order to discern whether any differences in later performance numerics is a result of tiredness/familiarity—and not due to a change in user.

3. Supporting "Accident Forgiveness" by Variable Weighting of Letter-Grouping Importance Based on Normal Curve Distribution Characteristics when Determining Sample Match Probabilities Often, users have difficulties with just a small bit of typing—perhaps only a single character or pair/group of characters in a typing sample. If pan-string numerics can be characterized as "longitudinal," the information about single letters (or groups of single letters) can be characterized as "latitudinal". Highly focused latitudinal statistics, accumulated across many samples, can be rolled up into normal distributions of behavior. Optionally, the match algorithms can be set to consider these individual latitudinal variances, further sensitizing them to a user's typing habits, and thus making the results even more conforming to the user's own unique behavior, yet cognizant of small aberrations along the way.

In such embodiments, if a consistent inconsistency is detected in a small part of the samples used to create the profile, those corresponding measurements can be given little (or no weight) in the rendered conclusion.

4. Backspace-to-Overtype and "Double-Clutching" Non-Letter-Generating Keys to Avoid Spoofing Various embodiments can be set to either tolerate—or indeed to require—backspacing and overtyping such that the precise text required to satisfy the host application's password is properly delivered, yet its creation requires the use of hidden or more complex typing to create those final password string. For example, if a password were "Tom," various embodiments can mandate that those letters be typed as "T-o-n-<backspace>-m". Also, certain non-character generating keys (e.g., the Shift key) might be required to be pressed twice consecutively, etc. In both of these examples, no additional text is delivered to the host application—accordingly, the password needs are met for the host application's purposes—yet the cadence authentication process would recognize the hidden/required extra effort, and failure to provide that hidden effort would result in a failure score.

5. Using Multiple PCCHL to Account for Different Computers, Keyboards, Touch Surfaces, and Applications Users' habits of typing vary with the width, shape, and z-order (i.e., vertical key travel space) of the keyboard. Various embodiments can automatically check multiple hardware libraries to compensate for these physical differences in hardware. Various embodiments can store two values: an ID (which can be provided by the client), and associated profile data. Each ID can be stored with a sub value, so that each ID can have multiple, discrete profiles. When a current typing sample is evaluated for authentication, all of the sub values for the given ID can automatically be checked. In such embodiments, there is no substantial difference to the host application in terms of implementation. These embodiments can have at least two different uses: supporting multiple hardware profiles for a single individual, or allowing a single ID to be shared by multiple authorized users. This latter case can be particularly useful to facilitate shared administrative accounts used by support personnel.

6. Improved Biometric Keyboard Authentication Using Heuristic Windowing of Sample Building Process, as Well as Auto-Start and Progressive Learning Techniques In some embodiments, the PCCHL require typing samples to be useful. These typing samples can be compiled over time, or all at once. Both approaches are valid, and can be selected by the client to maximize users' ease of use. It is also possible to require continuous/perpetual sample accumulation.

Various windowed sample periods for typing sample accumulation can also be employed: by elapsed time (e.g., within the last week), by number of events (e.g., the last 10 entries), by an external data condition (e.g., service subscription renewal), by device (e.g., the user's laptop), or some combination thereof. Appropriate choice of these PCCHL-building options gives clients another opportunity to tune the performance of the cadence authentication algorithms to their specific security needs.

A possible operational benefit of these windowed sample periods is the "frictionless" accumulation of data. For example, embodiments using windowed sample periods can be installed and start working without requiring any PCCHL samples. In that case, until a statistically significant number of samples have been accumulated, the comparison results are simply reported back as inconclusive. Once the minimum sample threshold for the selected user has been obtained, the host application can begin using the cadence authentication algorithms to authenticate the selected user.

The following examples pertain to further embodiments.

Example 1 can include subject matter (such as a method, means for performing acts, or machine readable medium including instructions that, when performed by a machine cause the machine to performs acts) comprising receiving data representative of a typing sample, the sample comprising a set of typing efforts of a user, the set of typing efforts representative of a string of keys typed by the user onto a keyboard; calculating a statistical summary of the typing sample representative data; and comparing, using geometric and geospatial constructs, the calculated statistical summary of the typing sample representative data to statistical summaries of representative data of previous typing samples in a stored profile of a selected user to generate an indication whether the user is the selected user.

In Example 2, the subject matter of Example 1 may optionally include, wherein the data representative of a typing effort comprise at least one of special key positions, KeyDown plus character plus time, KeyPress plus character plus time, KeyUp plus character plus time, and an identification object.

In Example 3, the subject matter of any of Examples 1-2 may optionally include, wherein calculating comprises assembling, for each typing effort in the typing sample, statistics comprising at least one of sequence, KeyUp minus KeyDown, overlap, overlap ordinal, KeyUp minus Last KeyUp, and KeyDown minus Last KeyUp; combining the assembled statistics for each typing effort of the sample; assembling a statistical summary of the sample, the statistical summary comprising at least one of count, average, coefficient of variance, average deviation, and standard deviation; and assembling a matrix of summarized statistics for the sample, the matrix comprising at least one of time between KeyUp and KeyDown, space between last KeyUp and next KeyDown, space between last KeyUp and current KeyUp, and standard deviation divided by average.

In Example 4, the subject matter of any of Examples 1-3 may optionally include, wherein comparing comprises assembling a matrix of summarized statistics for each previous typing sample in the stored profile of the selected user, the matrix comprising at least one of time between KeyUp and KeyDown, space between last KeyUp and next KeyDown, space between last KeyUp and current KeyUp, and standard deviation divided by average; and calculating a Pearson product-moment correlation coefficient between the matrix of summarized statistics for the sample and the matrix of summarized statistics for each previous typing sample in the stored profile of the selected user.

In Example 5, the subject matter of any of Examples 1-4 may optionally include, wherein comparing further comprises modifying the calculated Pearson product-moment correlation coefficient using parameterized weighting.

In Example 6, the subject matter of any of Examples 1-5 may optionally include, wherein the parameterized weighting is dependent upon externally configured values.

In Example 7, the subject matter of any of Examples 1-6 may optionally include, providing a visual representation of a comparison of the statistical summary of the typing sample representative data and the statistical summaries of previous typing samples of the selected user.

In Example 8, the subject matter of any of Examples 1-7 may optionally include, wherein the visual representation comprises at least one of a three-dimensional graphic, a Euclidean graphic, a vector graphic, a line graphic, an intersection graphic, and a mashup graphic.

In Example 9, the subject matter of any of Examples 1-8 may optionally include, wherein the geometric and geospatial constructs comprise Barycentric coordinate mathematics for computing pseudo-gravitational attraction parameters.

Example 10 can include, or may optionally be combined with the subject matter of any one of Examples 1-9 to include, subject matter (such as a method, means for performing acts, or machine readable storage medium including instructions that, when performed by a machine cause the machine to perform acts) comprising gathering data representative of a typing sample, the sample comprising a set of typing efforts of a user, the set of typing efforts representative of a string of keys typed by the user onto a keyboard; and receiving an indication whether the user is a selected user, wherein the indication has been generated by a comparison, using geometric and geospatial constructs, of a calculated statistical summary of the typing sample representative data to statistical summaries of representative data of previous typing samples in a stored profile of the selected user.

In Example 11, the subject matter of any of Examples 1-10 may optionally include, wherein the data representative of a typing effort comprise at least one of special key positions, KeyDown plus character plus time, KeyPress plus character plus time, KeyUp plus character plus time, and an identification object.

In Example 12, the subject matter of any of Examples 1-11 may optionally include, providing a visual representation of a comparison of the statistical summary of the typing sample representative data and the statistical summaries of previous typing samples of the selected user.

In Example 13, the subject matter of any of Examples 1-12 may optionally include, wherein the visual representation comprises at least one of a three-dimensional graphic, a Euclidean graphic, a vector graphic, a line graphic, an intersection graphic, and a mashup graphic.

In Example 14, the subject matter of any of Examples 1-13 may optionally include, wherein the geometric and geospatial constructs comprise Barycentric coordinate mathematics for computing pseudo-gravitational attraction parameters.

Example 15 can include, or may optionally be combined with the subject matter of any one of Examples 1-14 to include, subject matter (such as a system, apparatus, or device) comprising a processor and a memory device. The subject matter of Example 15 may also include a set of instructions stored in the memory device and executable by the processor to receive data representative of a typing sample, the sample comprising a set of typing efforts of a user, the set of typing efforts representative of a string of keys typed by the user onto a keyboard; calculate a statistical summary of the typing sample representative data; and compare, using geometric and geospatial constructs, the calculated statistical summary of the typing sample representative data to statistical summaries of representative data of previous typing samples in a stored profile of a selected user to generate an indication whether the user is the selected user.

In Example 16, the subject matter of any of Examples 1-15 may optionally include, wherein the data representative of a typing effort comprise at least one of special key positions, KeyDown plus character plus time, KeyPress plus character plus time, KeyUp plus character plus time, and an identification object.

In Example 17, the subject matter of any of Examples 1-16 may optionally include, wherein the instructions for calculating comprise instructions to assemble, for each typing effort in the typing sample, statistics comprising at least one of sequence, KeyUp minus KeyDown, overlap, overlap ordinal, KeyUp minus Last KeyUp, and KeyDown minus Last KeyUp; combine the assembled statistics for each typing effort of the sample; assemble a statistical summary of the sample, the statistical summary comprising at least one of count, average, coefficient of variance, average deviation, and standard deviation; and assemble a matrix of summarized statistics for the sample, the matrix comprising at least one of time between KeyUp and KeyDown, space between last KeyUp and next KeyDown, space between last KeyUp and current KeyUp, and standard deviation divided by average.

In Example 18, the subject matter of any of Examples 1-17 may optionally include, wherein the instructions for comparing comprise instructions to assemble a matrix of summarized statistics for each previous typing sample in the stored profile of the selected user, the matrix comprising at least one of time between KeyUp and KeyDown, space between last KeyUp and next KeyDown, space between last KeyUp and current KeyUp, and standard deviation divided by average; and calculate a Pearson product-moment correlation coefficient between the matrix of summarized statistics for the sample and the matrix of summarized statistics for each previous typing sample in the stored profile of the selected user.

In Example 19, the subject matter of any of Examples 1-18 may optionally include, wherein the instructions for comparing further comprise instructions to modify the calculated Pearson product-moment correlation coefficient using parameterized weighting.

In Example 20, the subject matter of any of Examples 1-19 may optionally include, wherein the instructions to modify using parameterized weighting use externally configured values.

In various embodiments, user authentication can be accomplished using embodiments of techniques implemented via typing cadence, gestures, and QR codes.

Passphrase

Classic passwords (e.g., passwords that a user must remember in order to be authenticated or to be granted access to a secured resource) may be discovered by others, may be inferred from widespread/repeated use in quasi-public social environments (e.g., social media sites), or may otherwise be obtained through hacking or some other illegal process. Password restriction is the practice of enforcing rules regarding password length and the use of special characters and punctuation marks in passwords. User frustration increases with password complexity, but less so with password length. Although well intended, complicated passwords and elaborate password expiration schedules do not increase security. A password consisting of a string of meaningful words is called a "passphrase." Passphrases reduce the weaknesses of classic passwords by making the string harder to crack (e.g., "guess") and by reducing user frustration with complex passwords.

Despite proclamations of the death of passwords, strong resistance remains to abandoning passwords altogether. A better solution to dealing with the weaknesses of classic passwords is by not requiring a user to remember the user's password, but instead to require the user to enter a usefully random password that is dynamically generated at the time of use (access), and which is then discarded. However, how can a user type such a "password" without knowing, a priori, what to type?

Passphrase is software that learns the user's finger movements over a keyboard during typing efforts and stores this information into a PCCHL associated with the user. The efforts within the PCCHL are analyzed for patterns, and muscle movement patterns of the user that are either predictably consistent or predictably inconsistent are identified. Passphrase then generates English (or any other language) phrases that feature one or more of the user's hallmarks, which are groups of characters of varying lengths that the user types accurately, consistently, and frequently, and which are reliably descriptive of the way that particular user types. Using a sentence construction engine and the generated phrases featuring the user's hallmarks, Passphrase creates a one-time authentication challenge (e.g., a short phrase or sentence) comprising a set of one or more generated phrases featuring the user's hallmarks. Passphrase prompts the user to type the one-time authentication challenge text and then compares the efforts, which the user expended in typing the one-time authentication challenge, to correlated effort metrics in the PCCHL associated with the user to determine whether the two sets of efforts statistically match.

By examining only the metrics of a user's typing efforts, which are stored in the user's PCCHL, Passphrase eliminates the requirements and weaknesses of classic passwords (e.g., a user having to remember a particular password). Because a generated password expires after a single authentication, the generated password is of no value in subsequent authentications, and thus does not need to be remembered nor kept secret. Furthermore, a generated password may be set to expire as a function of time, thus further securing the generated password.

The entries in a user's PCCHL may accumulate over time and reflect a capture process, which focuses on a consistent style of typing (e.g., the user's typing when using a particular program or particular type of program, such as Microsoft's Word and Outlook vs. Excel or some form-based program). Passphrase may access the user's PCCHL, and may compare the typing metrics in the one-time authentication challenge to corresponding typing metrics in the PCCHL, and may return a result (e.g., renders an opinion or a value) as to their similarity. Supplemental information in the result may indicate a quality of the statistics, so that a host device may take appropriate action based on at least one of the host device's risk tolerance, the sensitivity of the app, data, or process that is being protected, or other business rule considerations. In some example embodiments, after only a short period of deployment, the PCCHL will have sufficient usable data, thereby enabling Passphrase to generate a nearly limitless variety of confected sentences.

Some host devices may episodically use this one-time authentication challenge capability in connection with a specific request to secure data, a process, or an app. The host device may require a user to authenticate via the one-time authentication challenge, which may be set to appear at any time in any program, before launching a new app, or before exposing confidential data. Passphrase may communicate over web services and may present standard component-style interfaces for integration into existing software.

A user need not formally enroll into Passphrase. In fact, a user need not change the user's normal program/app usage. Passphrase inconspicuously tracks the user's typing behavior and stores the relevant metrics in the user's PCCHL.

Figure 8A:
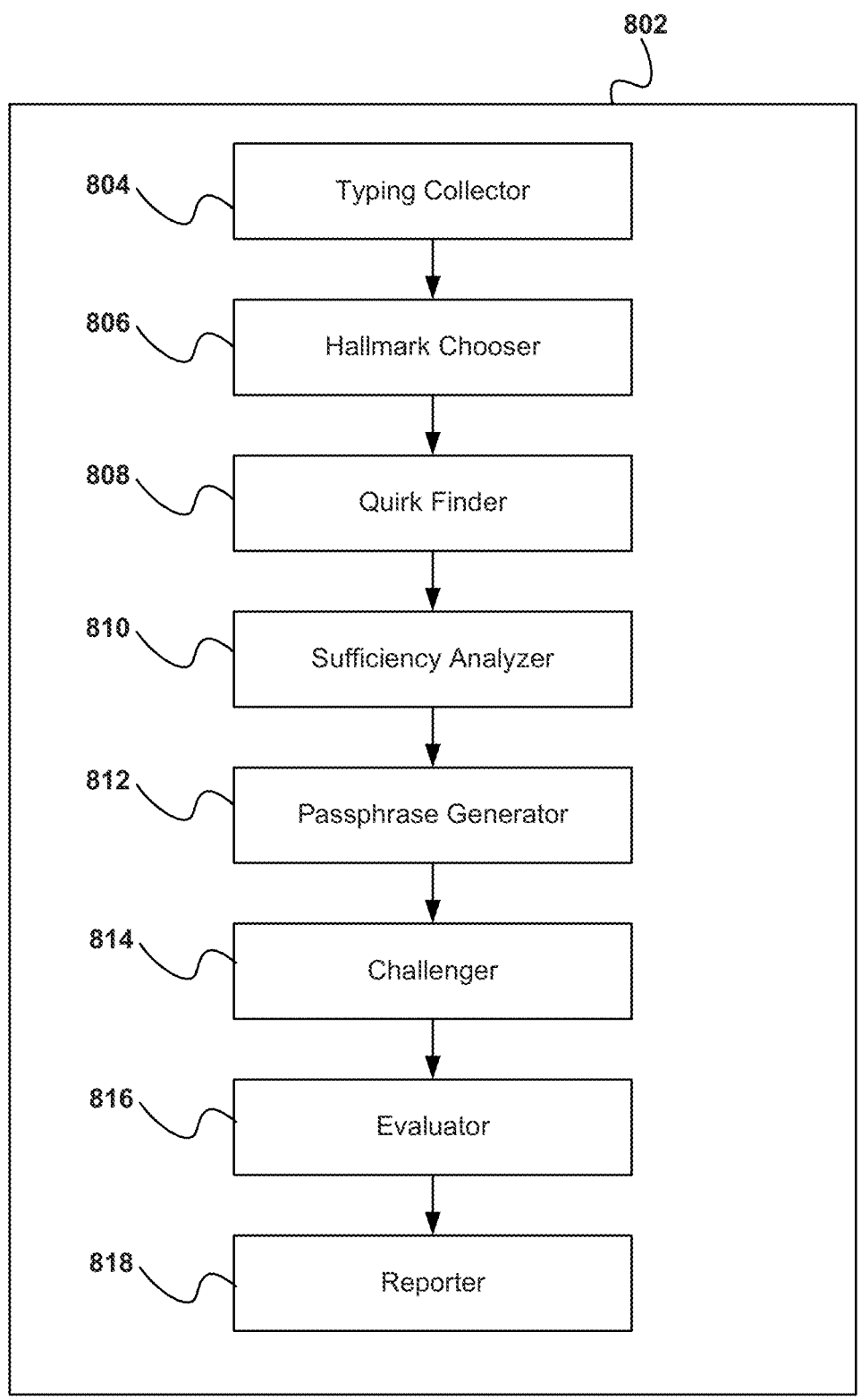
FIG. 8A illustrates components of a passphrase system, in accordance with various embodiments.

FIG. 8A illustrates components of the Passphrase system 802, according to an embodiment. Passphrase 802 may be comprised of eight components: (1) a typing collector 804, (2) a hallmark chooser 806, (3) a quirk finder 808, (4) a sufficiency analyzer 810, (5) a passphrase generator 812, (6) a challenger 814, (7) an evaluator 816, and (8) a reporter 818.

(1) Typing Collector

The Typing Collector obtains metrics about the physical activity involved in a user touching keys on a keyboard. In an embodiment, the Typing Collector does not capture any content (e.g., Typing Collector stores no source text); thus, Typing Collector does not create privacy concerns. The Typing Collector may run as a standalone program, which may be activated whenever a user's PCCHL needs to be created or modified. A PCCHL is unique to a particular user because a PCCHL contains captured identifying behavior patterns, which are unique to each person. The Typing Collector may run as an installed application, or it may run as a web application. In general, latency from a slow Internet connection does not cause difficulties for Passphrase. The metrics that Passphrase uses may be captured by the Typing Collector. These metrics can include a) 100 ns timestamps associated with the KeyPress, KeyDown, and KeyUp events, b) a hashed representation of various groups of characters in text (e.g., the "hallmarks") that compose the words, and c) selected text or typing activity surrounding the words that the user typed. The Typing Collector may also note the position of each hallmark within words and sentences, along with overall information about the speed at which each hallmark was typed. The Typing Collector may also collect intra-sample timing "overlaps," which occur during the actuation cycles of temporally adjacent keystrokes, and the status of the "PNACS keys" (the Caps Lock key, the Num Lock key, the Alt key, the Control key, and the Shift key).

(2) Hallmark Chooser

Theoretically, a large number of potential hallmarks may be associated with every typing sample. A hallmark may be an n-length string of characters selected because of the distinctive behavioral effort involved in typing the hallmark. Hallmarks may overlap each other.

The entire collection of hallmarks represents a rich source of data for mining users' personal typing patterns. For example, the five character string "ABCDE" (unrealistically short, of course, but used here only as an example) may have one or more of these 15 candidate hallmarks: A, B, C, D, E, AB, BC, CD, DE, ABC, BCD, CDE, ABCD, BCDE, and ABCDE itself. When data from PNACS keys' movements as well as preceding and trailing characters is included, the number of potentially usable hallmarks may become quite large. The Hallmark Chooser may use one or more of several filtering algorithms to select reliably coherent, as well as reliably incoherent, strings—those strings, which occur with sufficient frequency that a reasonable number of them may be fairly anticipated to occur in a normally-typed sample of a user's totality of typing, assuming that a reasonable amount of text exists in the total population of typed characters. The ratio of the number of reliable hallmark samples compared to the total character count in the entire population of typing may form the primary basis for the designation of a character group as being a statistically usable hallmark.

The Hallmark Chooser may use a sentence construction engine, which may have a vocabulary of over 800,000 nouns, verbs, adjectives, and adverbs, as well as selected other parts of speech, to choose hallmarks. The Hallmark Choose may also have zero or more of the following features:
  anonymous personalization
  counterculture to current trend to randomize passwords and make them complicated
  uses logic to select what is ideal in Passphrase to validate
  chooses phrases from rosters of popular sayings
  varies the length of the word and the number of repetitions to hone the answer
  accidental key repeat auto-press
  computes implied finger travel from timings of long-run pairs
  timings of hyphens and semi-colons included
  keyboard travel speed to see what is impossible/improbable for single-finger typists
  includes length of key hold
  includes timings for overlap/shift—tied into finger travel
  propensity to use Caps Lock for long-capped strings
  space surrounding timings
  space timings (3) Quirk Finder A quirk is a spurt of typing that a user performs consistently, frequently, and that has resulted in errors or were executed at significantly varying speeds. The Quirk Finder searches text looking for elusive quirks—mistake strings which are frequent and significant enough to merit being cataloged as idiosyncratic. In contrast to the Hallmark Chooser, which strives to find as many hallmarks as possible, the Quirk Finder is much more selective because a normal user typing normally is believed to intend accuracy, whereas quirks represent finger movement failures, which a normal user is believed to intend to minimize. Hence, the probability of the occurrence of quirks is relatively lower than for hallmarks. Furthermore, the probability of encountering a quirk during the typing of a short-burst challenge phrase is low. Since Passphrase is concerned with distinguishing the cadence of typing efforts (rather than identifying the letters) in text patterns, should quirks occur in the overall user-typed character population, and also occur during the creation of the challenge phrase, that fact would be particularly significant.

(4) Sufficiency Analyzer

The purpose of the Sufficiency Analyzer is to calibrate the adequacy of the source text composing the PCCHL for use in reporting the statistical probability of a match between the PCCHL text and the text that the user types in the challenge phrase.

The Sufficiency Analyzer addresses two foundational requirements concerning the statistics of probability: (1) truly random sampling, and (2) having enough data. The Sufficiency Analyzer also investigates the following potential problem areas in the PCCHL that might affect the usability of the results:
  Failed collection plan and/or collection circumstances.
  Differing nature of the designated PCCHL text. Ideally, the same source application type (e.g., Microsoft Outlook) would be designated for the PCCHL text, although applications that have the same basic typing behavior (e.g., Microsoft Outlook and Microsoft Word) will also work.
  A full range of characters is preferred (unlike Microsoft Excel, which normally has mostly numbers).
  Special characters are ignored (e.g., function keys, numeric keypad, etc.)
  Measuring text metrics entropy. An infinite amount of typing over an infinite amount of time produces unremarkable (e.g., non-user-defining) data. Not enough typing causes the statistics to fail, whereas too much typing causes the data to fail. The Sufficiency Analyzer searches for this "Goldilocks Zone."

(5) Passphrase Generator

Hallmarks are more often letter groups than complete words. A challenge phrase is composed of an easy-to-type noun-verb-object text string, which makes it easy for the user to type the challenge in a natural way (e.g., without having to pause to remember a complicated series of words, or to have to memorize complex strings of characters which are not words and thus require the effort of thinking in addition to the reflexive, mostly involuntary effort of habitual typing.) Passphrase's typical operating mode is to measure keyboard effort, not the identity (e.g., accuracy) of characters typed. Using the sentence construction engine, Passphrase randomly selects whole words that feature a user's hallmarks, deploying them in a corresponding sequential position according to metrics of the user's PCCHL. For example, if a hallmark was "gh" and located in a word-ending position (i.e., at the end of a word), then words like "cough," "enough," "breakthrough," "thorough," "laugh," etc., words with similar endings, or words that contain a positional variation (e.g., "ghost"), would be candidates for a challenge phrase. The Passphrase generator may propound a variety of short, everyday-like sentences using hallmarks, unknown to the user, to sift effort metrics.

The Passphrase generator may also generate non-hallmark-bearing phrases, for example when multiple challenges are warranted.

(6) Challenger

The Challenger requests everyday-style sentences from the Passphrase generator. The user is presented (e.g., visually on a display, aurally by playing the sentence aloud through a text-to-speech system, etc.) with the random sentence(s) and asked to type the presented random sentence(s). The Challenger may have a set of "guardrail" rules, so that the Challenger has the ability to reject typing efforts before they are submitted to the Evaluator. The Challenger records both the hallmark and quirk metrics of the user's typing efforts and passes them to the Evaluator for statistical evaluation.

(7) Evaluator

The Evaluator compares the metrics returned by the Challenger to the associated metrics in the PCCHL, attempting to match hallmarks using various statistical techniques. In an embodiment, both the challenge phrase and the associated PCCHL metrics must each successively meet these statistical tests (the italicized adjectives below are subject to tuning parameters):

- There must be enough source characters in each sample. Since the Passphrase Generator will create the challenge phrase, this will normally be the case.
- Intra-sample hallmark consistency is required. Less than 20% of all hallmark candidates will be used (although this threshold is tunable by the host app). The availability of quirks is a function of the user's typing—no typing mistakes equals no quirks. Catching a matching quirk is a significant statistical plus.
- There must be enough qualifying hallmarks in each sample. By definition, the challenge phrase has hallmarks; also by definition, the PCCHL has those same hallmarks (this is required to create the challenge phrase in the first place). However, the hallmarks must be typed with an effort close enough to the expected pattern to qualify.
- Qualifying hallmarks must represent a sufficient percentage of the overall typing in each sample.
- There must be enough overlapping qualifying hallmarks between the sample phrase and the PCCHL.
- There must be sufficient combined hallmarks as a percentage of overall challenge size.

(8) Reporter

The Reporter assesses the results returned by the Evaluator. The Reporter may be programmed to: (1) reject results conclusively, (2) require another challenge phrase effort, possibly with a longer challenge phrase; or (3) start the process over again. The results are returned with numerical and/or graphical information to assist the host application in determining a probability that the typist who typed the challenge phrase is the same person who created the host-selected PCCHL.

Figure 8B:
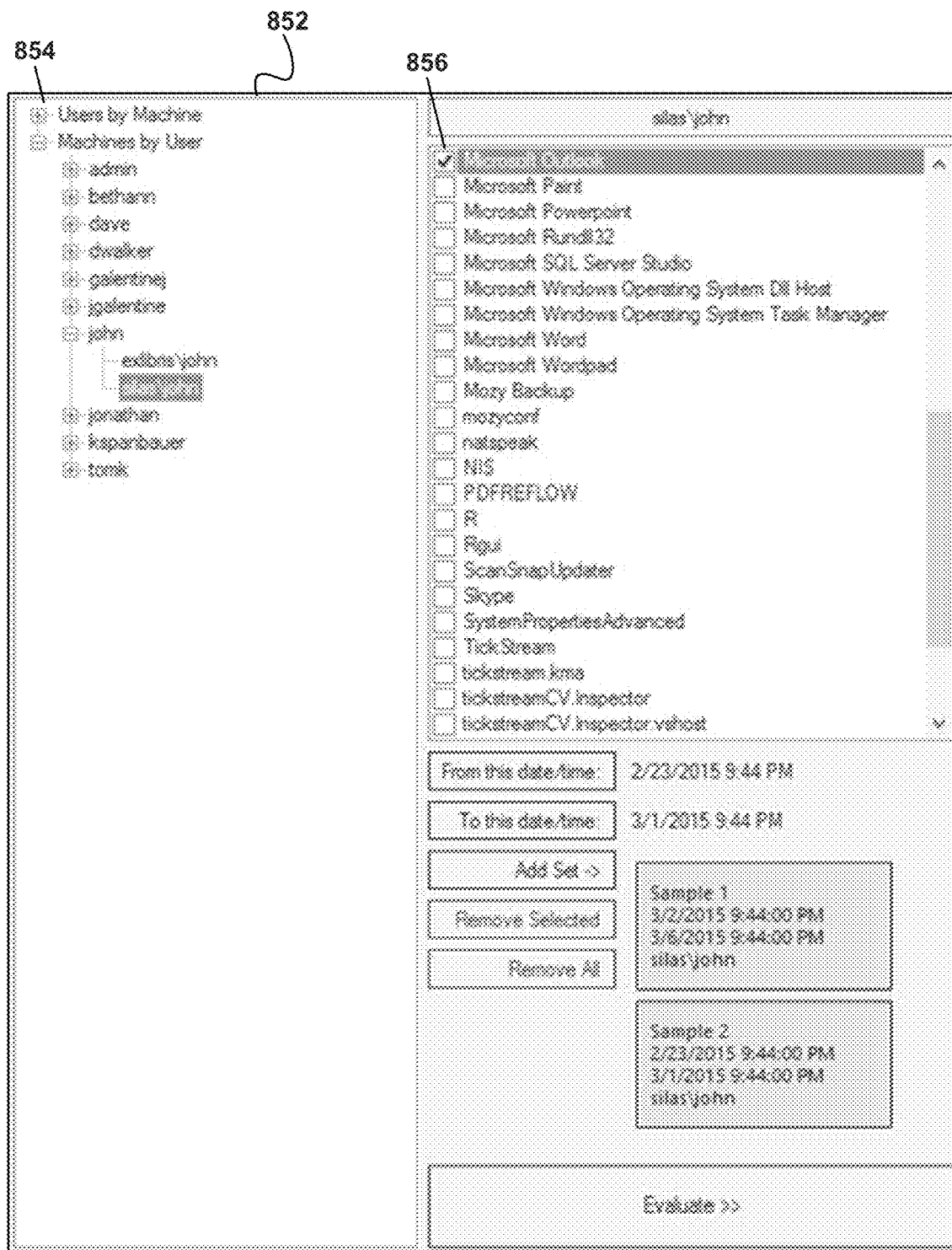
FIG. 8B illustrates a user interface (UI) control that may be used to designate the previously collected cadence and habit library (PCCHL) text source(s) to be used and display an overview of data collected during a typing collection session, in accordance with various embodiments.

FIG. 8B illustrates a user interface (UI) control 852 that may be used to designate the PCCHL text source(s) to be used and display an overview of data collected during a typing collection session, according to an embodiment. The tree control 854 on the left may be used to select a user/machine combination, which causes a list of Checkboxes to be displayed on the right. Each Checkbox represents an application that has executed on the user/machine combination while the Typing Collector was active.

Figure 9:
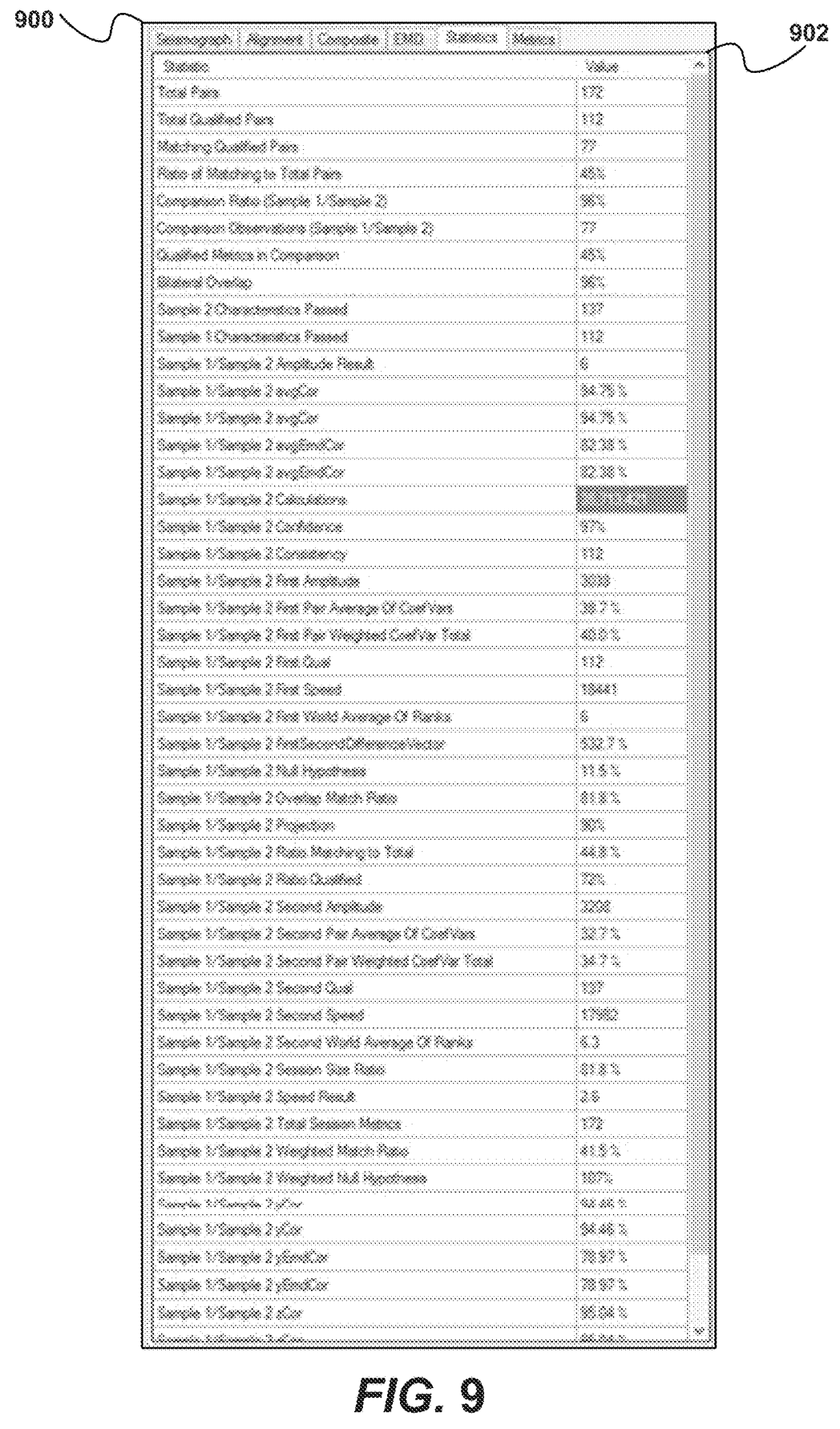

FIG. 9 illustrates a visual output 900 including an example table 902 that displays data of performance metrics created during the process of evaluating the challenge phrase against the user's PCCHL, according to an embodiment. Many of these data, particularly the Empirical Mode Decomposition (EMD) percentages, are single-number indicators of a likely match.

Figure 10:
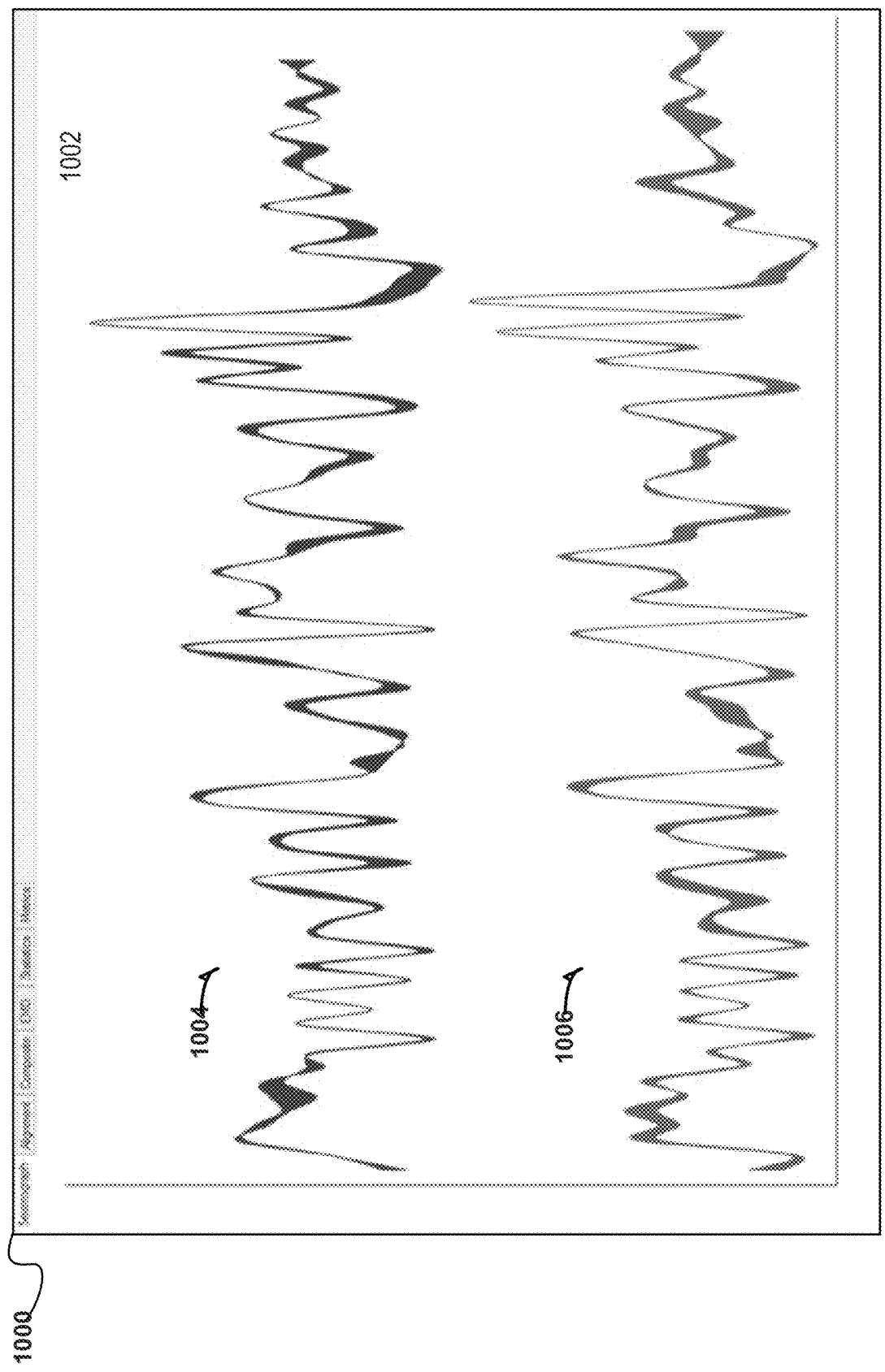
FIG. 10 illustrates a visual output including a graph of hallmarks, in accordance with various embodiments.

FIG. 10 illustrates a visual output 1000 including a graph 1002 of hallmarks, according to an embodiment. The graph 1002 displays the behavior patterns across the most significant hallmarks encountered in the challenge phrase sample and the PCCHL as lines 1004, 1006, respectively. Although lines 1004, 1006 will almost never be identical, even a brief glance at these two lines 1004, 1006 suggests that they reflect typing efforts of the same person.

Figure 11:
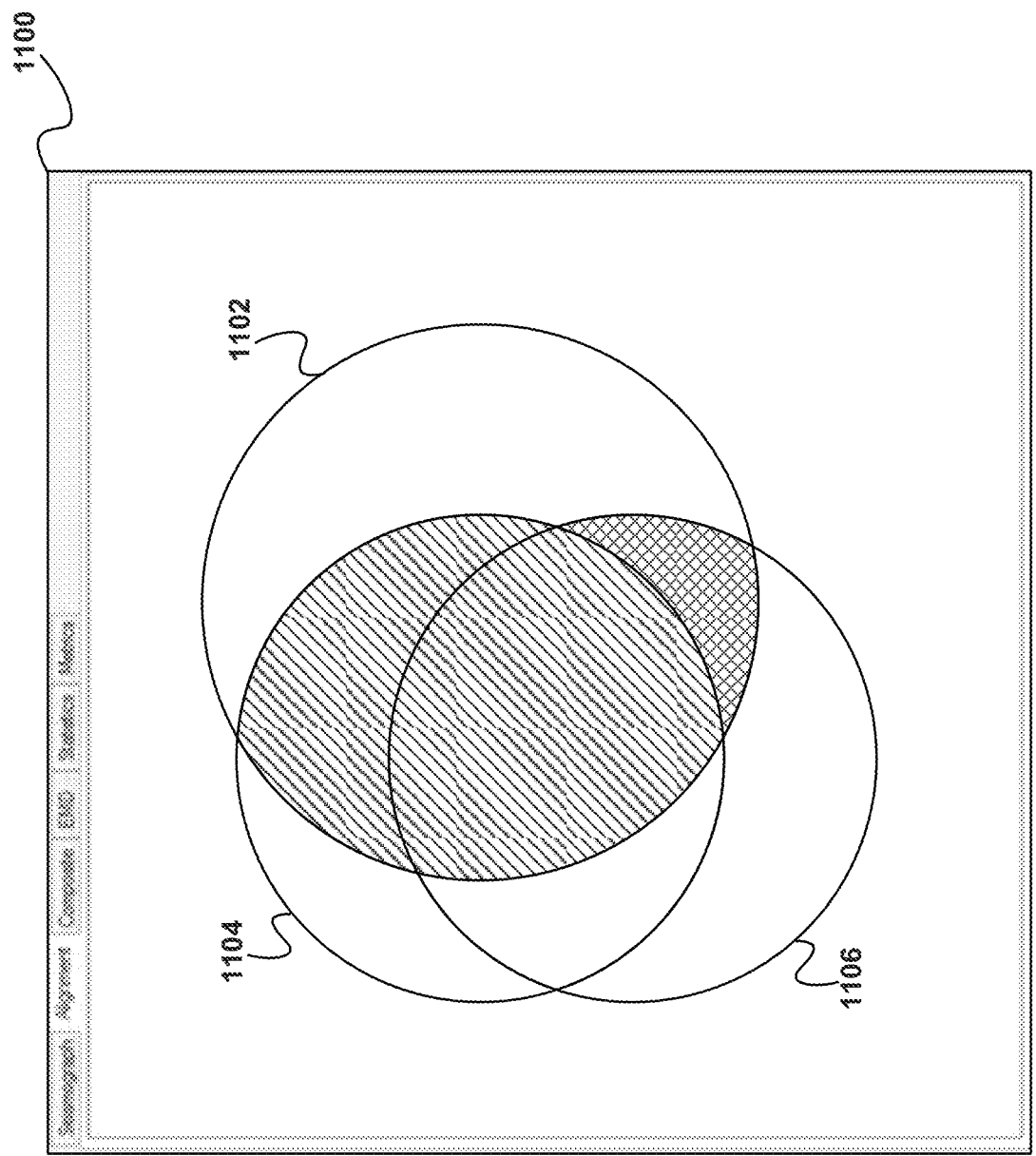
FIG. 11 illustrates a visual output including an alignment graph displaying overlap between a challenge phrase and a PCCHL, in accordance with various embodiments.

FIG. 11 illustrates a visual output 1100 including an alignment graph 1100 displaying overlap between a challenge phrase and a PCCHL, according to an embodiment. Circle 1102 reflects the total number of candidate hallmarks, circle 1104 reflects the number of hallmarks in the challenge phrase sample, and circle 1106 reflects the number of hallmarks in the associated PCCHL. Statistical data may be displayed, such as the percent of the total hallmarks each circle 1104, 1106 composes and the degree of overlap between circles 1104, 1106.

Figure 12:
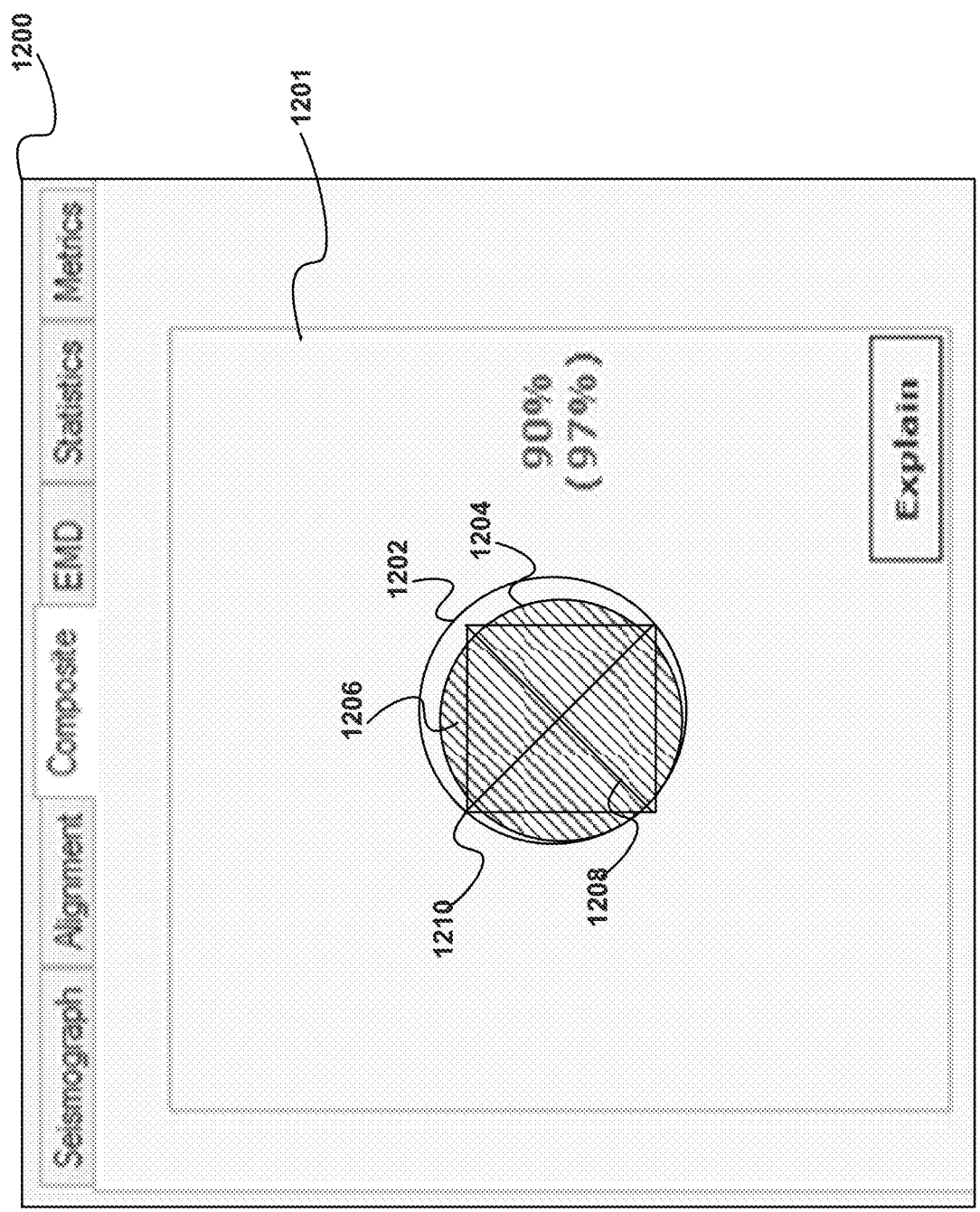
FIG. 12 illustrates a visual output including a composite graphic of graphical elements which, together, visually depict the nature of the match between a challenge phrase sample set and an associated PCCHL, in accordance with various embodiments.

FIG. 12 illustrates a visual output 1200 including a composite graphic 1201 of graphical elements which, together, visually depict the nature of the match between a challenge phrase sample set and an associated PCCHL, according to an embodiment. Included in the graphic 1201 is a first circle 1202, a second circle 1204, an overlap zone corresponding to the overlap between the first circle 1202 and the second circle 1204, an X, and a bounding box 1210, which may change in size and/or sheer. There are also two percentages, which depict the results of a series of complicated statistical computations into numbers that are referred to as "fidelity" and "confidence," which are terms that do not correspond to formal definitions in the world of statistics. "Fidelity" and "confidence" should be viewed together. Values for "fidelity" and "confidence" at either end of the 0-100 spectrum reflect reliability, whereas values in the 40-60 range reflect uncertainty.

Figure 13:
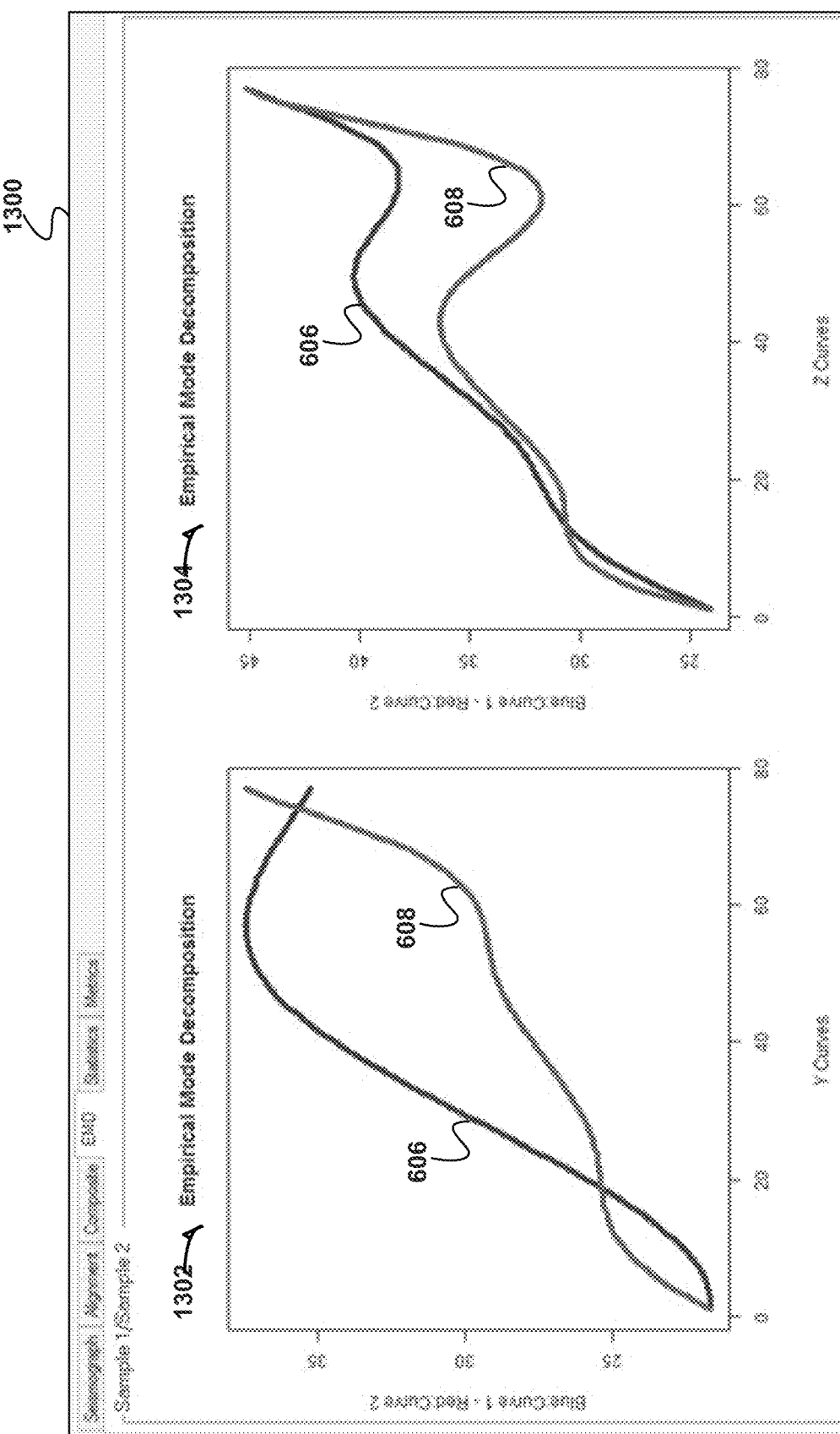
FIG. 13 illustrates a visual output including two respective graphs for the Empirical Mode Decomposition of the challenge phrase and the associated PCCHL, in accordance with various embodiments.

FIG. 13 illustrates a visual output 1300 including two respective graphs 1302, 1304 for the Empirical Mode Decomposition (EMD) of the challenge phrase and the associated PCCHL, according to an embodiment. The two graphs 1302, 1304 may be compared visually by using certain statistical smoothing techniques on the challenge phrase data set and the associated PCCHL efforts. These graphs 1302, 1304 produce "correlation" numbers that are single-number probabilities that the typist who typed the challenge phrase is the same person who created the host-selected PCCHL.

Figure 14:
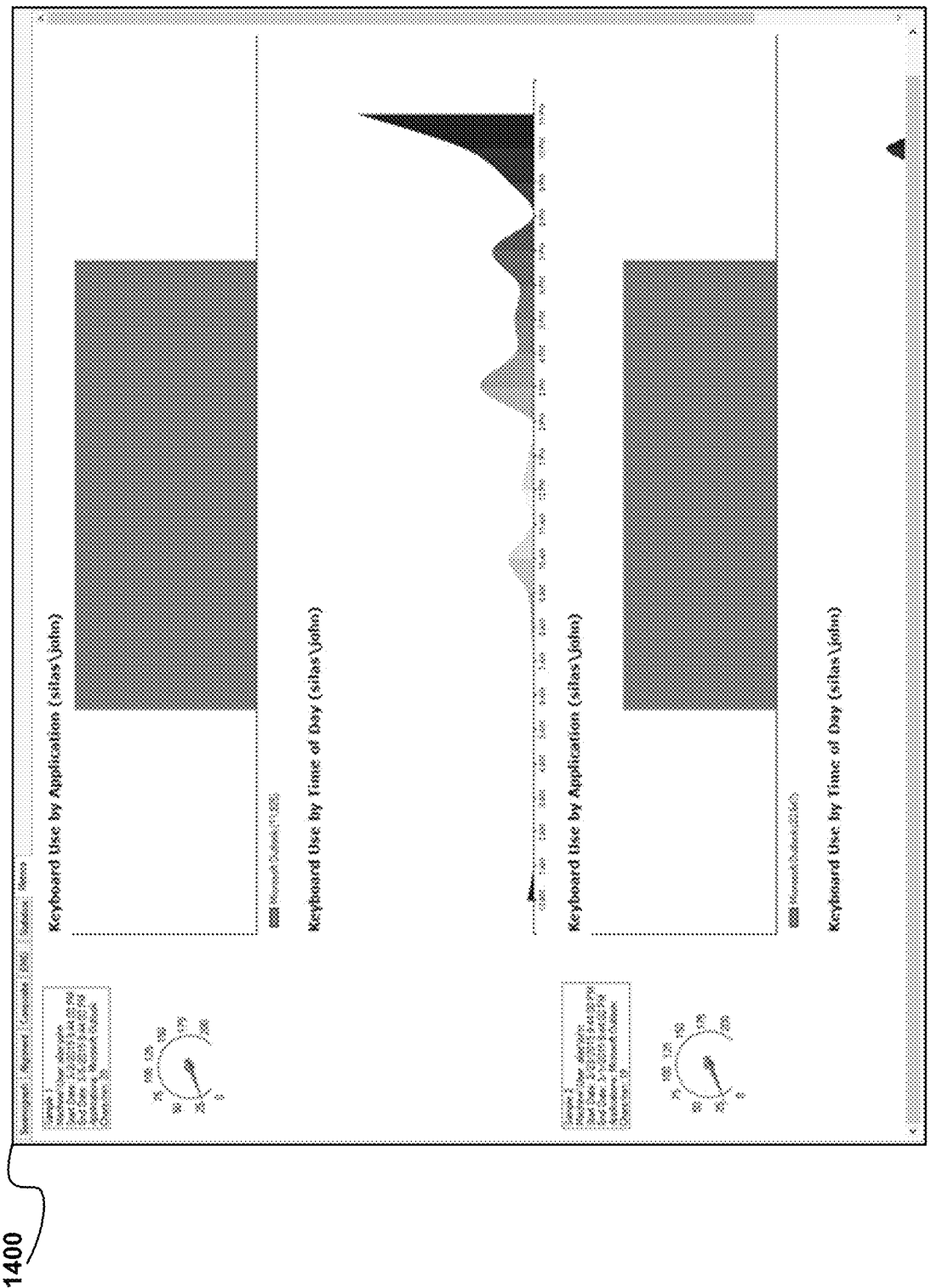
FIG. 14 illustrates a visual output displaying additional statistics produced by the Passphrase system, in accordance with various embodiments.

FIG. 14 illustrates a visual output 1400 displaying additional statistics produced by the Passphrase system 1402, according to an embodiment. Passphrase 1402 may produce statistics that describe many behavioral traits exhibited during the typing of the challenge phrase and the associated PCCHL. For example, FIG. 14 illustrates the display of the overall typing speed and the time of day (on a 24-hour clock), etc.

Figure 15:
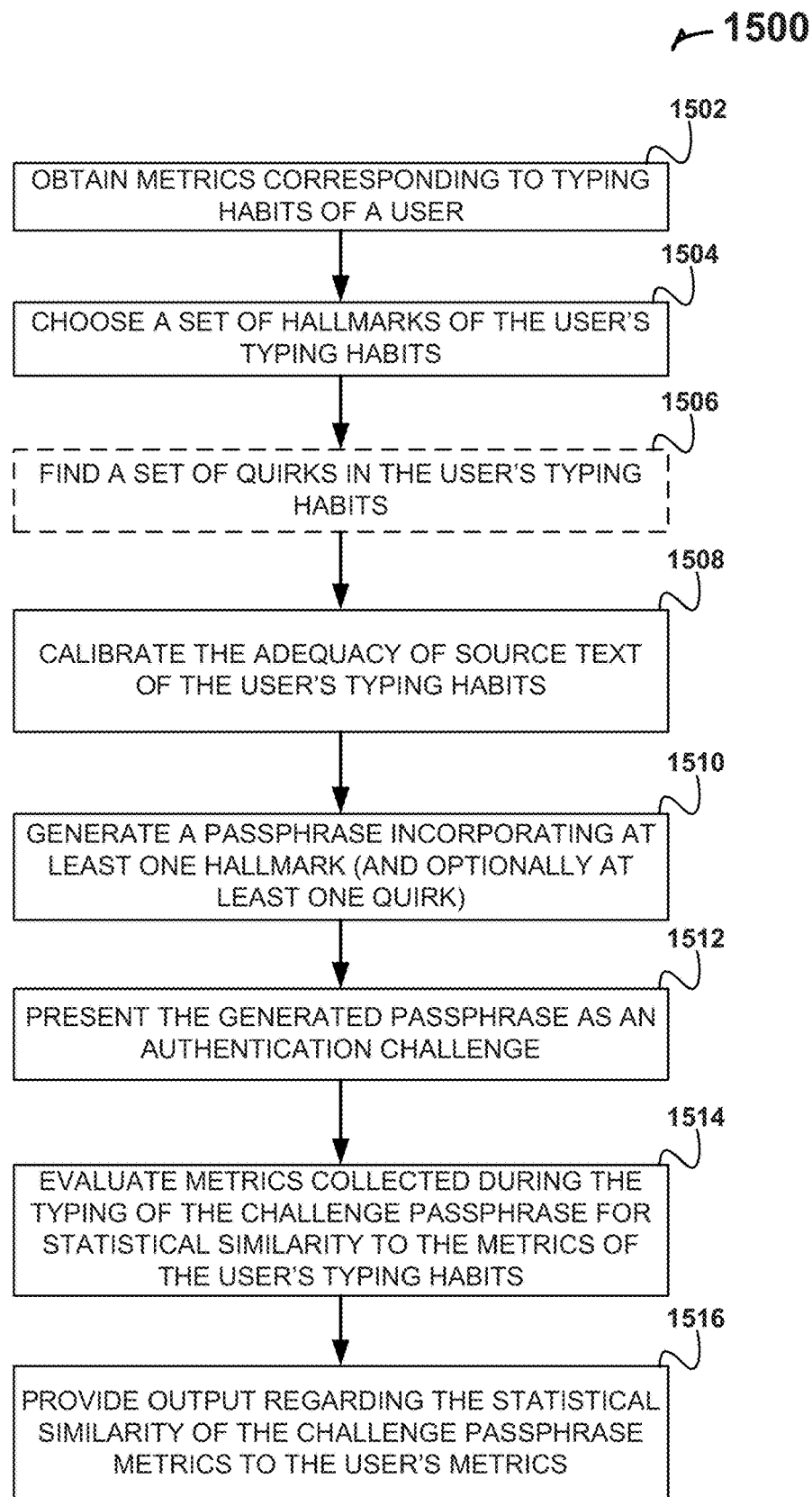
FIG. 15 is a flowchart of a method for user authentication via the Passphrase system, in accordance with various embodiments.

FIG. 15 is a flowchart of a method 1501 for user authentication via the Passphrase system, according to an embodiment.

- Metrics corresponding to the typing habits of a user are obtained (operation 1502).
- A set of hallmarks of the user's typing habits are chosen (operation 1504).
- Optionally, a set of quirks in the user's typing habits are searched for and found (operation 1506).

The adequacy of source text (e.g., PCCHL) of the user's typing habits is calibrated (operation 1508).

A passphrase is generated incorporating at least one hallmark of the set of hallmarks (operation 1510). Optionally, the generated passphrase includes at least one quirk.

The generated passphrase as an authentication challenge (operation 1512).

Metrics collected during the typing of the challenge passphrase are evaluated for statistical similarity to the metrics of the user's typing habits (operation 1514).

Output regarding the statistical similarity of the challenge passphrase metrics to the user's metrics is provided (operation 1516).

Gestures

A growing percentage of the world's commerce is conducted via mobile technology, particularly smartphones. These transactions need to be protected just as much as traditional e-commerce transactions using non-mobile technology. A common approach for securing e-commerce transactions has been to use software-generated, one-time use passcodes. However, one-time use passcodes do not provide true authentication of a person, but rather simply verify a person's possession of a token. Furthermore, automatically generated tokens may be easily intercepted and relayed, for example by malware or man-in-the-middle attacks.

A number of new approaches for securing mobile e-commerce transactions currently exist or are in late-stage development in the market, including (a) simulating numeric keypads with advanced touch-detection electronics, (b) one-time use passcodes sent by text messaging (e.g., SMS), (c) advanced screen components and processing services that may accurately read fingerprints (e.g., "fingerprint scanners"), and (d) drawing pattern recognition. These approaches, however, each have their drawbacks. For example, a drawn pattern may be seen by other people as it is being drawn, either in person or via image capturing equipment (e.g. video cameras), and may be described to others by word-of-mouth. If a drawing pattern is so complicated that it cannot be easily observed or described, then it is likely that the user attempting authentication will have difficulty recreating this drawing pattern dependably, and thus will encounter failure to acquire ("FTA") problems. Conversely, if the pattern is simple, the pattern will be easy for others to replicate, and thus insecure.

The mountains of data—often exceeding 10,000 points from even sketching a simple circle—involved in just one finger movement of an authentication gesture may be successfully processed using the disclosed geospatial/Barycentric techniques that have previously been applied to keyboard typing. The effort of making the drawing is quantified, rather than the visual results/appearance of the drawing. Just as a potential impostor may observe a user typing the user's passcode but cannot physically type the passcode with the same typing cadence as the user (thus rendering moot the potential impostor's knowledge of the user's passcode), a potential impostor may observe a user's gesture, but cannot physically perform the gesture as the user does (thus rendering moot the potential impostor's knowledge of the user's gesture). Similar to using typing cadence versus typed characters for authentication, authentication using gesture efforts versus gesture sketches is a superior approach.

In an embodiment, the gesture authentication capability may be a separate application/app executing on a host device, or may be integrated into other applications/apps executing on the host device. Gesture authentication may be divided into three steps: (1) capturing the gesture metrics; (2) evaluating an instance (e.g., "sketch") for a match against a PCCHL; and (3) reporting statistics of the evaluation to the host device. Deployments of gesture authentication generally fall into one of three scenarios: (1) all components executing on the host device; (2) capturing gesture metrics on the host device and the evaluation process executing remotely, with data exchange occurring via web services; and (3) capturing gesture metrics on the host device, and the evaluation process executing either locally on a PC or remotely on a server.

The enrollment process (e.g., capturing the base metrics for the PCCHL) involves the user first drawing a sample sketch of the sketch the user would like to use for future authentications. As with typing, this sample sketch should reflect comfortable movement by the user and should be simple enough to be remembered by the user. Some users may want to use long/complicated gestures; however, such gestures are not likely to be successful in everyday use; thus, a set of complexity limits may be imposed upon the enrollment process. As with typing, the simpler a gesture is, the better. After the sample sketch has been accepted, the user creates a PCCHL of substantially similar sketches. Each substantially similar sketch in the PCCHL serves as its own "White Hat" test, ensuring that the user can draw the sketch repeatedly and easily by making an acceptably similar effort.

This gesture authentication technique is unique in at least two ways. First, this gesture authentication technique effectively ignores the shape and appearance of the drawing, and instead looks to the effort of creating a similar drawing. Second, this gesture authentication technique processes metrics using a concept found in quantum physics: the graviton. A host device (e.g., a smartphone) during the course of one gesturing effort generates so many numbers across so many different degrees of freedom that the numbers must be processed as assemblages of clusters. Clusters, in turn, are composed of weighted rollups of smaller metrics groups—gravitons. Each "graviton" is composed of the combination of elements $t_0$-X-Y-Z-R-P-Y-La-Lo-Al-V-F-$t_n$ (e.g., start time, X-Axis, Y-Axis, Z-axis, Roll, Pitch, Yaw, Latitude, Longitude, Altitude, Velocity, Force, end time). The "glue" that holds these elements together is evidence of how each element was introduced into the sketch—the process and mechanics of the drawing effort. The proximity of these graviton clusters, coupled with the density of their mass, can be thought of as creating a form of gravity. The stronger the gravity is, the stronger the attraction is . . . and, thus, the stronger the affinity of the effort that created those clusters. Thus, sufficient affinity equals authentication.

This gesture authentication technique offers the benefits of a gradient result, bookended by absolutes, thus providing the host device with the option to permit n number of retries based on how close the drawing effort came to the expected metrics in the PCCHL.

Figure 16:
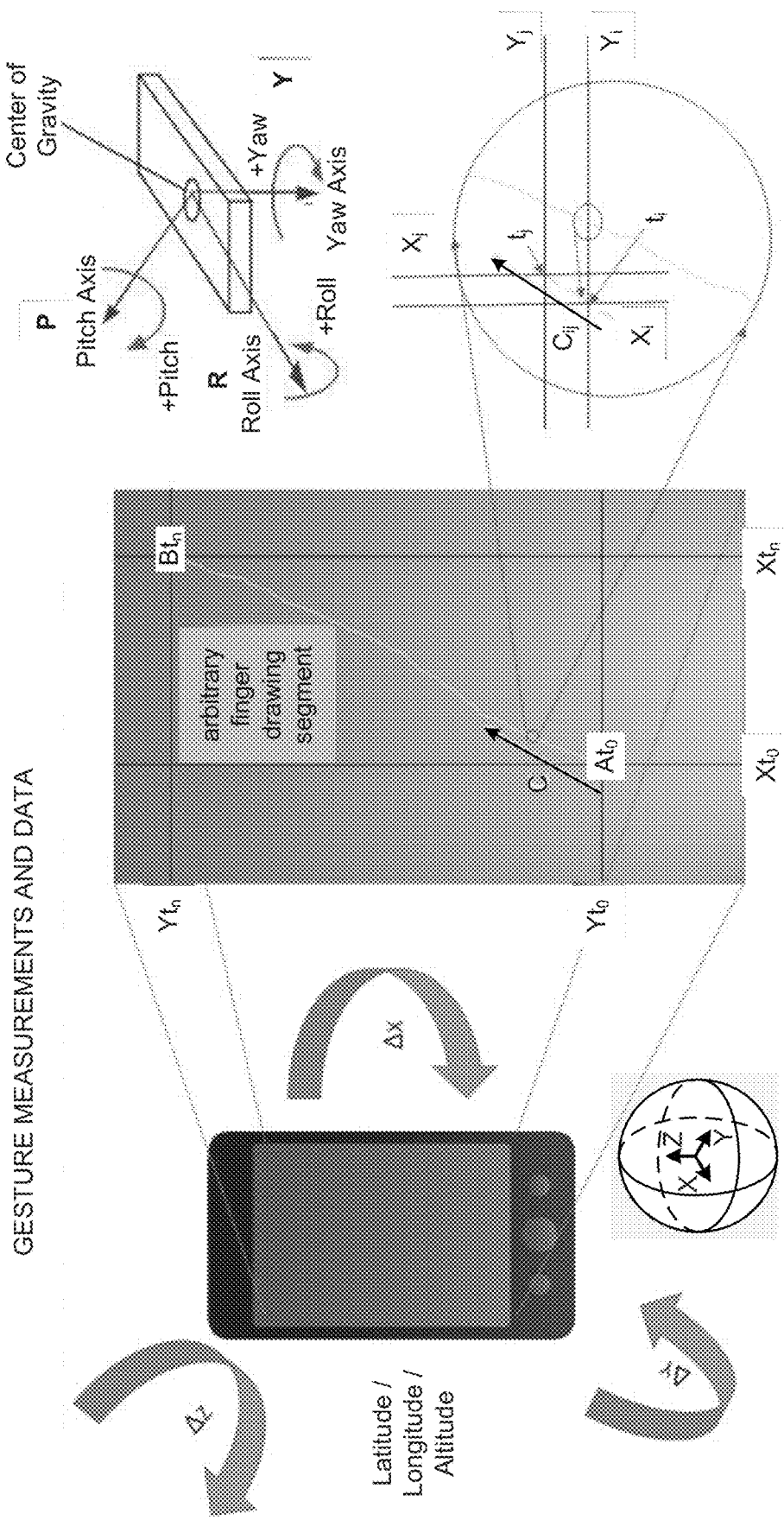
FIG. 16 illustrates some of the metrics collected during a gesture authentication attempt, in accordance with various embodiments.

FIG. 16 illustrates some of the metrics collected during a gesture authentication attempt, according to an embodiment. During the authentication sketch, the gesture authentication technique collects metrics produced by one or more devices integrated within the host device. Examples of such devices include accelerometers, gyroscopes, compasses (e.g., magnetometers), etc. The metrics produced by these devices and collected during the authentication sketch may be used in the evaluation/comparison of the authentication sketch against the PCCHL, and may be determinative of the host's decision whether to authenticate the user drawing the sketch. For example, user A's PCCHL includes metrics that indicate user A holds a smartphone at approximately 35° during user A's authentication sketches. If a user attempting to authenticate as user A did not hold the smartphone at approximately 35° during the user's authentication sketch, the gesture authentication technique may deny access to the user despite the user successfully reproducing user A's authentication sketch.

Figure 17:
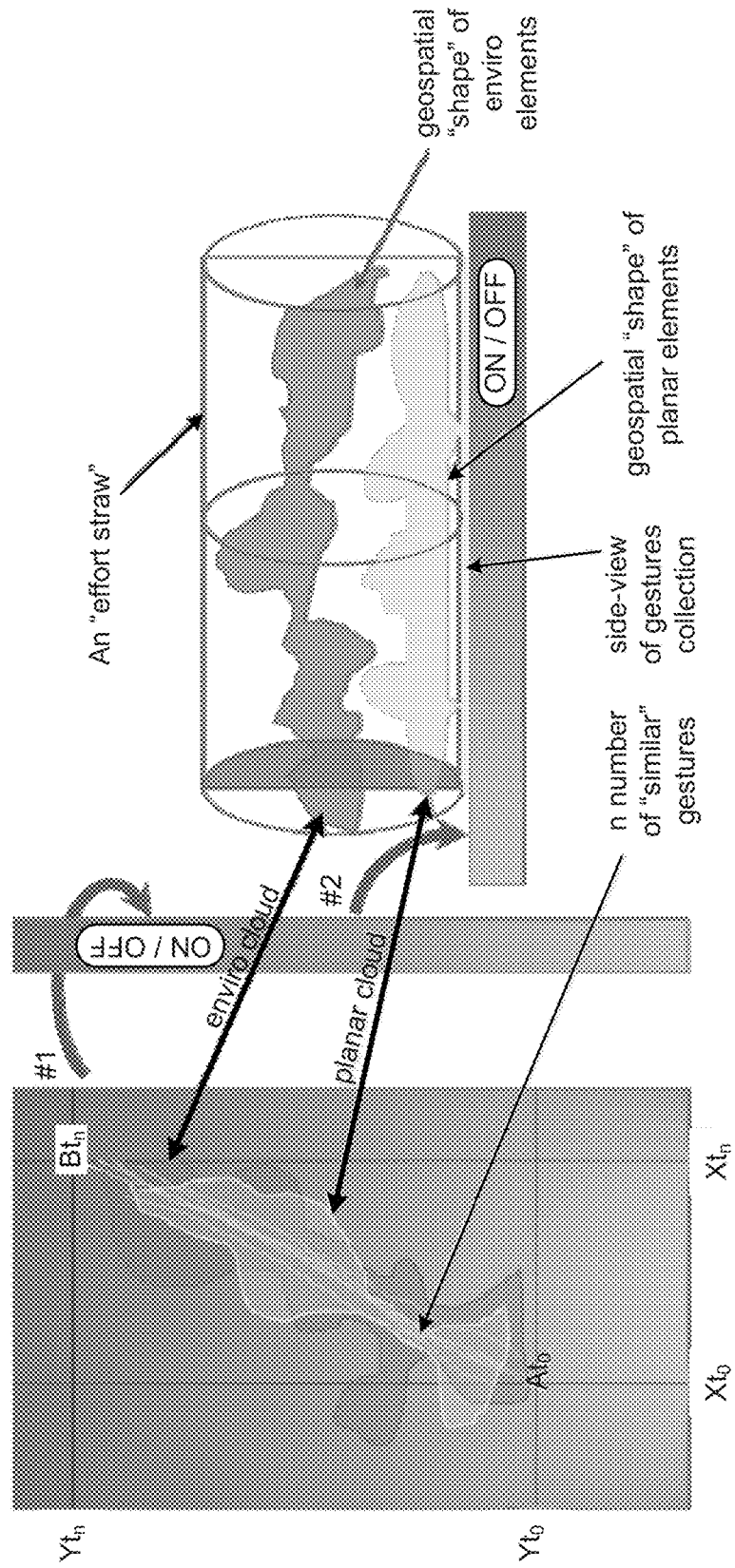
FIG. 17 illustrates converting metrics collected during the gesture authentication attempt into an "effort straw," in accordance with various embodiments.

FIG. 17 illustrates converting metrics collected during the gesture authentication attempt into an "effort straw," according to an embodiment.

Figure 18:
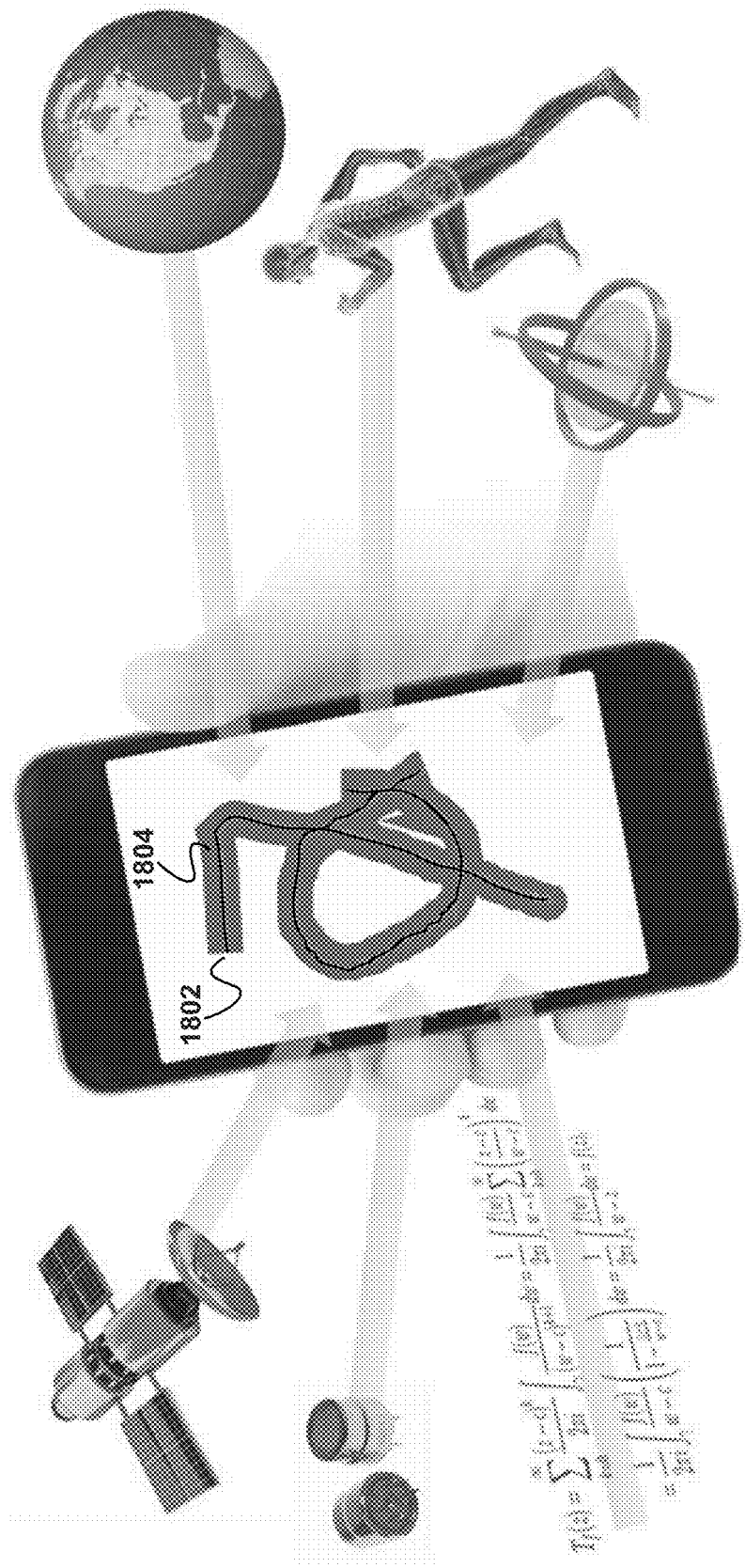
FIG. 18 illustrates a gesture composition during an authentication enrollment of a user, in accordance with various embodiments.

FIG. 18 illustrates a gesture composition during an authentication enrollment of a user, according to an embodiment. The drawn gesture 1802 is the gesture a user entered as the user's unique gesture during enrollment into the gesture authentication system. After entering the drawn gesture 1802, the system calculates the "effort straws" 1804 that correspond to the drawn gesture 1802.

Figure 19:
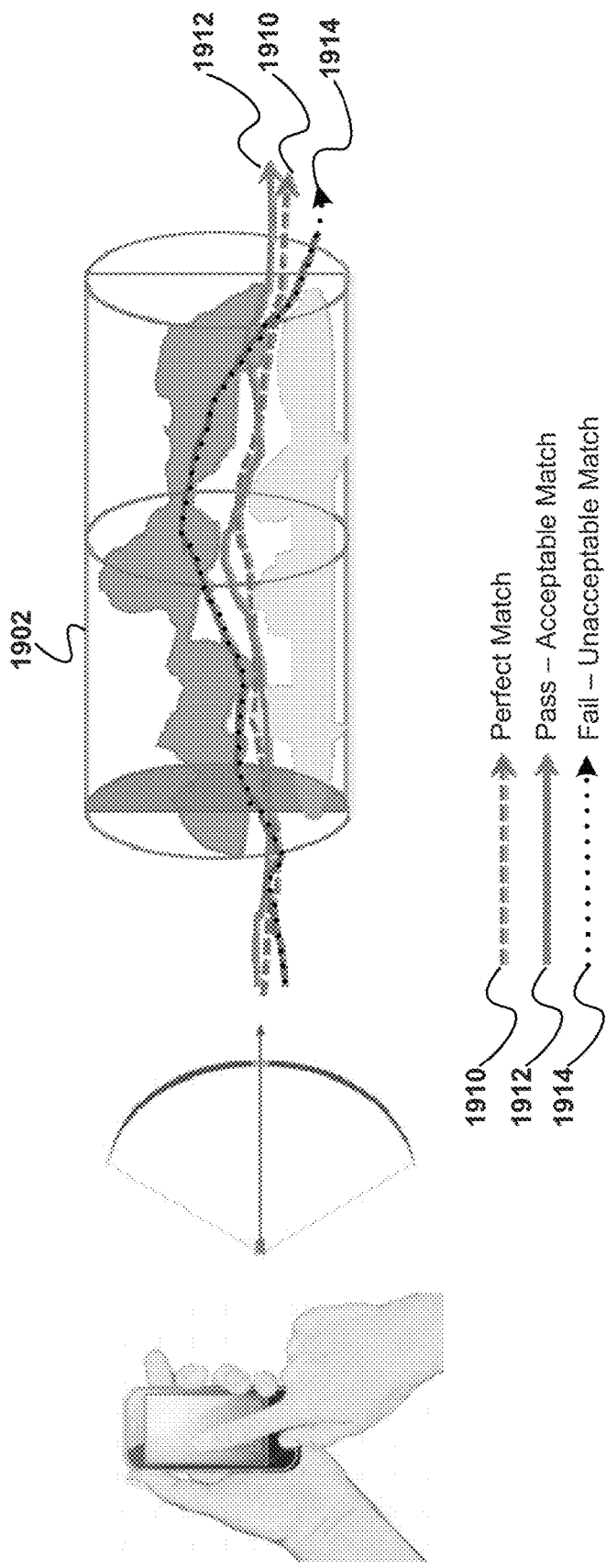
FIG. 19 illustrates authentication gestures evaluated by an effort straw, in accordance with various embodiments.

FIG. 19 illustrates authentication gestures evaluated by an effort straw 1902, according to an embodiment. When a user attempts authentication via an authentication gesture, the gesture authentication system evaluates the authentication gesture through the effort straw 1902 previously calculated and stored in the user's PCCHL. The geospatial/Barycentric algorithms evaluate the data corresponding to the authentication attempt and determine whether the authentication attempt was sufficiently within the effort straw 1902 stored in the user's PCCHL. As illustrated in FIG. 19, an authentication attempt via gesture may be considered an "arrow" being shot through the effort straw 1902. Arrow 1910 represents an authentication attempt whose gesture perfectly matches the authentication gesture in the user's PCCHL. In actual conditions, a perfect match is nearly impossible. Arrow 1912 represents an authentication attempt whose gesture is sufficiently within the effort straw 1902 to be considered a match to the authentication gesture in the user's PCCHL; this authentication would pass/succeed. Finally, arrow 1914 represents an authentication attempt whose gesture is not sufficiently within the effort straw 1902 to be considered a match to the authentication gesture in the user's PCCHL; this authentication would fail.

This gesture authentication technique is device independent, in that it may be used by any number of devices. The authentication sketches may be scalable. For example, an authentication sketch performed on a 5-inch touchscreen display may be proportionally drawn on a 10-inch touchscreen display. In an embodiment, the host device uses a 1 ms or faster clock and has a touchscreen display that supports multi-touch input.

A QR code may be used to store user information, such as a user's PCCHL, thus enabling a host device to authenticate a user without the host having to perform network communications. This may be useful in various situations, such as when Internet connectivity to the host device is slow or unavailable, or where a fast authentication check is required. This also allows a PCCHL to be physically portable.

A QR code may be used to recreate another QR code. The error correction in ISO standard (ISO/IEC18004) for QR codes allows a QR code to have an error rate of up to 30% without a loss of data. Thus, the squares of a QR code may be "selectively damaged" to encode data, for example facts and/or questions relating to a user's PCCHL. A standard QR code may be configured, transmitted, and deployed in a way that stores information without other systems or people being able to decipher the QR code's content. Therefore, the QR code may function as a "server," enabling rapid authentication to protect confidential data, classified apps, restricted processes, or for other authentication purposes.

Although there are a large number of scenarios for which QR codes are ideally suited, one particularly suited application of QR codes is in combination with gesture-based authentication. Summary gesture metrics require a relatively small number of bytes, which fit inside the size limitations of a QR code. When a user draws a sketch during an authentication, the effort to draw the sketch is compared to the user's PCCHL, which contains similar efforts of that user. A properly formatted QR code may be used to store the user's PCCHL.

The QR authentication technology enables the host device (e.g., a computer protected by the previously described gesture authentication technology) to "request" a user's gesture simply by displaying (e.g., via an application executing on the host device) a properly formatted QR code. When the user sees the QR code, the user may scan the QR code with the user's smartphone app, which then invites the user to draw the expected sketch on the smartphone. Although the app will accept the sketch input, in an embodiment, the app will not display the sketch on the app's user interface to prevent unintentional observation by potential third parties. At the conclusion of the drawing effort, the smartphone app may return a report on how the drawing effort compared to other efforts in the user's PCCHL. The user may consume this report by one or more means, such as web services, Bluetooth/NFC (Near Field Communication), or directly in the app running on the host device.

Another potential use case is as follows: suppose the host device has a stored document that has been divided into sections. a respective section of the document has a minimum respective clearance level; a person with at least that respective clearance level is allowed to view the respective section of the document. A user selects the document for viewing. In response, the host device displays the QR code. The user scans the QR code with the user's smartphone, then traces the user's authentication gesture on the user's smartphone. Based on the nature and metrics of the effort expended in the user's response—and hence the user's authenticated status—access is selectively granted to various parts of the document without the host device ever knowing what was drawn and without the user's gesture being seen by anyone else.

App developers may embed this QR authentication capability into their own app workflow processes, presumably in a solicitation stage and a follow-on results-processing stage. The QR authentication technology may be available as deployable modules (e.g., dynamically linked libraries or "DLLs") with industry standard interfaces, making them easy to integrate, deploy, and use.

Figure 20:
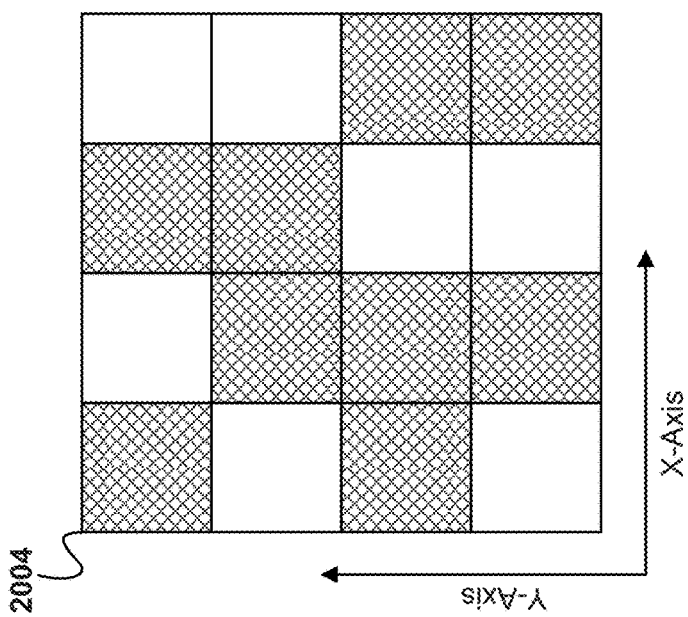
FIG. 20 illustrates expressing raw data as a QR code, in accordance with various embodiments.
Figure 20:
Figure 20:
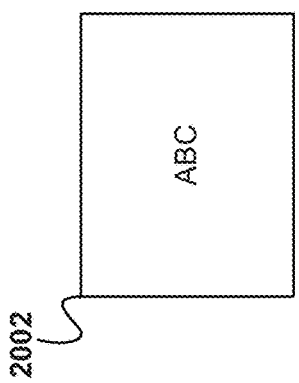

FIG. 20 illustrates expressing raw data as a QR code, according to an embodiment. In the illustrated example, the string "ABC" (the raw data 2002) is expressed as a QR code 2004 with nine shaded "data boxes." Although the data boxes are shaded in FIG. 20, a data box in a typical QR code would be solid black Each "data box" may be considered to be one "unit" square, and has an "address" corresponding to some coordinate system (e.g., Cartesian).

Figure 21:
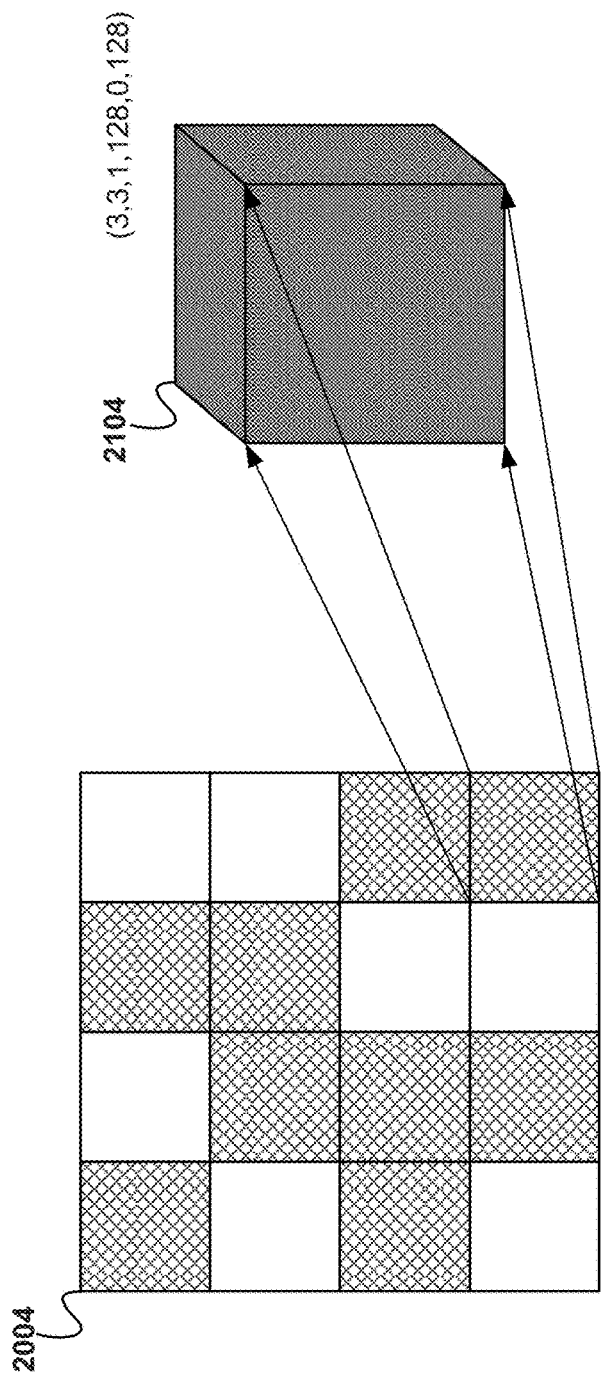
FIG. 21 illustrates converting a data box of a QR code into six dimensions, in accordance with various embodiments.

FIG. 21 illustrates converting a data box of the QR code 2004 into six dimensions, according to an embodiment. Each "data box" of the QR code 2004 is assigned a random color and is transformed into a cube, whose "location" is expressed in two sets of dimensions: one set representing the physical dimensions of the cube and another set of dimensions representing the color of the cube. For example, if a Cartesian coordinate system (e.g., X, Y, and Z) is being used to represent physical dimensions and a Red-Green-Blue color model (e.g., RGB) is being used to represent color, each cube would have six dimensions: (X,Y,Z,R,G,B).

For example, the top-left corner of the bottom-right-most data box in the QR code 2004 has Cartesian coordinates (3,1); adding a third-dimension to this data box results in the (X,Y,Z) coordinates (3,3,1) for the corresponding cube 2104. The RGB values (128,0,128), which represent the color purple, were chosen at random and assigned to the cube 2104. Thus, the cube 2104 corresponding to the bottom-right-most data box in the QR code 2004 in this example has (X,Y,Z,R,G,B) coordinates of (3,3,1,128,0,128).

Figure 22A:
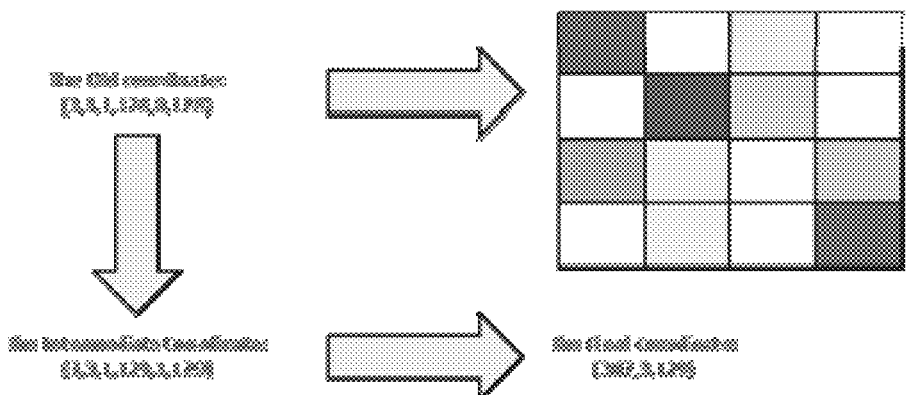
FIG. 22A illustrates converting a cube represented by six dimensions into a "final coordinate" of three dimensions, in accordance with various embodiments.

FIG. 22A illustrates converting a cube represented by six dimensions into a "final coordinate" of three dimensions, according to an embodiment. For each data box of the QR code 2004, the six dimensional value (X,Y,Z,R,G,B) of its corresponding cube is translated into its corresponding final coordinate by compressing it back into three dimensions (X',Y',Z'). In an embodiment, the compression may use the formula X'=X*R, Y'=Y*G, and Z'=Z*B. In an embodiment, the physical dimension coordinates and/or the color values are adjusted by adding 1, thus avoiding multiplication by zero. For example, the (X,Y,Z,R,G,B) coordinates (3,3,1,128,0,128) corresponding to data box (3,1) of the QR code 2004 would be converted as follows:

1. The RGB values of (3,3,1,128,0,128) are incremented by 1, resulting in an intermediate coordinate value of (3,3,1,129,1,129).
2. The intermediate coordinate value of (3,3,1,129,1,129) is converted into a final coordinate value: X'=X*R=3*129=387; Y'=Y*G=3*1=3; and Z'=Z*B=1*129=129. Thus, the final coordinate value (X',Y',Z') is (387,3,129).

Figure 22B:
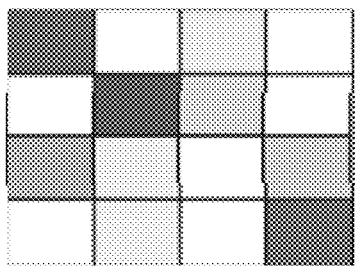
FIG. 22B illustrates two storage modalities of the disclosed QR data representation, in accordance with various embodiments.
Figure 22B:
Figure 22B:
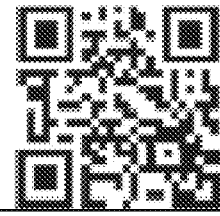

FIG. 22B illustrates two storage modalities of the disclosed QR data representation, according to an embodiment. The final coordinate for a data box of the QR code 2004 is ported to a Differentiation Cypher, which is created using the combination of: (1) the creation time of the source data (e.g., "ABC"), (2) the QR Code Version and Correction Level, and (3) the position of a given Differentiation Cypher in the final text string to map RGB color to a final coordinate. For example, the Differentiation Cyphers of all non-white data boxes of the QR code 1204 are converted into fixed-length text strings, whose text is then expressed as a QR code.

Figure 23:
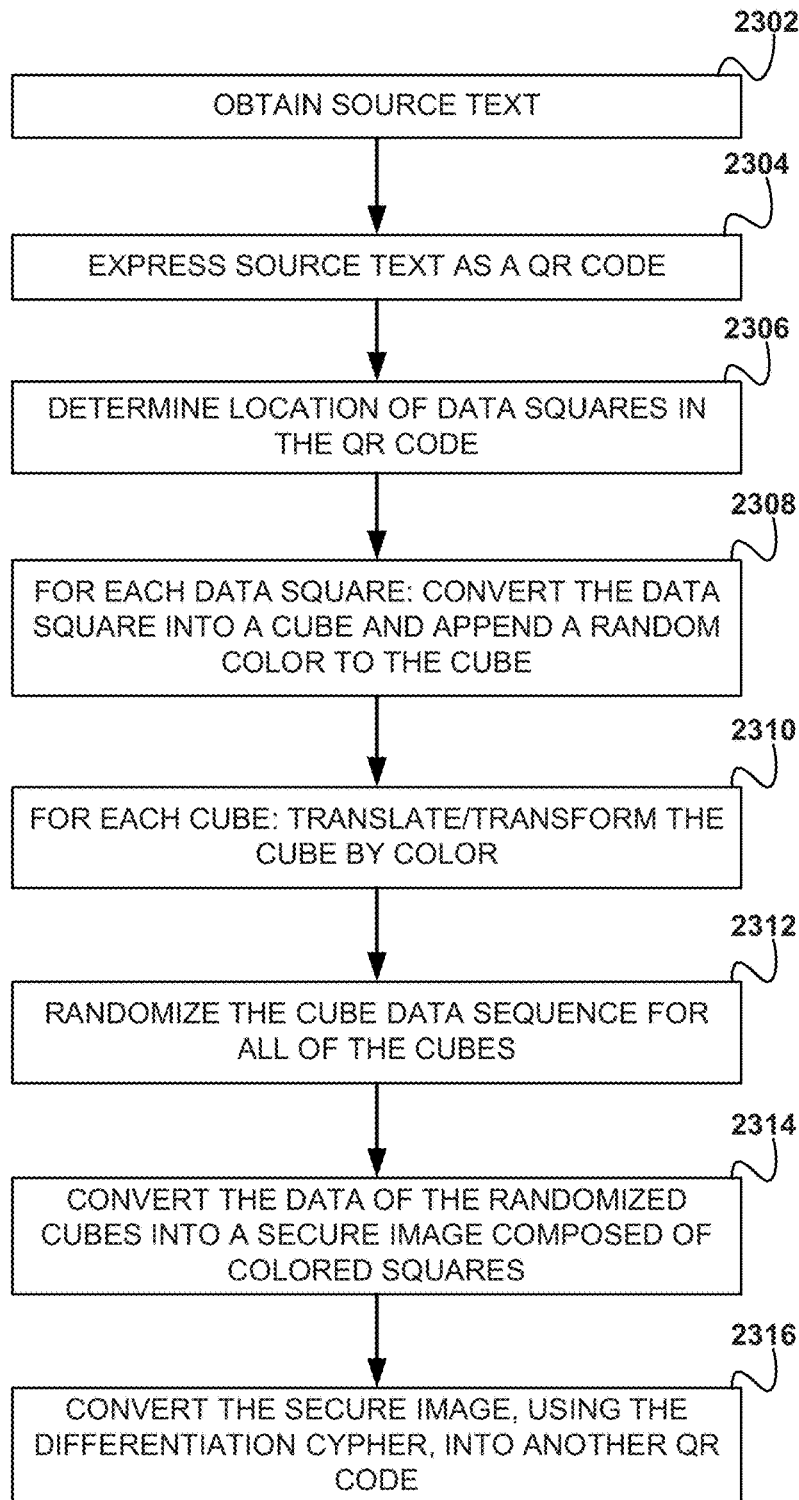
FIG. 23 is a flowchart of a method for obfuscating and storing data in a QR code, in accordance with various embodiments.

FIG. 23 is a flowchart of a method 2300 for obfuscating and storing data in a QR code, according to an embodiment:

A source text (e.g., a password) is obtained (operation 2302).

The source text is expressed in a QR code (operation 2304).

The location of the "data squares" is determined (operation 2306).

Each data square is converted into a cube, and a random color is appended to the cube (operation 2308).

Each cube is translated/transformed by color (operation 2310).

The cube data sequence for all of the cubes is randomized (operation 2312).

The data of the randomized cubes is saved to a server as a secure image composed of colored squares (operation 2314) and/or Optionally, the secure image is converted, using the Differentiation Cypher as the color-to-location mapper, into another QR code (operation 2316).

Some Distinguishing Characteristics of the Disclosed QR Functionality

Data format change through QR
Data confusion (lossless) in correction code
Data format change through color
Data sequence immaterial—Jackson Pollock style (random color splotches)
Arbitrary color assignment by random Tick seed
No reference to anything outside the QR code
Identical source data always appears differently QR has Six Main Technology Aspects
"Use" related:
   contain a passphrase
   describe the gesture, rather than create it
   propound cryptographic nonces—[list]
   read a printed QR code (e.g., carried in a wallet) to provide the user's PCCHL to another host device
"Send" related:
   Refer to the islands by either latitude/longitude or by position number (e.g., a left-to-right then top-to-bottom winding string)
   Has the ability to chain QR codes
"Programming" related:
   can be written to run on a smartphone, a host application, or on a web services-enabled server
"Limiting" related:
   can perform geofencing
   barcode painting can be hash-tagged to facilitate speedy identification of duplicate second attack
   duplicate rejection performed (variable time window)
   QR code lifecycle (availability) can be bounded by geofencing or elapsed time or usage count
"Deforming" related:
   alternate between painting white islands and black islands
   blobs painted in random order
   contains random noise
   creates executable code to run a hidden program—interpolated execution
   drive a speech engine to propound question by sound
   point to a hidden URL
   ability to deform can itself be randomized
"Color" related:
   color can be preserved in the QR bitmap
   level of color can be determined by normal cameras, like those on smartphones—does not require a 'professional' grade camera
   color is another dimension
   color can signal which characters to ignore In various embodiments, a method can be implemented to authenticate a user via an authentication server in communication with a user device. The method can comprise: obtaining a user effort based identity authentication token; generating a request for the user to perform an effort on the user device; receiving user effort data from the device responsive to a user performed requested effort; and authenticating the user as a function of the received user effort data and the user effort based identity authentication token.

Variations of such a method or similar methods can include a number of different embodiments that may be combined depending on the application of such methods and/or the architecture of systems in which such methods are implemented. The user efforts can comprise user device keyboard user efforts. The user efforts can comprise gestures associated with user device touch screen user interaction. The user effort based identify authentication token can comprise user effort data encoded into a QR code. The user effort based identify authentication token can comprise user effort data encoded into a portable digital storage device. The authentication server can be a server running an application that the user device attempts to access. The authentication server can be a separate server from a server running an application that the user device attempts to access.

In various embodiments, a method and system can be implemented where an application challenges the user for effort, and that effort is confirmed by a trusted third-party.

In various embodiments, a method can be implemented to authenticate a user, where the method comprises: receiving an access request with a user effort based identity authentication token from a user device; generating an effort challenge as a function of the token; sending the effort challenge to the user device; receiving a validation response and the token from the user device, wherein the validation response can be based on user effort responsive to the effort challenge being validated by a validation server which provides a validation key; and allowing access responsive to the access request with token and the validation response with token.

In various embodiments, a method and system can be implemented where an application requests an effort challenge from a third-party, and that third-party challenges the user.

In various embodiments, a method can be implemented to authenticate a user via an authentication server in communication with a user device and an application. The method can comprise: receiving an access request; generating and sending a challenge request to the authentication server; receiving a validation response from the validation server, wherein the validation response is representative of an effort challenge to the user device and a corresponding effort and user effort based identity authorization token received from the user device; and allowing access responsive to the validation response.

In various embodiments, a method and system can be implemented where a credential is issued with effort metrics, submitted to an application, wherein the application submits the credentials and the real-time effort to a third-party for validation.

In various embodiments, a method can be implemented to authenticate a user via an effort validation server. The method can comprise: receiving a registration from a user device with a user effort based identity authorization token and a user effort; submitting the effort to the effort validation server; issuing a credential to the user device; receiving an access request from the user device, the access request including the credential and a second effort; providing the second effort to the validation server; receiving a validation response from the validation server; and granting access to the user device as a function of the validation response.

In various embodiments, a method and system can be implemented to provide a temporary unlocked access to accounts through effort metrics, so that normal purchasing activities are allowed.

In various embodiments, a method can be implemented to allow access to an account at a credit processing system. The method can comprise: receiving an unlock access communication from an effort validation server based on effort provided from a user device based on effort of the user; and authorizing access to the account responsive to a request based on a purchase made by the user via the user device and the unlock access communication from the effort validation server.

In various embodiments, a method and system can be implemented to use effort metrics and validation to provide attribution to blockchain transactions.

In various embodiments, a method can be implemented to validate and provide attribution to blockchain transactions. The method can comprise: receiving a transaction request with a representation of user effort from a user input device; requesting validation from an effort validation server by providing the representation of the effort to the effort validation server; receiving an effort validation from the effort validation server; and adding the transaction to a blockchain of transactions, the transaction having been validated and including the effort with the transaction in the blockchain such that the transaction is validated and attributed without identifying the identity of the user.

In various embodiments, a method and system can be implemented to allow two peers to provide physical user validation through a third-party without disclosing personally identifiable information (PII).

In various embodiments, a method can be implemented to perform a transaction between a first user of a first input device, and a second user of a second input device. The method can comprise: generating, via the first input device, a transaction request with a with a first effort based identity token associated with first user; receiving a response with the token and a validation key obtained from a validation server via the second input device based on a second effort based identity token associated with the second user and a second user effort; providing the second user effort and second effort based identity token to the validation server; receiving a second effort validation key from the validation server; and sending the transaction with the first user and second user identify based tokens and first and second effort validation keys to the second person to complete the transaction while ensuring both the first and second users are consistent throughout the transaction.

In various embodiments, a system can be implemented to perform any of the methods disclosed herein. The system can comprise: a processor; a communication device coupled to the processor for communicating with other devices; and a memory storing computer readable instructions coupled to the processor, the instructions for execution by the processor to perform the method.

In the embodiments discussed herein, statistical techniques can be used. When the source data for the statistical techniques is derived from human effort and movement metrics, where unknown variability is an expected condition, the problem of identifying and removing anomalous information is exceptionally difficult. For example, normal distribution models and known reference standards that represent truth against which data can be evaluated are conditions the do not exist in human effort and movement metrics. However, by adapting some well-known and proven mathematics in unique ways, the preponderance of anomalous data can be removed from a collection, and any subsequent analysis will benefit from the identification of anomalous data.

Techniques for detecting anomalous human user effort data can utilize measurements collected via an input device. The input device can be a computer input device. The data may be collected from such routine activities as typing on a keyboard, gestures from a touchscreen sensor, and three-dimensional movements. The three-dimensional movements can be collected using sensors. Such sensors can include an accelerometer, a compass, a GPS, optical sensors, motion detectors, or similar sensors. The measurements recorded from these devices are generally referred to herein as "human effort metrics." The measurements can include the positions and vectors of sensed movements, times related to the sensed movements, state information about the sensor or sensors, or combinations of these measurements or similar measurements. They may be described as coming from known persons, meaning they may be associated with previously recorded human effort metrics, or from unknown persons, meaning they may or may not be associated with any previously recorded human effort metrics, or even a mechanical process intending to simulate human activity. A collection of this effort data can be evaluated to identify anomalies, which can include both intentional attempts to corrupt the analysis and unintentional irregularities introduced into the data.

Various embodiments apply techniques to identify anomalous effort data for the purpose of detecting the efforts of a single person, as well as to segment and isolate multiple persons from a single collection of data. Additional embodiments describe the methods for using real-time anomaly detection systems that provide indicators for scoring effort data in synthesized risk analysis. Other embodiments include approaches to distinguish anomalous effort data when the abnormalities are known to be produced by a single entity, as might be applied to medical research and enhance sentiment analysis, as well as detecting the presence of a single person's effort data among multiple collections, as might be applied to fraud analysis and insider threat investigations. Embodiments include techniques for analyzing the effects of adding and removing detected anomalies from a given collection on subsequent analysis.

Machine learning (ML) and artificial intelligence (AI) algorithms can be applied to both identify anomalies and outliers in a given human metrics effort data collection. These AI algorithms can include both unsupervised learning and reinforcement learning techniques to identify, through feature learning, and classify important data elements that improve the accuracy and speed of the evaluation results, such as evaluation results described above with respect to keystroke examples of user authentication and in U.S. Pat. No. 9,430,626. The ML algorithms can use the AI identification and classification to inform an association rules process that are used for anomaly and outlier detection, and improve temporal pattern recognition by ordering and/or eliminating features used in the evaluation.

For example, when comparing the human metrics of typing efforts, if a person typically only types with a single finger, pressing two keys simultaneously is not a probable physical event or effort. AI algorithms can discover (using techniques such as multidimensional effort metrics technologies including Mahalanobis distance, Bhattacharyya distance, Cook's distance, Minkowski's distance, Random Sample Consensus, barycentricity, outlier analysis statistical techniques, and other techniques) the absence of overlapping keystrokes in the data, which represents the efforts of a single individual in the data. These AI algorithms can create rules for the ML process that will eliminate anomalous data that contain overlapping keystrokes. For a person that usually types with more than a single finger, the rules learned and applied will likely be different, since the data corresponding that person will probably contain some overlapping keystrokes. In a similar way, if a given person is left-handed, the process will create a different set of rules for identifying and classifying gesture data relating to that person than it would from a person with ambidextrous habits. Of course, in practice, the attributes discovered by these AI/ML techniques discover far more subtle elements, such as how certain combinations of characters on a keyboard are typed, or the positions of individual fingers when producing certain types of repeated gestures.

Single Person Detection

A sensing system can be structured to determine which human effort metrics from a collection of human effort metrics were either intentionally created by an impostor, or represent irregular measurements of a given person. The sensing system can utilize a set of variance and covariance matrices derived from raw user behavior measurements, and can employ, without limitation, a combination of Pearson product moment correlation coefficients, geospatial, ellipsoidal, and multidimensional effort metrics technologies, including Mahalanobis distance, Bhattacharyya distance, Cook's distance, Minkowski's distance, Random Sample Consensus, barycentricity, and outlier analysis statistical techniques. These techniques can be used, along with techniques as described above with respect to keystroke examples of user authentication and in U.S. Pat. No. 9,430,626, to evaluate potential abnormalities in the collection and to recursively evaluate bias and variability effects against a dynamically created reference standard. From these techniques, machine learning and artificial intelligence engines can be used to develop independent rules about anomalous human effort metrics specific to the individual. From such use, a given collection of human effort metrics can be refined by removing the anomalies from the collection to best represent a specific person, while still accounting for the unique expectations of variability for that person. This approach can also identify any collection that represent mechanical attempts to create a set of human effort metrics, such as a computer program or script that produces input designed to simulate a physical person.

For example, a user is required to enter a passphrase to access a computer account. The human effort metrics from entering the passphrase are captured each time the user enters the passphrase, using the techniques as described above with respect to keystroke examples of user authentication and in U.S. Pat. No. 9,430,626. After a collection of these human effort metrics have been recorded, the technique described above is used to refine the collection to improve the precision of the evaluation of these measurements. Both fraudulent attempts by an impostor, as well as innocent mistakes (like sneezing in the middle of entering the passphrase), are eliminated from the collection of human effort metrics, producing a clear and accurate representation of the individual.

Figure 24:
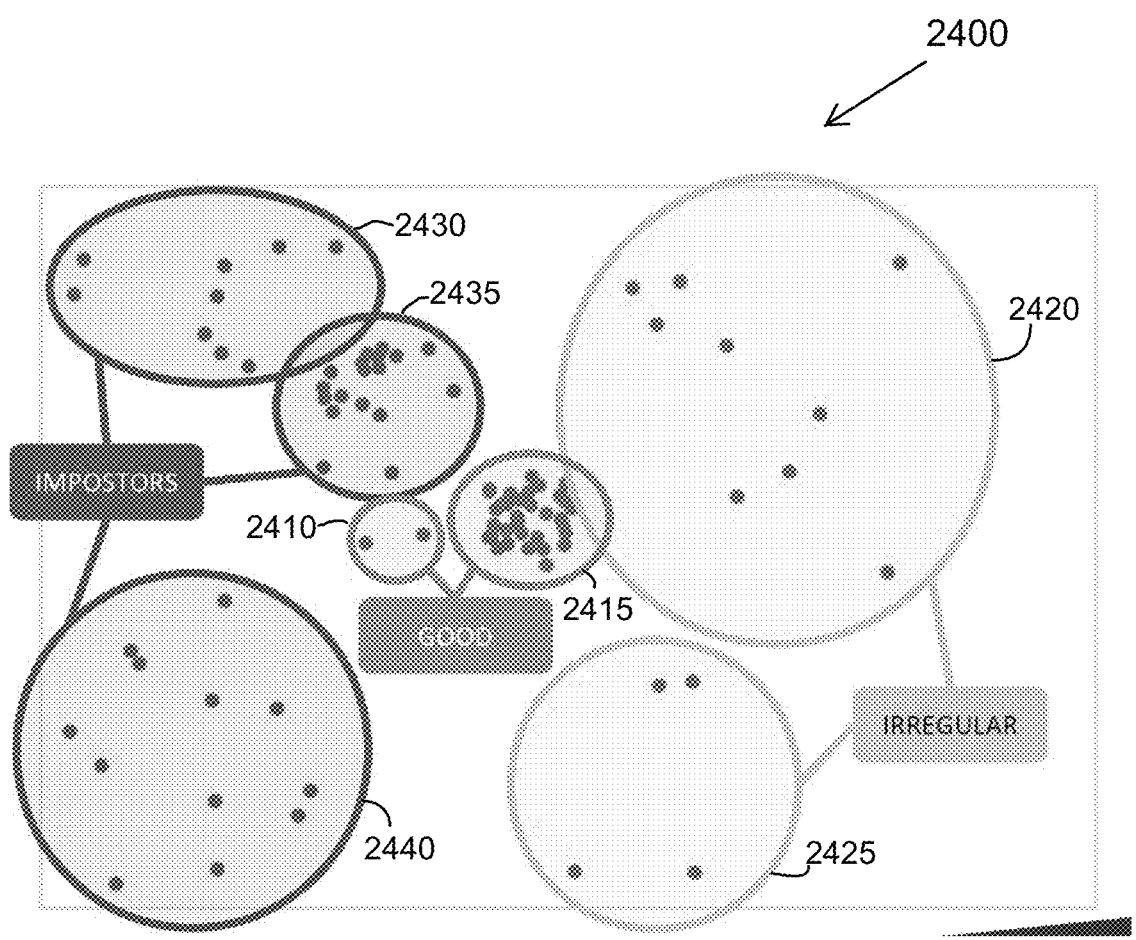
FIG. 24 is a Euclidean space diagram illustrating an example of multiple sensed human effort metrics, similar to those used to form a PCCHL, in accordance with various embodiments.

FIG. 24 is a Euclidean space diagram 2400 illustrating an example of multiple sensed human effort metrics, similar to those used to form a PCCHL. Each sensed human effort in diagram 2400 is represented by a dot in Euclidean space. Various groupings of dots (efforts) are illustrated inside circles or ellipses. The groupings are also labeled as good efforts 2410 and 2415, irregular efforts 2420 and 2425, and attempts by impostors 2430, 2435, and 2440.

Each effort can be mapped to an n-dimensional space, as described above with respect to keystroke examples of user authentication and in U.S. Pat. No. 9,430,626. Each effort can be evaluated using one or more of Mahalanobis techniques and other techniques discussed above. Efforts that do not meet thresholds for measurements, like elapsed time and feature similarity between effort metrics, can be removed from the model of clusters. The thresholds can include, but are not limited to, maximum or minimum number of clusters of sensed efforts, maximum variance, minimum number of sample points, and other derived statistical attributes for evaluation. Efforts that meet thresholds can be added and subtracted from the model to evaluate the effect using techniques, for example, as described above with respect to keystroke examples of user authentication and in U.S. Pat. No. 9,430,626. The model can be a set of clusters of effort metrics within a larger collection that are both collectively and individually within the thresholds.

Figure 25:
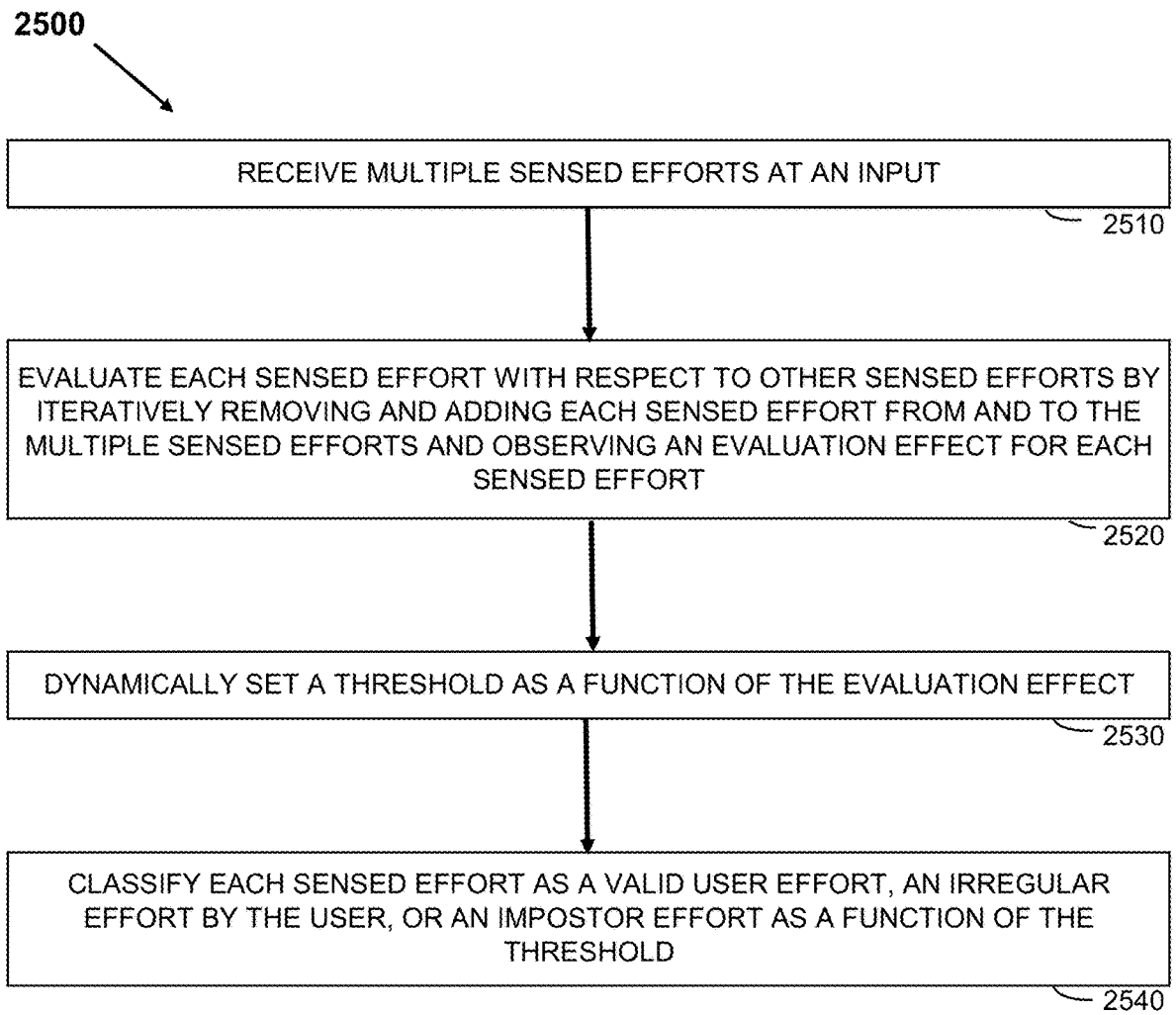
FIG. 25 is a flow diagram of elements of an example method of evaluating sensed efforts, in accordance with various embodiments.

FIG. 25 is a flow diagram of elements of an embodiment of an example method 2500 of evaluating sensed efforts. At 2510, an input to receive multiple sensed efforts are received at an input. The input can be coupled to one or more sensors that detects the multiple sensed efforts. The received sensed efforts can be stored in a memory device, which can store instructions to operate on the sensed efforts in conjunction with one or more processors coupled to the memory device to execute the instructions to perform operations on the sensed efforts. At 2520, each sensed effort is evaluated with respect to other sensed efforts by iteratively removing and adding each sensed effort from and to the multiple sensed efforts and observing an evaluation effect for each sensed effort. An evaluation effect on a sensed effort can include, but is not limited to, a change of the evaluation results of the sensed effort with respect to other sensed efforts, and their own respective evaluation results, and the formation of clusters of the sensed efforts as mapped in an n-dimensional Euclidean space.

At 2530, a threshold is dynamically set as a function of the evaluation effect. The dynamically set threshold can be, but is not limited to, a changed statistic for the sensed efforts, such as the distance between a given effort and other efforts in the collection as measured by the Mahalanobis algorithm, or the result of a variance or covariance analysis of the individual effort measurements compared to others in the same collection. At 2540, each sensed effort classified as a valid user effort, an irregular effort by the user, or an impostor effort as a function of the threshold.

Variations of method 2500 or methods similar to method 2500 can include a number of different embodiments that may be combined depending on the application of such methods and/or the architecture of systems in which such methods are implemented. Valid sensed efforts can be added to a cadence and habit model associated with a user. Such methods can include removing irregular and impostor sensed efforts from a cadence and habit model associated with a user. Such methods can include evaluating each sensed effort comprises using a Mahalanobis algorithm. Other evaluation techniques can be implemented. Evaluating each sensed effort can comprise mapping each effort to an n-dimensional Euclidean space.

In various embodiments, a system can be implemented to evaluate measured sensed efforts. The system can comprise an input to receive multiple sensed efforts; a memory device to store the received sensed efforts and to store instructions; and one or more processors coupled to the memory device to execute the instructions to perform operations with respect to the multiple sensed efforts. The operations performed in response to the execution of instructions by the one or more processors can include: evaluating each sensed effort with respect to other sensed efforts by iteratively removing and adding each sensed effort from and to the multiple sensed efforts and observing an evaluation effect for each sensed effort; dynamically setting a threshold as a function of the evaluation effect; and classifying each sensed effort as a valid user effort, an irregular effort by the user, or an impostor effort as a function of the threshold.

Variations of such a system or similar systems can include a number of different embodiments that may be combined depending on the application of such systems and/or the architecture of the systems. Such systems can include a number of operations with to measured sensed efforts. Operations can further comprise adding valid sensed efforts to a cadence and habit model associated with a user. Operations can further comprise removing irregular and impostor sensed efforts from a cadence and habit model associated with a user. Operations to evaluate each sensed effort can comprise using a Mahalanobis algorithm. Operations to evaluate sensed effort can comprise mapping each effort to an n-dimensional Euclidean space.

Multiple Person Detection

A system and method can be implemented to derive groups of human effort metrics from a collection of human effort metrics that is composed of the measurements of an unknown number of persons, to evaluate the number of persons represented in the given collection, and to produce refined collections corresponding to each person. This capability can be based on developing a set of variance and covariance matrices derived from the raw measurements, and can employ, without limitation, a combination of Pearson product moment correlation coefficients, geospatial, ellipsoidal, and multidimensional effort metrics technologies, including Mahalanobis distance, Bhattacharyya distance, cook's distance, Minkowski's distance, random sample consensus, Barycentricity, and outlier analysis statistical techniques. These techniques can be used, along with techniques described above with respect to keystroke examples of user authentication and in U.S. Pat. No. 9,430,626, to evaluate potential regularities in the collection, and to recursively evaluate bias and variability effects against a dynamically created sets of reference standards that map against potential human effort metric collections contained in the larger collection. At the same time, abnormalities can be identified that may not belong to the human effort metrics produced by a specific person. From these techniques, machine learning and artificial intelligence engines can be used to develop independent rules about regular and anomalous human effort metrics specific to the individuals represented in the collection. From such use, a set of new human effort metrics collections are derived that correspond to the measurements produced by specific persons, while still accounting for the unique expectations of variability for those persons. This approach will also identify any collections that represent mechanical attempts to create a set of human effort metrics, such as a computer program or script that produces input designed to simulate a physical person.

For example, an online news service provides paid access through their website, and, while many accounts are shared among multiple people, it may be impossible to know which users are sharing account login information, and how many users are sharing any given account. By recording the human effort metrics as described above with respect to keystroke examples of user authentication and in U.S. Pat. No. 9,430,626, and employing the techniques described above, each shared account can be identified, along with the number of individuals sharing the account, even without knowing the identities of those individuals. In another example, a social media company records human effort metrics, as described above with respect to keystroke examples of user authentication and in U.S. Pat. No. 9,430,626, each time a new post or message is created. Examining these collections of human effort metrics, using the techniques described above, these posts and messages can be grouped across accounts by individual person for subsequent analysis, such as identifying bad actors, automated (non-human) accounts, and false content sources.

Figure 26:
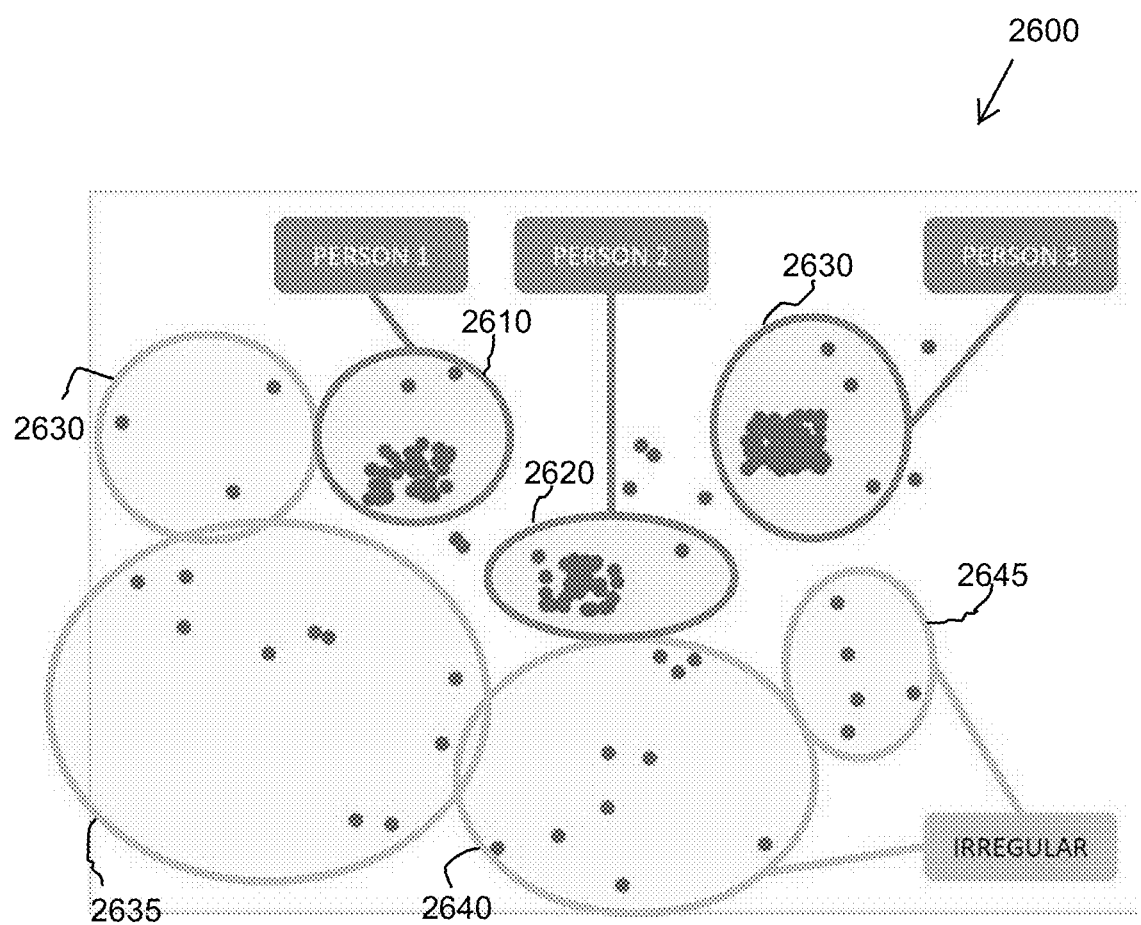
FIG. 26 is a Euclidean space diagram illustrating multiple sensed human effort metrics that may be associated with multiple persons, in accordance with various embodiments.

FIG. 26 is a Euclidean space diagram 2600 illustrating multiple sensed human effort metrics that may be associated with multiple persons. Each sensed human effort in diagram 2600 is represented by a dot in Euclidean space. Various groupings of dots (efforts) are illustrated inside circles or ellipses. The groupings are also labeled as efforts 2610,

2615, and 2420 associated with person 1, person 2, and person 3, respectively, along with irregular efforts 2630, 2635, 2640, and 2465.

In various embodiments, a system and method can be implemented to derive groups of human effort metrics from a collection of human effort metrics that is composed of the measurements of an unknown number of persons, to evaluate the number of persons represented in the given collection, and to produce refined collections corresponding to each person. Each effort can be mapped to an n-dimensional space, as described above with respect to keystroke examples of user authentication and in U.S. Pat. No. 9,430,626. Each effort can be evaluated using one or more of Mahalanobis techniques and other techniques identified herein. Efforts that do not meet thresholds can be removed from the models of clusters of efforts and effects can be evaluated as described above with respect to keystroke examples of user authentication and in U.S. Pat. No. 9,430,626. Efforts that meet thresholds, or regularities, can be added and subtracted from each of the models to evaluate the effects, as described above with respect to keystroke examples of user authentication and in U.S. Pat. No. 9,430,626. The system and method can generate models of clusters of effort metrics as mapped in an n-dimensional Euclidean space.

Figure 27:
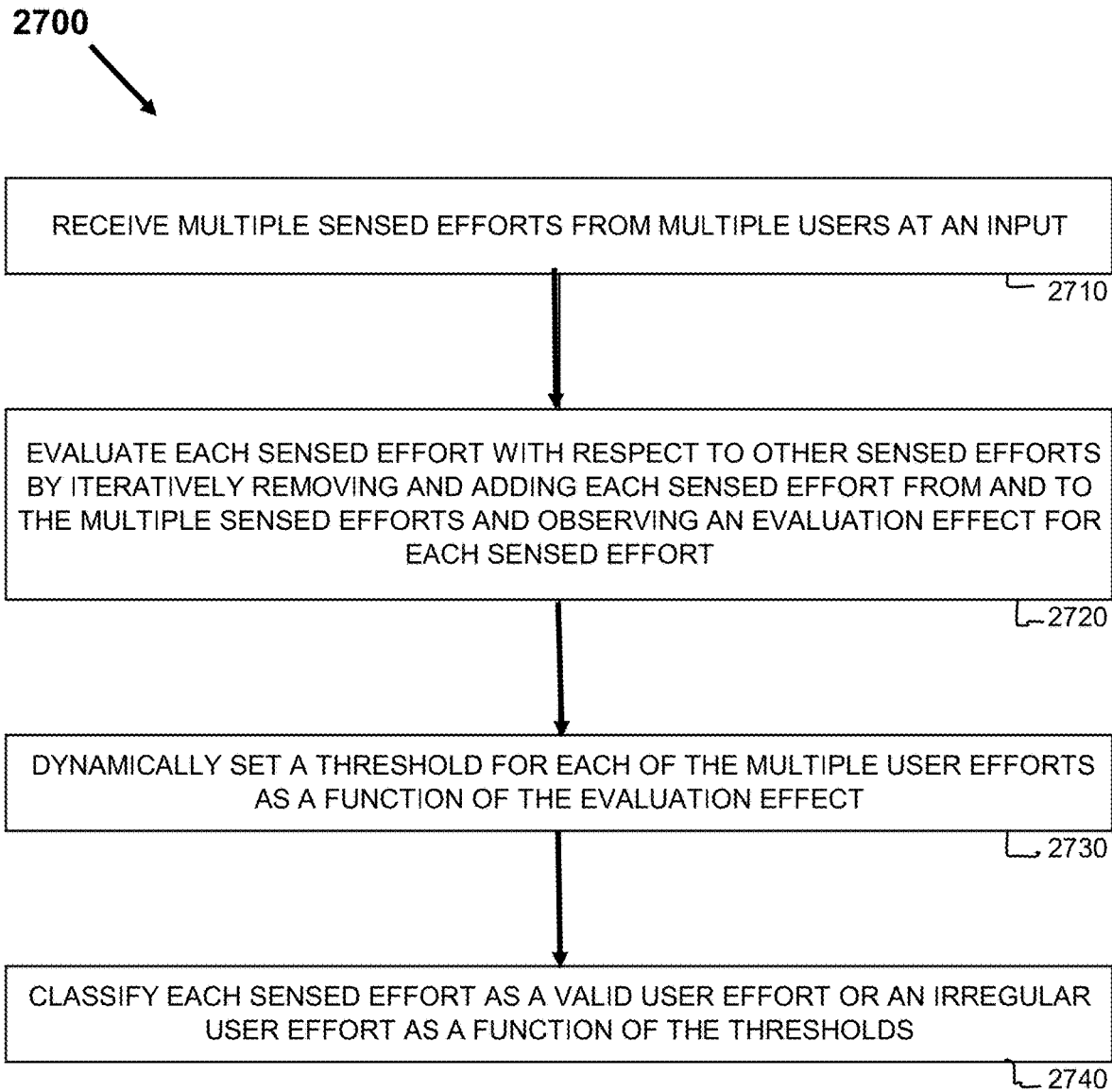
FIG. 27 is a flow diagram of elements of an example method of evaluating sensed efforts with respect to multiple entities, in accordance with various embodiments.

FIG. 27 is a flow diagram of elements of an embodiment of an example method 2700 of evaluating sensed efforts with respect to multiple entities. At 2710, an input to receive multiple sensed efforts from multiple users are received at an input. The input can be coupled to one or more sensors that detects the multiple sensed efforts. The received sensed efforts can be stored in a memory device, which can store instructions to operate on the sensed efforts in conjunction with one or more processors coupled to the memory device to execute the instructions to perform operations on the sensed efforts. At 2720, each sensed effort with respect to other sensed efforts is evaluated by iteratively removing and adding each sensed effort from and to the multiple sensed efforts and observing an evaluation effect for each sensed effort.

At 2730, a threshold is dynamically set for each of the multiple user efforts as a function of the evaluation effect. At 2740, each sensed effort is classified as a valid user effort or an irregular user effort as a function of the thresholds.

Variations of method 2700 or methods similar to method 2700 can include a number of different embodiments that may be combined depending on the application of such methods and/or the architecture of systems in which such methods are implemented. Such methods can comprise adding valid sensed efforts to a one of multiple user cadence and habit models. Such methods can comprise removing irregular sensed efforts from a cadence and habit model associated with a user. Such methods can comprise evaluating each sensed effort comprises using a Mahalanobis algorithm. Evaluating each sensed effort can comprise mapping each effort to an n-dimensional Euclidean space. Valid user efforts of each user can comprise clusters of regularity.

In various embodiments, a system can be implemented to evaluate measured sensed efforts with respect to multiple entities. The system can comprise an input to receive multiple sensed efforts from multiple users; a memory device to store the received sensed efforts and to store instructions; and one or more processors coupled to the memory device to execute the instructions to perform operations with respect to the multiple sensed efforts. The operations performed in response to the execution of instructions by the one or more processors can include operations to: evaluate each sensed effort with respect to other sensed efforts by iteratively removing and adding each sensed effort from and to the multiple sensed efforts and observing an evaluation effect for each sensed effort; dynamically set a threshold for each of the multiple user efforts as a function of the evaluation effect; and classify each sensed effort as a valid user effort or an irregular user effort as a function of the thresholds.

Variations of such a system or similar systems can include a number of different embodiments that may be combined depending on the application of such systems and/or the architecture of the systems. Such systems can include a number of operations with to measured sensed efforts. The one or more processors can be structured to add valid sensed efforts to a one of multiple user cadence and habit models. The one or more processors can execute instructions to remove irregular sensed efforts from a cadence and habit model associated with a user. The one or more processors can execute instructions to evaluate each sensed effort comprises using a Mahalanobis algorithm. Evaluation of each sensed effort can comprise mapping each effort to an n-dimensional Euclidean space. Valid user efforts of each user can comprise clusters of regularity.

Realtime Scoring Detection

A system and method can be implemented to determine the variation of human effort metrics in a dynamic collection of human effort metrics as each are measured, producing a set of real-time analysis results. This capability can be based on developing a set of variance and covariance matrices derived from the raw measurements, and can employ, without limitation, a combination of one or more of Pearson product moment correlation coefficients, geospatial, ellipsoidal, and multidimensional effort metrics technologies, including Mahalanobis distance, Bhattacharyya distance, Cook's distance, Minkowski's distance, Random Sample Consensus, barycentricity, and outlier analysis statistical techniques. These techniques can be used, along with those described above with respect to keystroke examples of user authentication and in U.S. Pat. No. 9,430,626, to evaluate the variance between a given set of human effort metrics and a collection of previously measured human effort metrics, and to recursively evaluate bias and variability effects against a dynamically created reference standard. From these techniques, machine learning and artificial intelligence engines can be used to develop independent rules about anomalous human effort metrics specific to a given individual. The precision can be increased with each new set of human effort metrics.

For example, a login process may capture human effort metrics as described above with respect to keystroke examples of user authentication and in U.S. Pat. No. 9,430,626, and as each login value is captured, it is evaluated using these techniques against previous attempts with the same login credentials. Since there is no reference standard for the valid human effort metrics associated with those login values, the analysis described above is employed to produce a set of results about how the current measurements compare to previously recorded measurements. Those results can be provided to a reporting process or risk analysis engine which combines these results with other observations about the given login account which may provide warning of unauthorized access.

Figure 28:
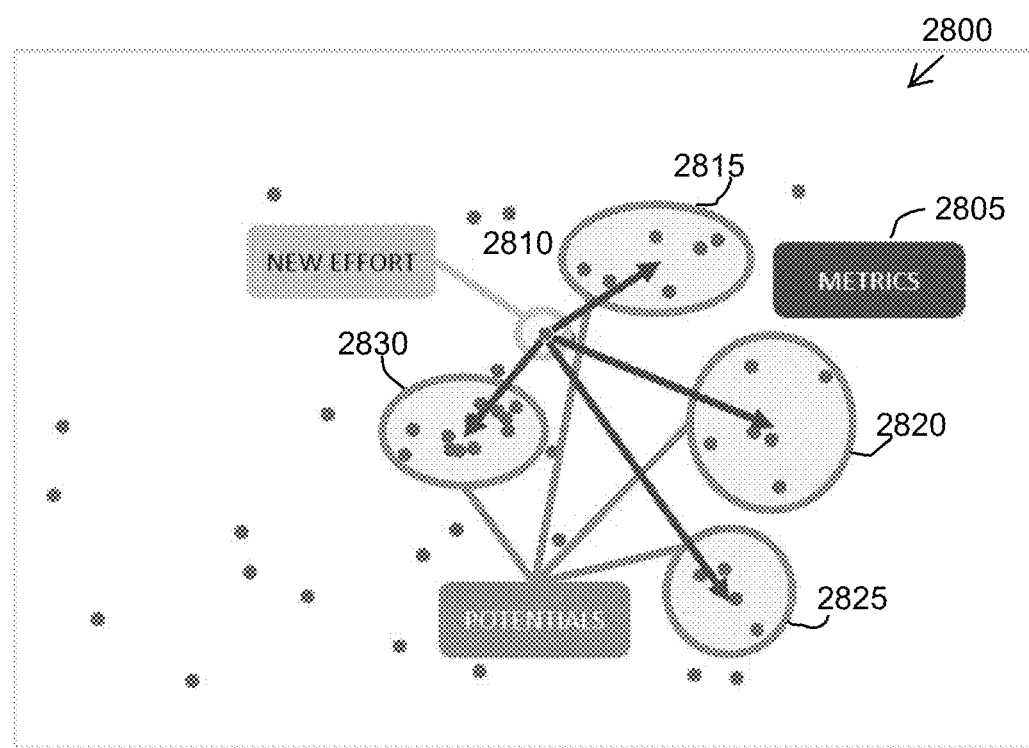
FIG. 28 is a Euclidean space diagram illustrating a new sensed effort among previously sensed efforts, in accordance with various embodiments.

FIG. 28 is a Euclidean space diagram 2800 illustrating a new sensed effort among previously sensed efforts. Each sensed effort in diagram 2800 is represented by a dot in Euclidean space. Various groupings of dots (efforts) are illustrated inside circles or ellipses. The groupings are also labeled as new effort 2810, potential clusters of previous sensed efforts 2815, 2820, 2825, and 2830, and metrics 2805 associated with evaluation of the new effort 2810 and the potential clusters 2815, 2820, 2825, and 2830.

In various embodiments, a system and method can be implemented for determining the variation of human effort metrics in a dynamic collection of human effort metrics as each are measured, producing a set of real-time analysis results. Each effort can be mapped to an n-dimensional space, as described above with respect to keystroke examples of user authentication and in U.S. Pat. No. 9,430,626. The new effort can be evaluated using one or more of Mahalanobis and other techniques referenced above. The new effort can be evaluated, as described above with respect to keystroke examples of user authentication and in U.S. Pat. No. 9,430,626, against various potential models. The results of these evaluations (as described above with respect to keystroke examples of user authentication and in U.S. Pat. No. 9,430,626) can be expressed as a set of metrics and derived summaries for subsequent analysis by an external process. Such systems and methods can provide for realtime generation of potential models of clusters of efforts from ranking of effects by those same statistical scores.

Figure 29:
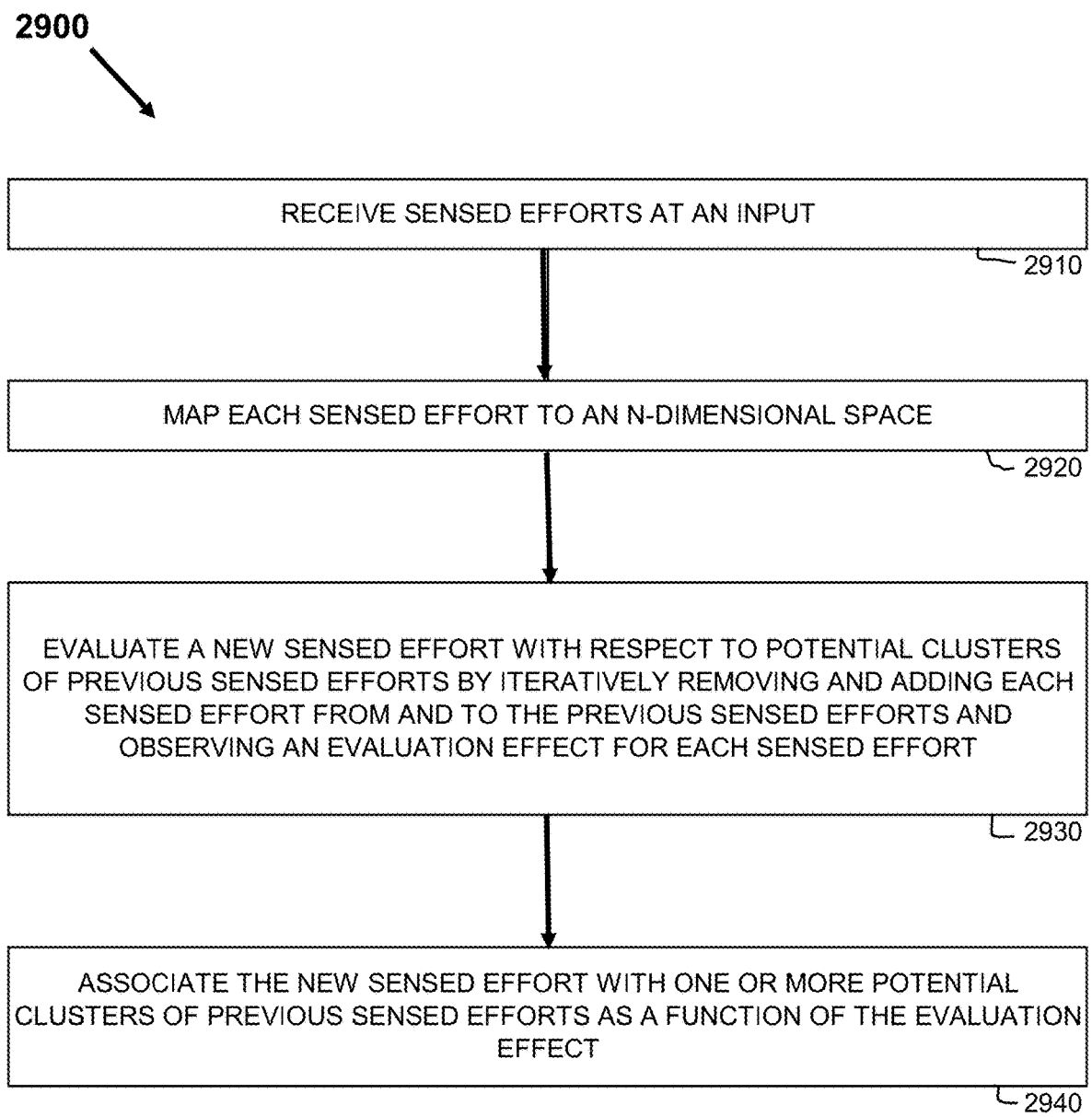
FIG. 29 is a flow diagram of features of an example method of evaluating a new sensed effort with respect to previously sensed efforts, in accordance with various embodiments.

FIG. 29 is a flow diagram of features of an embodiment of an example method 2900 of evaluating a new sensed effort with respect to previously sensed efforts. At 2910, sensed inputs are received at an input. The input can be coupled to one or more sensors that detects the sensed efforts. The received sensed efforts can be stored in a memory device, which can store instructions to operate on the sensed efforts in conjunction with one or more processors coupled to the memory device to execute the instructions to perform operations on the sensed efforts. At 2920, each sensed effort is mapped to an n-dimensional space.

At 2930, a new sensed effort is evaluated with respect to potential clusters of previous sensed efforts by iteratively removing and adding each sensed effort from and to the previous sensed efforts and observing an evaluation effect for each sensed effort. At 2940, the new sensed effort is associated with one or more potential clusters of previous sensed efforts as a function of the evaluation effect. Variations of method 2900 or methods similar to method 2900 can include a number of different embodiments that may be combined depending on the application of such methods and/or the architecture of systems in which such methods are implemented. Such methods can comprise adding a new sensed effort to one of the potential clusters of previous sensed efforts. Such methods can comprise designating one of the potential clusters as a cadence and habit model for a user. Evaluating a new sensed effort can comprise using a Mahalanobis algorithm. Evaluating a sensed effort can comprise mapping each effort to an n-dimensional Euclidean space.

In various embodiments, a system can be implemented to evaluate measured sensed efforts. The system can comprise an input to receive sensed efforts; a memory device to store the received sensed efforts and to store instructions; and one or more processors coupled to the memory device to execute the instructions to perform operations with respect to the sensed efforts. The operations performed in response to the execution of instructions by the one or more processors can include operations to: map each sensed effort to an n-dimensional space; evaluate each new sensed effort with respect to potential clusters of previous sensed efforts by iteratively removing and adding each sensed effort from and to the previous sensed efforts and observing an evaluation effect for each sensed effort; and associating the new sensed effort with one or more potential clusters of previous sensed efforts as a function of the evaluation effect.

Variations of such a system or similar systems can include a number of different embodiments that may be combined depending on the application of such systems and/or the architecture of the systems. Such systems can include a number of operations with respect to measured sensed efforts. The one or more processors can be structured to add a new sensed effort to one of the potential clusters of previous sensed efforts. The one or more processors can be structured to designate one of the potential clusters as a cadence and habit model for a user. The operations of such systems can include operations to evaluate each new sensed effort comprises using a Mahalanobis algorithm. Such operations can include evaluating each sensed effort comprises mapping each effort to an n-dimensional Euclidean space.

Known Person Anomaly Detection

A system and method can be implemented to evaluate the human effort metrics of a known person against previous collections of human effort metrics from the same known person to detect variation in measurements beyond the normal variation specific to that individual. This capability can be based on developing a set of variance and covariance matrices derived from the raw measurements, and can employ, without limitation, a combination of one or more of Pearson product moment correlation coefficients, geospatial, ellipsoidal, and multidimensional effort metrics technologies, including Mahalanobis distance, Bhattacharyya distance, Cook's distance, Minkowski's distance, Random Sample Consensus, barycentricity, and outlier analysis statistical techniques. These techniques can be used, along with those described above with respect to keystroke examples of user authentication and in U.S. Pat. No. 9,430,626, to evaluate potential abnormalities in the collection beyond the expected range of variation for the given person, and to recursively evaluate bias and variability effects against a dynamically created reference standard. From these techniques, machine learning and artificial intelligence engines can be used to develop independent rules about human effort metrics specific to an individual, detailed results about unexpected variation is produced.

For example, human effort metrics may be measured periodically using the techniques described above in the physical evaluation of a person. These measurements can be made with respect to a person that has suffered from intracranial injury (also called Traumatic Brain Injury [TBI]) or diagnosed with a neurodegenerative disease, such as Alzheimer's, Parkinson's disease, or Lewy body dementia, or with genetic markers or family history of such illnesses. In the case of intracranial injury, the results may be used as part of normal cognitive testing that is used in both diagnostic assessment and as an indicator during treatment and recovery. In the case of neurodegenerative disease, these same techniques may be applied in detecting subtle, subclinical deterioration in neuromuscular functioning as a potential early marker, as well as part of ongoing evaluation during treatment.

Figure 30:
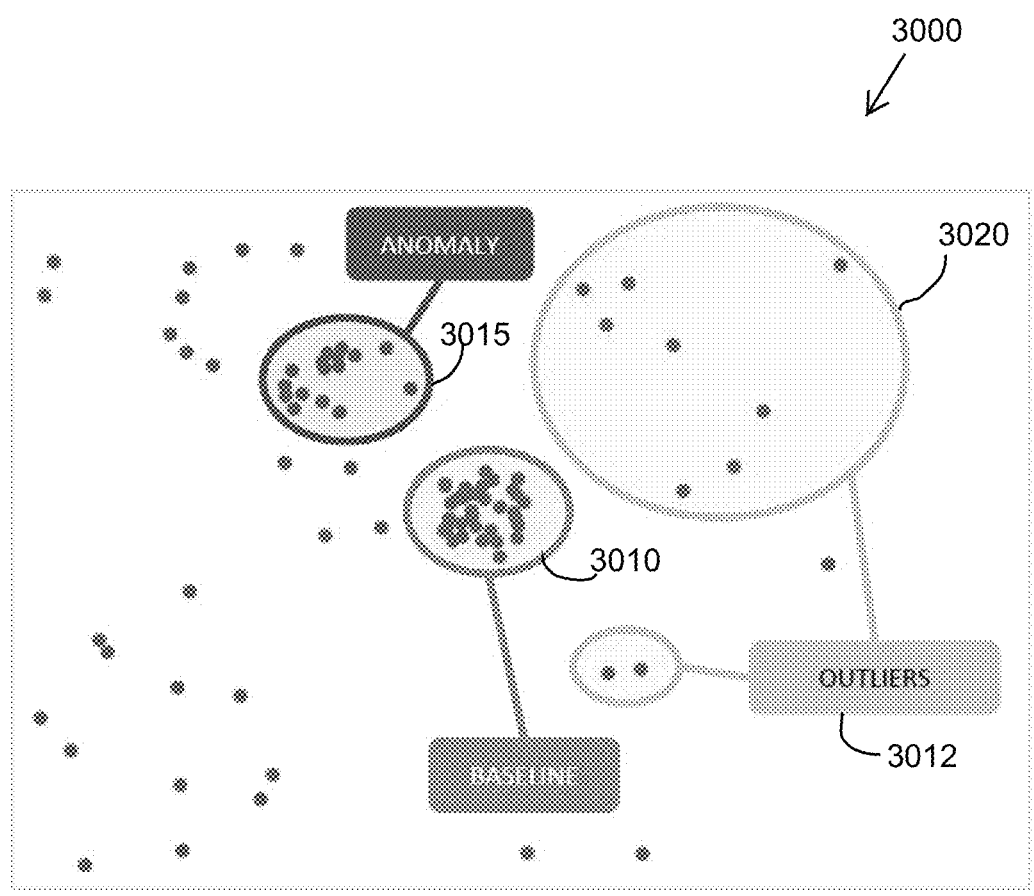
FIG. 30 is a Euclidean space diagram illustrating sensed efforts with respect to a baseline of sensed efforts, in accordance with various embodiments.

FIG. 30 is a Euclidean space diagram 3000 illustrating sensed efforts with respect to a baseline of sensed efforts. Each sensed effort in diagram 3000 is represented by a dot in Euclidean space. Various groupings of dots (efforts) are illustrated inside circles or ellipses. The groupings are also labeled as a baseline 3010, an anomaly 3015, and outliers 3020.

In various embodiments, a system and method can be implemented to evaluate the human effort metrics of a known person against previous collections of human effort metrics from the same known person to detect variation in measurements beyond the normal variation specific to that individual. A group of efforts can be collected as a baseline. Each effort can be mapped to an n-dimensional space, as described above with respect to keystroke examples of user authentication and in U.S. Pat. No. 9,430,626. The efforts can be evaluated, using one or more of Mahalanobis and other techniques discussed above, against thresholds to produce an improved model. New collections of efforts can be mapped and evaluated, as described above with respect to keystroke examples of user authentication and in U.S. Pat. No. 9,430,626, and anomalous clusters of efforts can be identified, separate from outliers' efforts.

Figure 31:
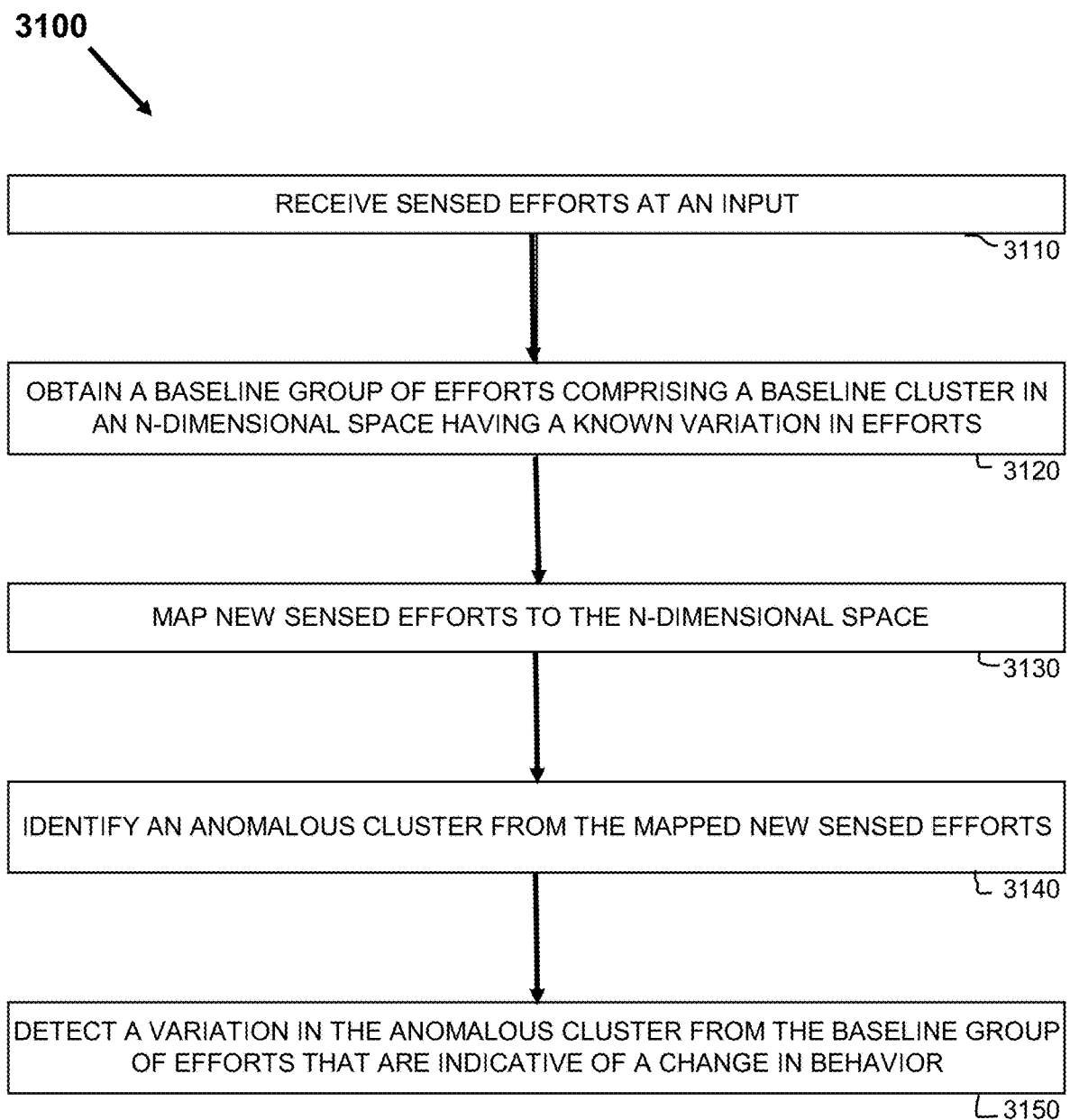
FIG. 31 is a flow diagram of features of an example method of evaluating human effort metrics of a known person against previous collections of human effort metrics from the same known person effort, in accordance with various embodiments.

FIG. 31 is a flow diagram of features of an embodiment of an example method 3100 of evaluating human effort metrics of a known person against previous collections of human effort metrics from the same known person effort. At 3110, sensed inputs are received at an input. The input can be coupled to one or more sensors that detects the sensed efforts. The received sensed efforts can be stored in a memory device, which can store instructions to operate on the sensed efforts in conjunction with one or more processors coupled to the memory device to execute the instructions to perform operations on the sensed efforts. At 3120, a baseline group of efforts is obtained, where the baseline group comprises a baseline cluster in an n-dimensional space having a known variation in efforts.

At 3130, new sensed efforts are mapped to the n-dimensional space. At 3140, an anomalous cluster is identified from the mapped new sensed efforts. At 3150, a variation in the anomalous cluster from the baseline group of efforts that is indicative of a change in behavior is detected.

Variations of method 3100 or methods similar to method 3100 can include a number of different embodiments that may be combined depending on the application of such methods and/or the architecture of systems in which such methods are implemented. Evaluating each new sensed effort can comprise using a Mahalanobis algorithm. Evaluating each sensed effort can comprise mapping each effort to an n-dimensional Euclidean space. Such methods can comprise forming multiple new clusters from groups of new efforts collected at different times, and determining a rate of change based on a distance of the clusters. The rate of change can be indicative of recovery from a brain injury. Such methods can comprise the variation being representative of neurological function variation. Such methods can comprise the variation being detected as a function of a set of variance and covariance matrices derived from measurements contained in the sensed efforts.

In various embodiments, a system can be implemented to evaluate measured sensed efforts. The system can comprise an input to receive sensed efforts; a memory device to store the received sensed efforts and to store instructions; and a processor coupled to the memory device to execute the instructions to perform operations. The operations can comprise: obtaining a baseline group of efforts comprising a baseline cluster in an n-dimensional space having a known variation in efforts; mapping new sensed efforts to the n-dimensional space; identifying an anomalous cluster from the mapped new sensed efforts; and detecting a variation in the anomalous cluster from the baseline group of efforts that are indicative of a change in behavior.

Variations of such a system or similar systems can include a number of different embodiments that may be combined depending on the application of such systems and/or the architecture of the systems. Such systems can include a number of operations with respect to measured sensed efforts. The one or more processors can be structured to evaluate each new sensed effort using a Mahalanobis algorithm. The one or more processors can be structured to evaluate each sensed effort by mapping each effort to an n-dimensional Euclidean space. Operations of the one or more processors can comprise: forming multiple new clusters from groups of new efforts collected at different times; and determining a rate of change based on a distance of the clusters. The rate of change can be indicative of recovery from a brain injury. In various embodiments, the variation can be representative of neurological function variation. In various embodiments, the variation can be detected as a function of a set of variance and covariance matrices derived from measurements contained in the sensed efforts.

Known Person Event Association

A system and method can be implemented to evaluate the human effort metrics of a known person against previous collections of human effort metrics from the same known person to associate a given individual with a set of contextual event information and content data. This capability can be based on developing a set of variance and covariance matrices derived from the raw measurements, and can employ, without limitation, a combination of Pearson product moment correlation coefficients, geospatial, ellipsoidal, and multidimensional effort metrics technologies, including Mahalanobis distance, Bhattacharyya distance, Cook's distance, Minkowski's distance, Random Sample Consensus, barycentricity, and outlier analysis statistical techniques. These techniques can be used, along with those described above with respect to keystroke examples of user authentication and in U.S. Pat. No. 9,430,626, to evaluate the variance between a given set of human effort metrics and a collection of previously measured human effort metrics, and to recursively evaluate bias and variability effects against a dynamically created reference standard. From these techniques, machine learning and artificial intelligence engines can be used to develop independent rules about human effort metrics specific to the individual. The results can express a matrix of likely match and associated statistics, while accounting for the unique expectations of variability for that person. This information can then be associated with contextual event information, such as, without limitation, time and date, device information, account metadata, software configuration, data content, and filenames.

For example, as a person performs normal, everyday activities on a computer device, composing documents and messages, information about the content of that activity can be associated with the human effort metrics to link the work product to a specific individual, using the techniques described above. Then, content of this work product can be evaluated using a sentiment analysis engine to understand the disposition of the creator, with a physical person linked to the result. This can be especially helpful when evaluating sentiment across multiple documents or social media posts, when it is important to know if the content was composed by the same physical person, whether their identity is known or not.

Figure 32:
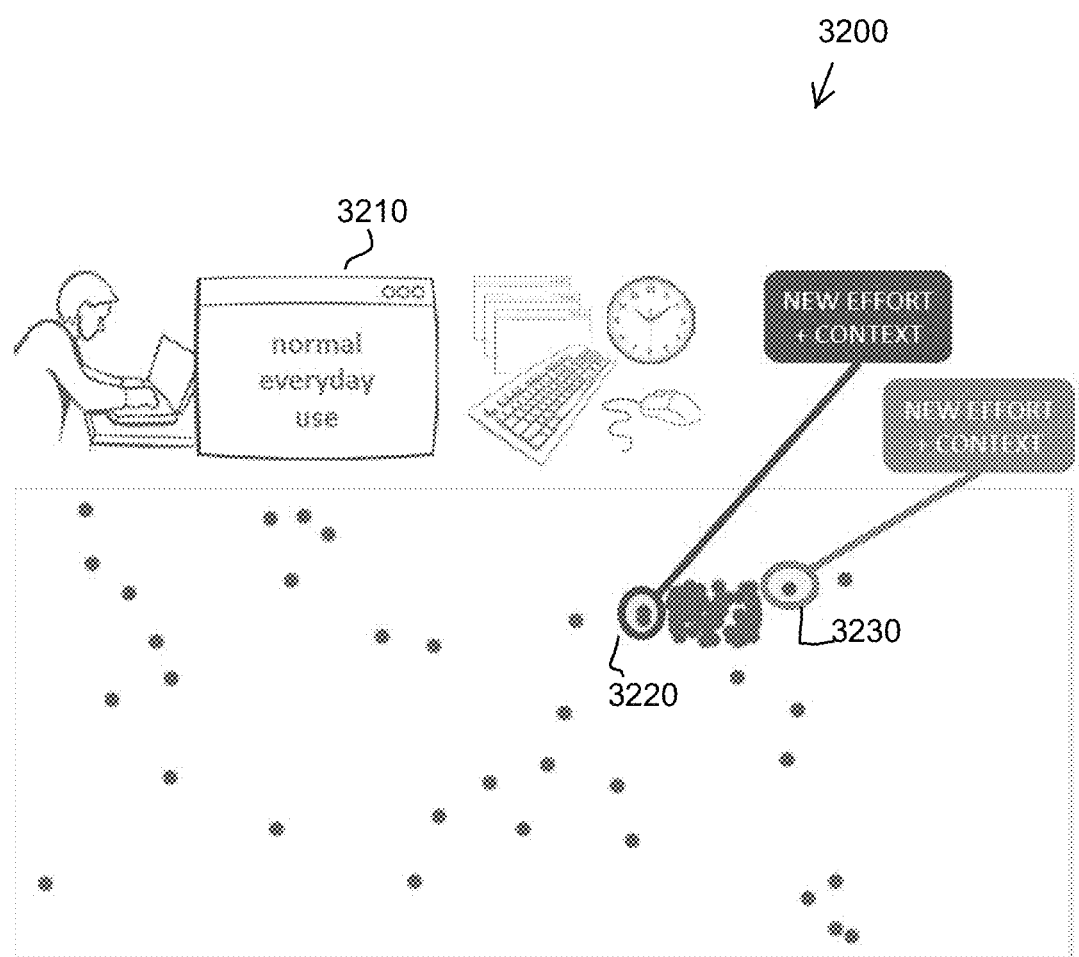
FIG. 32 is a Euclidean space diagram illustrating sensed efforts with respect to a context associated with the sensed efforts, in accordance with various embodiments.

FIG. 32 is a Euclidean space diagram 3200 illustrating sensed efforts with respect to a context associated with the sensed efforts. Each sensed effort in diagram 3200 is represented by a dot in Euclidean space. Various groupings of dots (efforts) are illustrated inside circles or ellipses. The groupings are also labeled as new effort and context 3220 and 3230 with respect to normal everyday use 3210.

A system and method can be implemented to evaluate the human effort metrics of a known person against previous collections of human effort metrics from the same known person to associate a given individual with a set of contextual event information and content data. Each effort can be mapped to an n-dimensional space, as described above with respect to keystroke examples of user authentication and in U.S. Pat. No. 9,430,626, along with context information. The efforts can be evaluated, using one or more of Mahalanobis and other techniques discussed above, along with the context information. New efforts can be mapped and evaluated (as described above with respect to keystroke examples of user authentication and in U.S. Pat. No. 9,430, 626), and anomalous clusters of efforts can be identified, separate from outliers' efforts.

Figure 33:
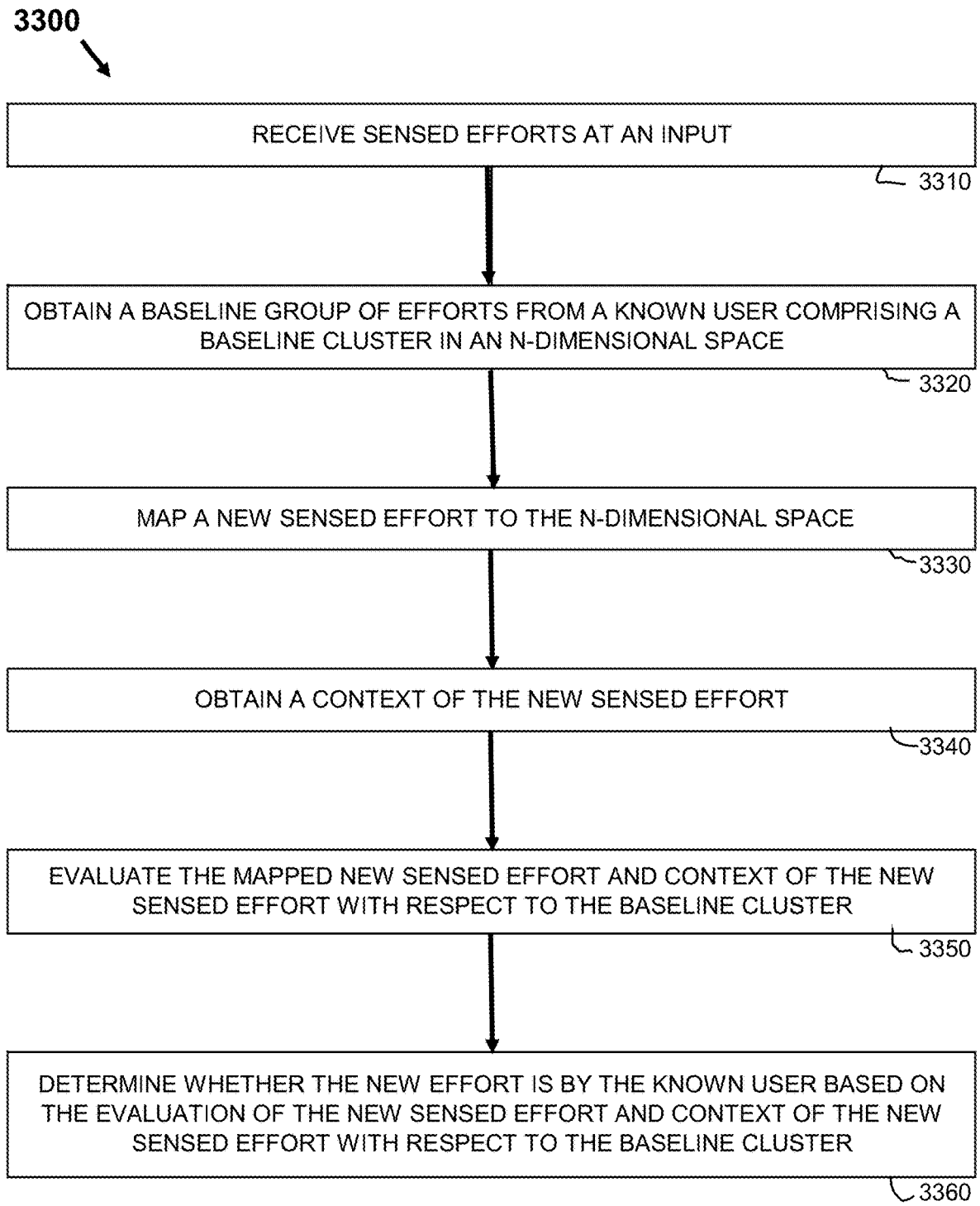
FIG. 33 is a flow diagram of features of an example method of evaluating human effort metrics of a known person against previous collections of human effort metrics from the same known person effort, in accordance with various embodiments.

FIG. 33 is a flow diagram of features of an embodiment of an example method 3300 of evaluating human effort metrics of a known person against previous collections of human effort metrics from the same known person effort. At 3310, sensed inputs are received at an input. The input can be coupled to one or more sensors that detects the sensed efforts. The received sensed efforts can be stored in a memory device, which can store instructions to operate on the sensed efforts in conjunction with one or more processors coupled to the memory device to execute the instructions to perform operations on the sensed efforts. At 3320, a baseline group of efforts from a known user is obtained, the baseline group comprising a baseline cluster in an n-dimensional space;

At 3330, a new sensed effort is mapped to the n-dimensional space. At 3340, a context of the new sensed effort is obtained. At 3350, the mapped new sensed effort and context of the new sensed effort with respect to the baseline cluster is evaluated. At 3360, it is determined whether the new effort is by the known user based on the evaluation of the new sensed effort and context of the new sensed effort with respect to the baseline cluster.

Variations of method 3300 or methods similar to method 3300 can include a number of different embodiments that may be combined depending on the application of such methods and/or the architecture of systems in which such methods are implemented. Evaluating each new sensed effort can comprise using a Mahalanobis algorithm. Evaluating each sensed effort can comprise mapping each effort to an n-dimensional Euclidean space. The context of the new sensed effort can comprise data corresponding to at least one of time and date, device information, account metadata, software configuration, data content, and filenames. The baseline group of efforts can comprise data corresponding to at least one of time and date, device information, account metadata, software configuration, data content, and filenames. Such methods can include determining whether the new effort is by the known user is performed as a function of a set of variance and covariance matrices derived from measurements contained in the sensed efforts.

In various embodiments, a system can be implemented to evaluate measured sensed efforts. The system can comprise an input to receive sensed efforts; a memory device to store the received sensed efforts and to store instructions; and a processor coupled to the memory device to execute the instructions to perform operations. The operations can comprise: obtaining a baseline group of efforts from a known user comprising a baseline cluster in an n-dimensional space; mapping a new sensed effort to the n-dimensional space; obtaining a context of the new sensed effort; evaluating the mapped new sensed effort and context of the new sensed effort with respect to the baseline cluster; and determining whether the new effort is by the known user based on the evaluation of the new sensed effort and context of the new sensed effort with respect to the baseline cluster.

Variations of such a system or similar systems can include a number of different embodiments that may be combined depending on the application of such systems and/or the architecture of the systems. Such systems can include a number of operations with respect to measured sensed efforts. The one or more processors can be structured to evaluate each new sensed effort including using a Mahalanobis algorithm. The one or more processors can be structured to evaluate each sensed effort including mapping each effort to an n-dimensional Euclidean space. The context of the new sensed effort can comprise data corresponding to at least one of time and date, device information, account metadata, software configuration, data content, and filenames. The baseline group of efforts can comprise data corresponding to at least one of time and date, device information, account metadata, software configuration, data content, and filenames. Such systems can include the one or more processors structured to execute operations to determine whether the new effort is by the known user is performed as a function of a set of variance and covariance matrices derived from measurements contained in the sensed efforts.

Unknown Person in Multiple Collections

A system and method can be implemented to derive a group of human effort metrics from multiple collections of human effort metrics that are composed of the measurements of an unknown number of persons, to detect a single person across the collections. This capability can be based on developing a set of variance and covariance matrices derived from the raw measurements, and can employ, without limitation, a combination of one or more of Pearson product moment correlation coefficients, geospatial, ellipsoidal, and multidimensional effort metrics technologies, including Mahalanobis distance, Bhattacharyya distance, Cook's distance, Minkowski's distance, Random Sample Consensus, barycentricity, and outlier analysis statistical techniques. These techniques can be used, along with those described above with respect to keystroke examples of user authentication and in U.S. Pat. No. 9,430,626, to evaluate potential regularities in the collection, and to recursively evaluate bias and variability effects against a dynamically created sets of reference standards that map against a single human effort metric collection contained in the larger collections. At the same time, abnormalities are identified that may not belong to the human effort metrics produced by that specific person. From these techniques, machine learning and artificial intelligence engines can be used to develop independent rules about regular and anomalous human effort metrics specific to a single individual represented in the collections. A new human effort metrics collection can be derived from the combination of collections that corresponds to the measurements produced by a specific person, while still accounting for the unique expectations of variability for that person. This approach can also identify any derived collections that represent mechanical attempts to create a set of human effort metrics, such as a computer program or script that produces input designed to simulate a physical person.

For example, an insurance claim form on a website application captures user effort metrics, using the techniques described above with respect to keystroke examples of user authentication and in U.S. Pat. No. 9,430,626, as the user enters data values. These user effort metrics can be used to determine, using the techniques described above, how many individuals may have performed the data entry, regardless the contact information provided. Further, that same process can be used to detect any new form submissions from that same individual, or even automated (non-human) sources, so that potential fraud can be tracked and identified.

Figure 34:
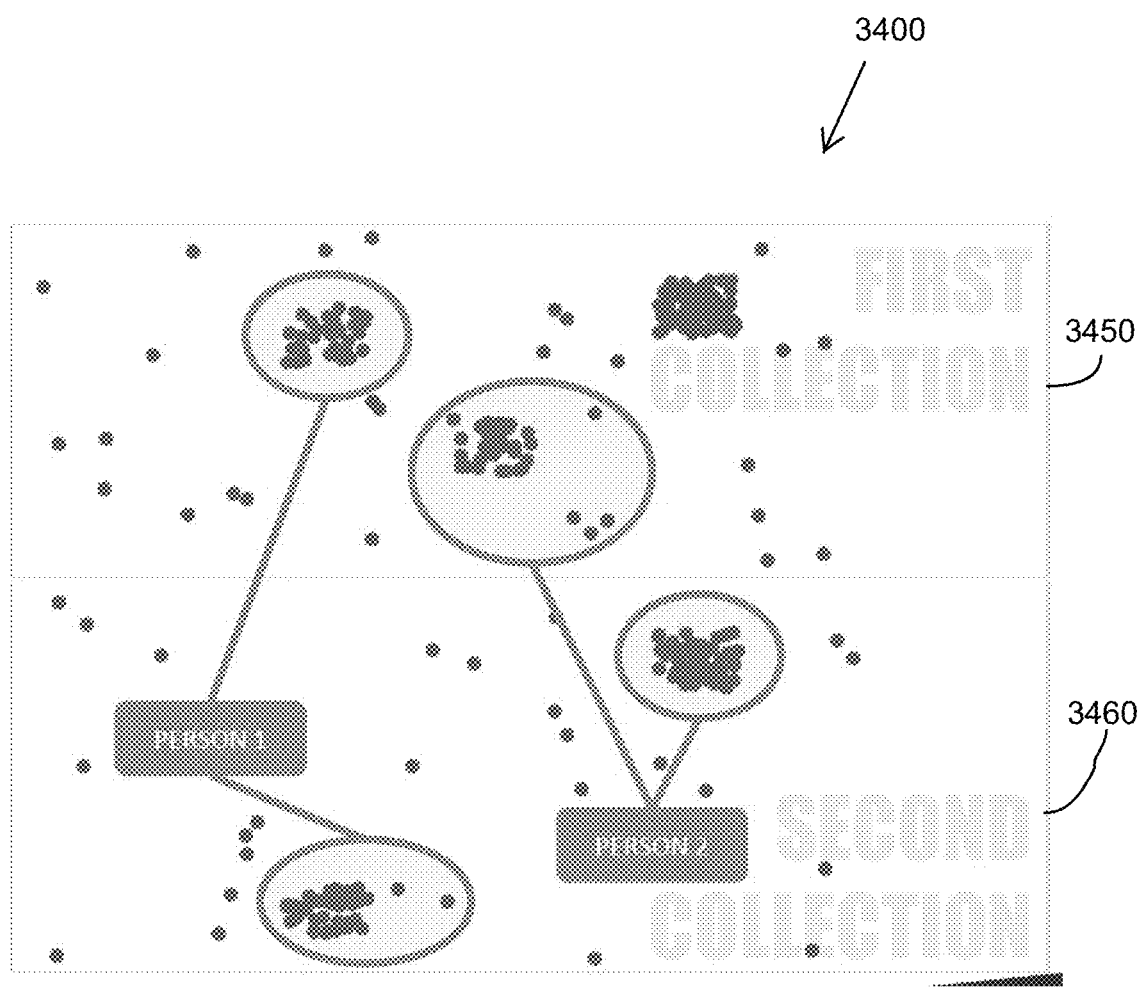
FIG. 34 is a Euclidean space diagram illustrating sensed efforts with respect to multiple individuals, in accordance with various embodiments.

FIG. 34 is a Euclidean space diagram 3400 illustrating sensed efforts with respect to multiple individuals. Each sensed effort in diagram 3200 is represented by a dot in Euclidean space. Various groupings of dots (efforts) are illustrated inside circles or ellipses. The groupings are also labeled as efforts 3410 and 3420 associated with person 1 and efforts 3430 and 3440 associated with person 2. Efforts 3410 and 3430 can be in a first collection 3450, and efforts 3420 can 3440 can be in a second collection 3460.

A system and method can be implemented to derive a group of human effort metrics from multiple collections of human effort metrics that are composed of the measurements of an unknown number of persons, to detect a single person across the collections. Each effort can be mapped to an n-dimensional space, as described above with respect to keystroke examples of user authentication and in U.S. Pat. No. 9,430,626. The efforts can be evaluated, using one or more of Mahalanobis and other techniques discussed above, to develop potential profiles from each collection. New collections of efforts can be mapped and evaluated (as described above with respect to keystroke examples of user authentication and in U.S. Pat. No. 9,430,626). Mahalanobis, Bhattacharyya, and other techniques discussed above can be used to identify one or more persons that appear in multiple collections.

Figure 35:
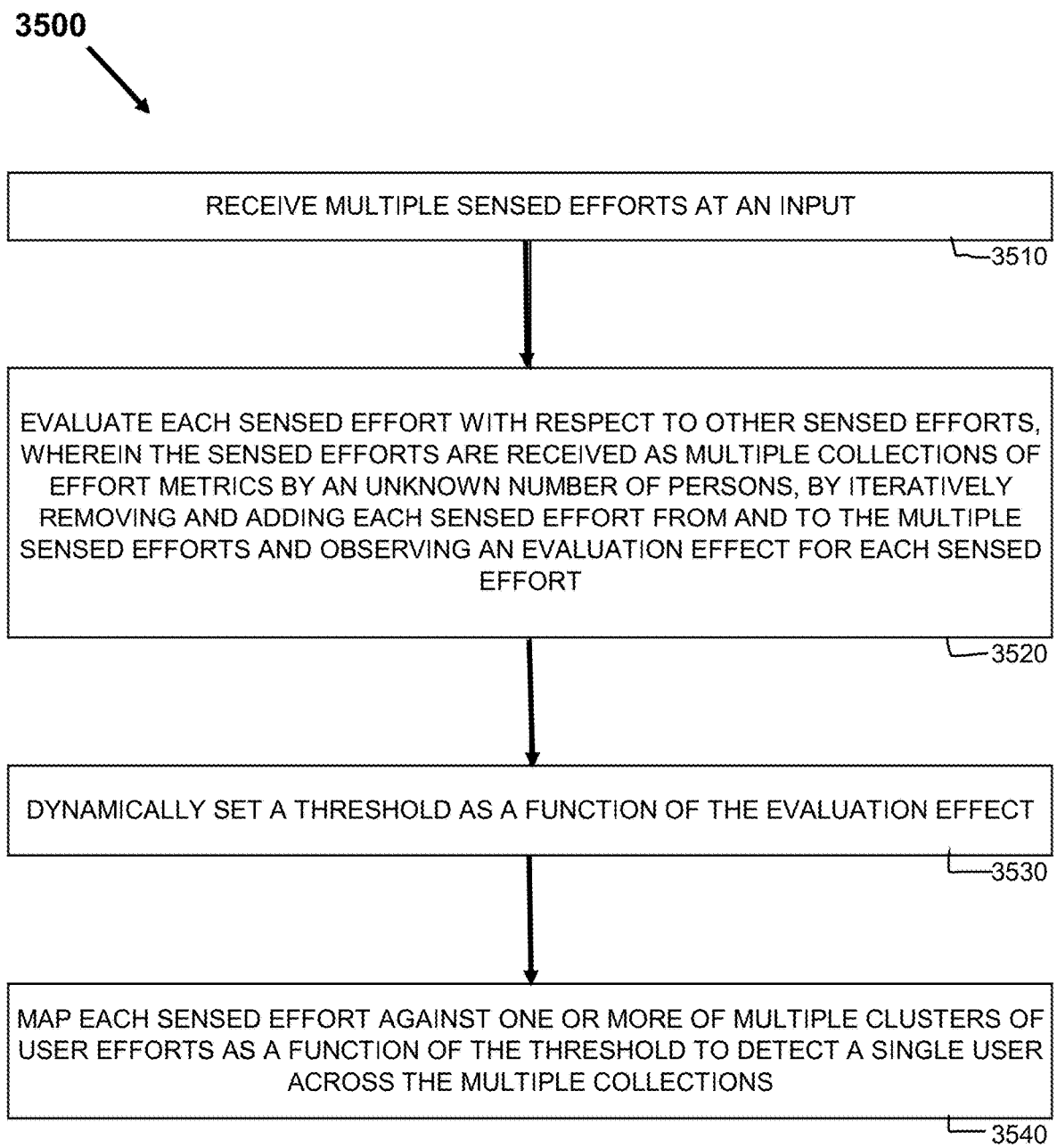
FIG. 35 is a flow diagram of features of an example method of evaluating human effort metrics of multiple individuals, in accordance with various embodiments.

FIG. 35 is a flow diagram of features of an embodiment of an example method 3500 of evaluating human effort metrics of multiple individuals. At 3510, multiple sensed inputs are received at an input. The input can be coupled to one or more sensors that detects the sensed efforts. The received sensed efforts can be stored in a memory device, which can store instructions to operate on the sensed efforts in conjunction with one or more processors coupled to the memory device to execute the instructions to perform operations on the sensed efforts. At 3520, each sensed effort is evaluated with respect to other sensed efforts, wherein the sensed efforts are received as multiple collections of effort metrics by an unknown number of persons, by iteratively removing and adding each sensed effort from and to the multiple sensed efforts and observing an evaluation effect for each sensed effort.

At 3530, a threshold is dynamically set as a function of the evaluation effect. At 3540, each sensed effort is mapped against one or more of multiple clusters of user efforts as a function of the threshold to detect a single user across the multiple collections.

Variations of method 3500 or methods similar to method 3500 can include a number of different embodiments that may be combined depending on the application of such methods and/or the architecture of systems in which such methods are implemented. The mapping can be performed using one or more of Pearson product moment correlation coefficients, geospatial, ellipsoidal, and multidimensional effort metrics technologies, including Mahalanobis distance, Bhattacharyya distance, Cook's distance, Minkowski's distance, Random Sample Consensus, barycentricity, and outlier analysis statistical techniques. Evaluating each sensed effort can comprise mapping each effort to an n-dimensional Euclidean space.

Variations of method 3500 or methods similar to method 3500 can include mapping each sensed effort to comprise recursively evaluating bias and variability effects against dynamically created sets of reference standards that map against a single human effort metric collection contained in the collections. Mapping each sensed effort further can comprise identifying abnormalities that may not belong to the effort metrics produced by a specific person. Such methods can comprise using machine learning and artificial intelligence engines to develop independent rules about regular and anomalous human effort metrics specific to a single individual represented in the collections to derive a new human effort metrics collection from the combination of collections that corresponds to the measurements produced by a specific person, while still accounting for the unique expectations of variability for that person. Such methods can comprise identifying derived collections that represent mechanical attempts to create a set of human effort metrics to simulate a physical person.

In various embodiments, a system can be implemented to evaluate measured sensed efforts. The system can comprise an input to receive multiple sensed efforts; a memory device to store the received sensed efforts and to store instructions; and a processor coupled to the memory device to execute the instructions to perform operations. The operations can comprise: evaluating each sensed effort with respect to other sensed efforts, wherein the sensed efforts are received as multiple collections of effort metrics by an unknown number of persons, by iteratively removing and adding each sensed effort from and to the multiple sensed efforts and observing an evaluation effect for each sensed effort; dynamically setting a threshold as a function of the evaluation effect; and mapping each sensed effort against one or more of multiple clusters of user efforts as a function of the threshold to detect a single user across the multiple collections.

Variations of such a system or similar systems can include a number of different embodiments that may be combined depending on the application of such systems and/or the architecture of the systems. Such systems can include a number of operations with respect to measured sensed efforts. Mapping can be performed using one or more of Pearson product moment correlation coefficients, geospatial, ellipsoidal, and multidimensional effort metrics technologies, including Mahalanobis distance, Bhattacharyya distance, Cook's distance, Minkowski's distance, Random Sample Consensus, barycentricity, and outlier analysis statistical techniques. Evaluating each sensed effort can comprise mapping each effort to an n-dimensional Euclidean space.

Variations of such a system or similar systems can include the one or more processors arranged such that mapping each sensed effort can comprise recursively evaluating bias and variability effects against dynamically created sets of reference standards that map against a single human effort metric collection contained in the collections. Mapping each sensed effort further can comprise identifying abnormalities that may not belong to the effort metrics produced by a specific person. Such systems can include one or more processors arranged to use machine learning and artificial intelligence engines to develop independent rules about regular and anomalous human effort metrics specific to a single individual represented in the collections to derive a new human effort metrics collection from the combination of collections that corresponds to the measurements produced by a specific person, while still accounting for the unique expectations of variability for that person. Such systems can include one or more processors arranged to identify derived collections that represent mechanical attempts to create a set of human effort metrics to simulate a physical person.

Figure 36:
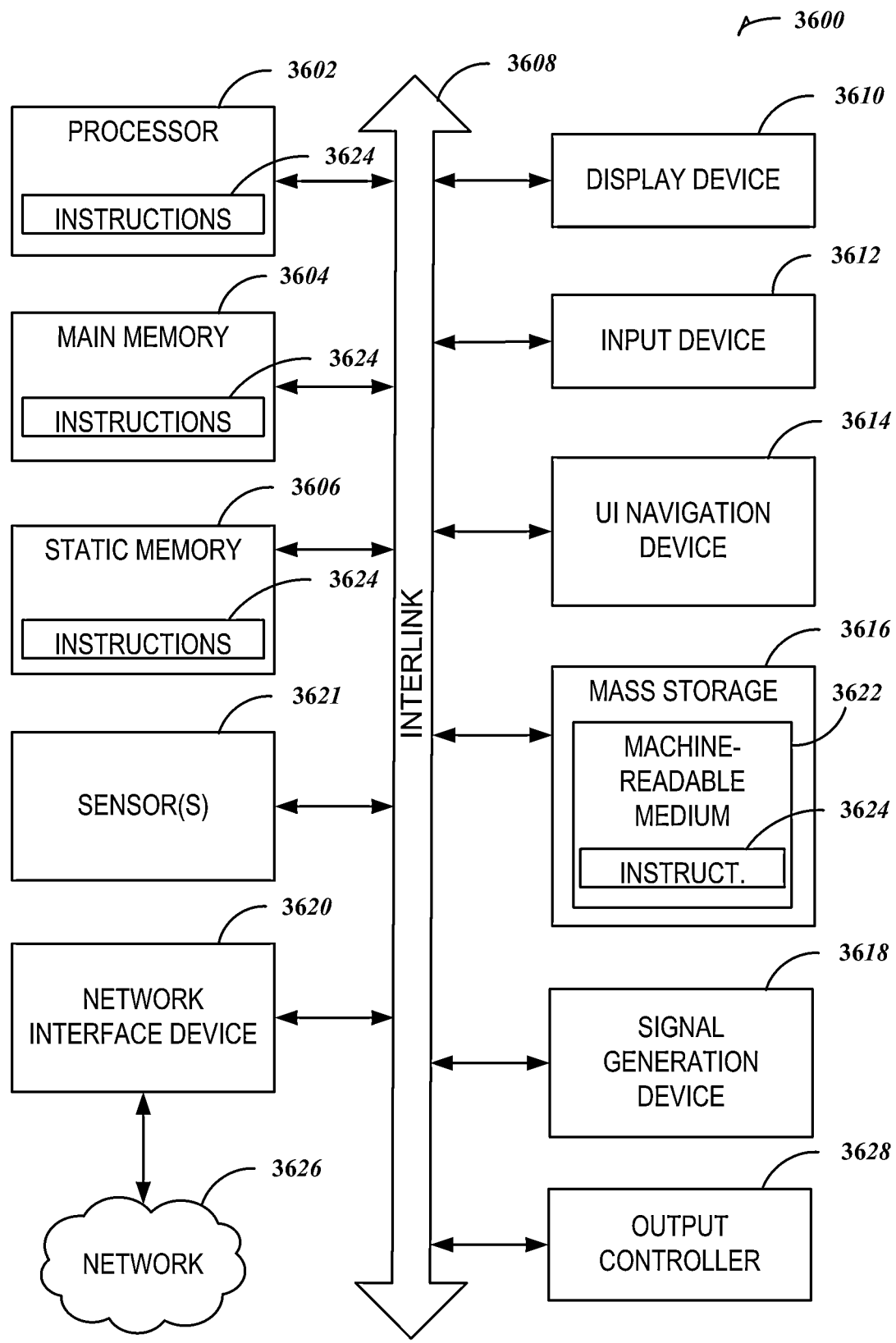
FIG. 36 is a block diagram illustrating an example of a machine that includes instrumentalities with the capability to evaluate human effort metrics of multiple individuals, in accordance with various embodiments.

FIG. 36 is a block diagram illustrating an example of a machine 3600, upon which any example embodiments, discussed herein, or similar embodiments be implemented. For example, machine 3600 can include an embodiment of an efforts measurement sensing system. The machine 3600 can be implemented as one or more systems. Variations of machine 3600 or similar machines can include a number of different embodiments that may be combined depending on the application of such machines and/or the architecture in which such machines are implemented. The machine 3600 can be connected (e.g., networked) to other machines. In a networked deployment, the machine 3600 can operate in the capacity of a server machine, a client machine, or both a client machine and a server machine in server-client network environments. In an embodiment, the machine 3600 can act as a peer machine in peer-to-peer (P2P) (or other distributed) network environment. In an embodiment, machine 3600 can be a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, cloud computing, software as a service (SaaS), and other computer cluster configurations.

Examples, as described herein, can include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may perform, alone or in combination, specified operations when operating. In an example, hardware of the circuit set may be immutably designed to carry out a specific operation (e.g., hardwired). In an example, the hardware of the circuit set can include variably connected physical components (e.g., execution units, transistors, simple circuits, etc.) including a machine-readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the machine-readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine 3600 can include a hardware processor 3602 (e.g., a central processing unit (CPU), a graphics processing unit (GPU), a hardware processor core, or any combination thereof), a main memory 3604 and a static memory 3606, some or all of which may communicate with each other via an interlink (e.g., bus) 3608. The machine 3600 can be, for example, a computer system. The machine 3600 may further include a display device 3610, an input device 3612 (e.g., buttons, switches, a keyboard, etc.), and a user interface (UI) navigation device 3614 (e.g., a pointing stick, an isometric joystick or other isometric device, etc.). In an embodiment, the display device 3610, input device 3612, and UI navigation device 3614 may be a touch screen display. The machine 3600 may additionally include a storage device (e.g., drive unit) 3616, a signal generation device 3618 (e.g., a speaker), a network interface device 3620, and one or more sensors 3621, such as a global positioning system (GPS) sensor, compass, accelerometer, optical sensors, motion detectors, or other sensors. The one or more sensors 321 can be used to make measurements of efforts performed by entities such as, but not limited to, one or more persons. The processor 3602 and one or more of the main memory 3604, static memory 3607, the mass storage 716 can receive the sensed efforts using the one or more sensors 3621, the input device 3612, or other component of the machine 3600. The machine 3600 can include an output controller 3628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.)

The storage device 3616, which can be realized as a mass storage, can include a machine-readable medium 3622, on which is stored one or more sets of data structures or instructions 3624 (e.g., software) embodying or utilized by any one or more of the techniques or functions described herein. The instructions 3624 may also reside, completely or at least partially, within the main memory 3604, within static memory 3606, or within the hardware processor 3602 during execution thereof by the machine 3600. In an example, one or any combination of the hardware processor 3602, the main memory 3604, the static memory 3606, or the storage device 3616 may constitute machine-readable media.

Although the machine-readable medium 3622 is illustrated as a single medium, the term "machine-readable medium" can include a single medium or multiple media (e.g., a centralized or distributed database, and/or associated caches and servers) arranged to store the one or more instructions 3624.

The term "machine-readable medium" can include any medium that is capable of storing, encoding, or carrying instructions for execution by the machine 3600 and that cause the machine 3600 to perform any one or more of the techniques of the present disclosure, or that is capable of storing, encoding or carrying data structures used by or associated with such instructions. Non-limiting machine-readable medium examples can include solid-state memories, and optical and magnetic media. In an example, a massed machine-readable medium comprises a machine-readable medium with a plurality of particles having invariant (e.g., rest) mass. Accordingly, massed machine-readable media are not transitory propagating signals. Specific examples of massed machine-readable media can include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 3624 may further be transmitted or received over a communications network 3626 using a transmission medium via the network interface device 3620 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, IEEE 802.15.1 family of standards (known as Bluetooth®), peer-to-peer (P2P) networks, among others. In an embodiment, the network interface device 3620 can include one or more physical jacks (e.g., Ethernet, coaxial, or phone jacks) and/or one or more antennas to connect to the communications network 3626. In an example, the network interface device 3620 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any tangible medium that is capable of carrying instructions for execution by the machine 3600, which medium can carry digital or analog communications signals or facilitate communication of such software.

The various operations of the example methods described herein may be performed, at least partially, by one or more processors that are temporarily arranged (e.g., by software instructions) or permanently arranged to perform the relevant operations. Whether temporarily or permanently arranged, such processors may constitute processor-implemented modules or objects that operate to perform one or more operations or functions. The modules and objects referred to herein, in some example embodiments, may comprise processor-implemented modules and/or objects.

Similarly, the methods described herein may be at least partially processor-implemented. For example, at least some of the operations of a method may be performed by one or more processors or processor-implemented modules. The performance of certain operations may be distributed among the one or more processors, not only residing within a single machine or computer, but also deployed across a number of machines or computers. In some example embodiments, the processor or processors may be located in a single location (e.g., within a home environment, an office environment, at a server farm, etc.), while in other embodiments, the processors may be distributed across a number of locations.

The one or more processors may also operate to support performance of the relevant operations in a "cloud computing" environment or within the context of software as a service (SaaS). For example, at least some of the operations may be performed by a group of computers (as examples of machines including processors), these operations being accessible via a network (e.g., the Internet) and via one or more appropriate interfaces (e.g., Application Program Interfaces (APIs)).

In various embodiments, a system can comprise: an input to receive multiple sensed efforts; a memory device to store the received multiple sensed efforts and to store instructions; and a processor coupled to the memory device to execute the instructions to perform operations. The operations can comprise: evaluating each sensed effort with respect to other sensed efforts by iteratively removing and adding each sensed effort from and to the multiple sensed efforts and observing an evaluation effect for each sensed effort; dynamically setting a threshold as a function of the evaluation effects; and classifying each sensed effort as a valid user effort, an irregular effort by the user, or an impostor effort as a function of the threshold. The operations can include adding valid sensed efforts to a cadence and habit model associated with a user. The can include removing irregular and impostor sensed efforts from a cadence and habit model associated with a user. Evaluating each sensed effort can include using a Mahalanobis algorithm. Evaluating each sensed effort can include mapping each effort to an n-dimensional Euclidean space.

The input can be structured to receive multiple sensed efforts from multiple users and the operations include: evaluating each sensed effort of the multiple sensed efforts from multiple users with respect to other sensed efforts by iteratively removing and adding each sensed effort from and to the multiple sensed efforts and observing an evaluation effect for each sensed effort; dynamically setting a threshold for each of the multiple users efforts as a function of the evaluation effect; and classifying each sensed effort as a valid user effort or an irregular user effort as a function of the thresholds. Valid user efforts of each user of the multiple users can include clusters of regularity.

In various embodiments, a system can comprise: an input to receive sensed efforts; a memory device to store the received sensed efforts and to store instructions; and a processor coupled to the memory device to execute the instructions to perform operations. The operations can comprise: mapping each received sensed effort to an n-dimensional space; evaluating a new sensed effort with respect to potential clusters of previous sensed efforts by iteratively removing and adding each sensed effort from and to the previous sensed efforts and observing an evaluation effect for each sensed effort; and associating the new sensed effort with one or more potential clusters of previous sensed efforts as a function of the evaluation effect. The operations can include adding the new sensed effort to one of the potential clusters of previous sensed efforts; and designating one of the potential clusters as a cadence and habit model for a user. Evaluating the new sensed effort can include using a Mahalanobis algorithm.

In various embodiments, a system can comprise: an input to receive sensed efforts; a memory device to store the received sensed efforts and to store instructions; and a processor coupled to the memory device to execute the instructions to perform operations. The operations can comprise: obtaining a baseline group of efforts comprising a baseline cluster in an n-dimensional space having a known variation in efforts; mapping new sensed efforts to the n-dimensional space; identifying an anomalous cluster from the mapped new sensed efforts; and detecting a variation in the anomalous cluster from the baseline group of efforts that are indicative of a change in behavior. The variation can be representative of neurological function variation. The variation can be detected as a function of a set of variance and covariance matrices derived from measurements contained in the sensed efforts. The operations can include forming multiple new clusters from groups of new efforts collected at different times; and determining a rate of change based on a distance of the clusters. The rate of change can be indicative of recovery from a brain injury.

In various embodiments, a system can comprise: an input to receive sensed efforts; a memory device to store the received sensed efforts and to store instructions; and a processor coupled to the memory device to execute the instructions to perform operations. The operations can comprise: obtaining a baseline group of efforts from a known user comprising a baseline cluster in an n-dimensional space; mapping a new sensed effort to the n-dimensional space; obtaining a context of the new sensed effort; evaluating the mapped new sensed effort and context of the new sensed effort with respect to the baseline cluster; and determining whether the new effort is by the known user based on the evaluation of the new sensed effort and context of the new sensed effort with respect to the baseline cluster. The context of the new sensed effort can include data corresponding to at least one of time and date, device information, account metadata, software configuration, data content, and filenames. The baseline group of efforts can include data corresponding to at least one of time and date, device information, account metadata, software configuration, data content, and filenames. Determining whether the new effort is by the known user can be performed as a function of a set of variance and covariance matrices derived from measurements contained in the sensed efforts.

In various embodiments, a system can comprise: an input to receive multiple sensed efforts; a memory device to store the received sensed efforts and to store instructions; and a processor coupled to the memory device to execute the instructions to perform operations. The operations can comprise: evaluating each sensed effort with respect to other sensed efforts, wherein the sensed efforts are received as multiple collections of effort metrics by an unknown number of persons, by iteratively removing and adding each sensed effort from and to the multiple sensed efforts and observing an evaluation effect for each sensed effort; dynamically setting a threshold as a function of the evaluation effect; and mapping each sensed effort against one or more of multiple clusters of user efforts as a function of the threshold to detect a single user across the multiple collections. Evaluating each sensed effort can include mapping each effort to an n-dimensional Euclidean space. Mapping can be performed using one or more of Pearson product moment correlation coefficients, geospatial, ellipsoidal, and multidimensional effort metrics technologies, including Mahalanobis distance, Bhattacharyya distance, Cook's distance, Minkowski's distance, Random Sample Consensus, barycentricity, and outlier analysis statistical techniques. Mapping each sensed effort can include recursively evaluating bias and variability effects against dynamically created sets of reference standards that map against a single human effort metric collection contained in the collections. Mapping each sensed effort can include identifying abnormalities that may not belong to the effort metrics produced by a specific person.

The operations can include using machine learning and artificial intelligence engines to develop independent rules about regular and anomalous human effort metrics specific to a single individual represented in the collections to derive a new human effort metrics collection from the combination of collections that corresponds to the measurements produced by a specific person, while still accounting for the unique expectations of variability for that person. The operations can include identifying derived collections that represent mechanical attempts to create a set of human effort metrics to simulate a physical person.

The above described example embodiments enable implementation of various systems and methods, including one or more of the following system and methods. A system and method can be structured to determine which human effort metrics from a collection of human effort metrics were either not created by a given person intentionally, or represent irregular measurements of a given person. A system and method can be structured to derive groups of human effort metrics from a collection of human effort metrics that is composed of the measurements of an unknown number of persons, to evaluate the number of persons represented in the given collection and produce refined collections corresponding to each person. A system and method can be structured for determining the variation of human effort metrics in a dynamic collection of human effort metrics as each are measured, producing a set of real-time analysis results. A system and method can be structured to evaluate the human effort metrics of a known person against previous collections of human effort metrics from the same known person to detect variation in measurements beyond the normal variation specific to that individual. A system and method can be structured to derive a group of human effort metrics from multiple collections of human effort metrics that are composed of the measurements of an unknown number of persons, to detect a single person across the collections. The features of these embodiments of example systems and methods can be combined to form other systems and methods.

Conventional terms in the fields of computer networking and computer systems have been used herein. The terms are known in the art and are provided only as a non-limiting example for convenience purposes. Accordingly, the interpretation of the corresponding terms in the claims, unless stated otherwise, is not limited to any particular definition.

The above detailed description includes references to the accompanying drawings, which form a part of the detailed description. The drawings show, by way of illustration, specific embodiments that may be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. Moreover, in the following claims, the terms "first," "second," and "third," etc. are used merely as labels, and are not intended to impose numerical requirements on their objects.

Method examples described herein may be machine or computer-implemented at least in part. Some examples can include a machine-readable medium or machine-readable medium encoded with instructions operable to configure an electronic device to perform methods as described in the above examples. An implementation of such methods can include code, such as microcode, assembly language code, a higher-level language code, or the like. Such code can include machine-readable instructions for performing various methods. The code may form portions of computer program products. Further, in an example, the code may be tangibly stored on one or more volatile, non-transitory, or non-volatile tangible machine-readable media, such as during execution or at other times. Examples of these tangible machine-readable media can include, but are not limited to, hard disks, removable magnetic disks, removable optical disks (e.g., compact disks and digital video disks), magnetic cassettes, memory cards or sticks, random access memories (RAMs), read-only memories (ROMs), and the like.

Although specific embodiments have been illustrated and described herein, it will be appreciated by those of ordinary skill in the art that any arrangement that is calculated to achieve the same purpose may be substituted for the specific embodiments shown. Many adaptations will be apparent to those of ordinary skill in the art. Accordingly, this application is intended to cover any adaptations or variations.

What is claimed is:

1. A system comprising:
an input to receive sensed efforts;
a memory device to store the received sensed efforts and to store instructions; and
a processor coupled to the memory device to execute the instructions to perform operations comprising:
obtaining a baseline group of efforts comprising a baseline cluster in an n-dimensional space having a known variation in efforts;
mapping new sensed efforts to the n-dimensional space;
identifying an anomalous cluster from the mapped new sensed efforts; and
detecting variation in the anomalous cluster from the baseline group of efforts that are indicative of a change in behavior;
forming multiple new clusters from groups of new sensed efforts collected at different times; and
determining a rate of change based on a distance of the clusters, wherein the rate of change is indicative of recovery from a brain injury or illness.

2. A system comprising:
an input to receive sensed efforts;
a memory device to store the received sensed efforts and to store instructions; and
a processor coupled to the memory device to execute the instructions to perform operations comprising:
obtaining a baseline group of efforts comprising a baseline cluster in an n-dimensional space having a known variation in efforts;
mapping new sensed efforts to the n-dimensional space;
identifying an anomalous cluster from the mapped new sensed efforts; and
detecting variation in the anomalous cluster from the baseline group of efforts that are indicative of a change in behavior, wherein the variation is detected as a function of a set of variance and covariance matrices derived from measurements contained in the sensed efforts.

3. The system of claim 2, wherein the operations include:
forming multiple new clusters from groups of new sensed efforts collected at different times; and
determining a rate of change based on a distance of the clusters.

4. The system of claim 2, wherein the variation is representative of neurological or other physiological function variation.

5. The system of claim 2, wherein operations include evaluating each new sensed effort using one or more of Pearson product moment correlation coefficients, geospatial, ellipsoidal, and multidimensional effort metrics technologies, including Mahalanobis distance, Bhattacharyya distance, Cook's distance, Minkowski's distance, Random Sample Consensus, barycentricity, and outlier analysis statistical technique against one or more model thresholds.

6. The system of claim 2, wherein the operations include identifying the anomalous cluster separate from outlier efforts.

7. A system comprising:
an input to receive sensed efforts;
a memory device to store the received sensed efforts and to store instructions; and
a processor coupled to the memory device to execute the instructions to perform operations comprising:
obtaining a baseline group of efforts from a known user comprising a baseline cluster in an n-dimensional space;
mapping a new sensed effort to the n-dimensional space;
obtaining a context of the new sensed effort;
evaluating the mapped new sensed effort and context of the new sensed effort with respect to the baseline cluster; and
determining whether the new sensed effort is by the known user based on the evaluation of the new sensed effort and context of the new sensed effort with respect to the baseline cluster, wherein determining whether the new sensed effort is by the known user is performed as a function of a set of variance and covariance matrices derived from measurements contained in the sensed efforts.

8. The system of claim 7, wherein the context of the new sensed effort includes data corresponding to at least one of time and date, device information, account metadata, software configuration, data content, and filenames.

9. The system of claim 7, wherein the baseline group of efforts includes data corresponding to at least one of time and date, device information, account metadata, software configuration, data content, and filenames.

10. The system of claim 7, wherein evaluating the mapped new sensed effort and context of the new sensed effort include using, along with the context, one or more multidimensional effort metrics technologies including Mahalanobis distance, Bhattacharyya distance, Cook's distance, Minkowski's distance, Random Sample Consensus, barycentricity, or an outlier analysis statistical technique.

11. A system comprising:
an input to receive sensed efforts;
a memory device to store the received sensed efforts and to store instructions; and
a processor coupled to the memory device to execute the instructions to perform operations comprising:
obtaining a baseline group of efforts from a known user comprising a baseline cluster in an n-dimensional space;
mapping a new sensed effort to the n-dimensional space;
obtaining a context of the new sensed effort;
evaluating the mapped new sensed effort and context of the new sensed effort with respect to the baseline cluster; and
determining whether the new sensed effort is by the known user based on the evaluation of the new sensed effort and context of the new sensed effort with respect to the baseline cluster, wherein the operations include:
recursively evaluating bias and variability effects of the new sensed effort against a dynamically created reference standard;
developing independent rules about human effort metrics specific to the known user;
generating a matrix of likely match and associated statistics, while accounting for unique expectations of variability for the known user; and
associating with the matrix with contextual event information.

12. A method comprising:
receiving sensed efforts in a system;
obtaining a baseline group of efforts comprising a baseline cluster in an n-dimensional space having a known variation in efforts;

mapping new sensed efforts to the n-dimensional space;
identifying an anomalous cluster from the mapped new sensed efforts; and
detecting a variation in the anomalous cluster from the baseline group of efforts that are indicative of a change in behavior;
forming multiple new clusters from groups of new sensed efforts collected at different times; and
determining a rate of change based on a distance of the clusters, wherein the rate of change is indicative of recovery from a brain injury or illness.

13. The method of claim 12, wherein the variation is representative of neurological or other physiological function variation.

14. A method comprising:
receiving sensed efforts in a system;
obtaining a baseline group of efforts comprising a baseline cluster in an n-dimensional space having a known variation in efforts;
mapping new sensed efforts to the n-dimensional space;
identifying an anomalous cluster from the mapped new sensed efforts; and
detecting a variation in the anomalous cluster from the baseline group of efforts that are indicative of a change in behavior, wherein detecting the variation includes detecting the variation as a function of a set of variance and covariance matrices derived from measurements contained in the sensed efforts.

15. The method of claim 14, wherein the method includes:
forming multiple new clusters from groups of new sensed efforts collected at different times; and
determining a rate of change based on a distance of the clusters.

16. The method of claim 14, wherein the method includes evaluating each new sensed effort using one or more of Pearson product moment correlation coefficients, geospatial, ellipsoidal, and multidimensional effort metrics technologies, including Mahalanobis distance, Bhattacharyya distance, Cook's distance, Minkowski's distance, Random Sample Consensus, barycentricity, and outlier analysis statistical technique against one or more model thresholds.

17. The method of claim 14, wherein the method includes identifying the anomalous cluster separate from outlier efforts.

* * * * *